(12) United States Patent
Turner et al.

(10) Patent No.: US 12,071,262 B2
(45) Date of Patent: Aug. 27, 2024

(54) REFUELING TOOL AND SYSTEM INCORPORATING THE REFUELING

(71) Applicant: MACDONALD, DETTWILER AND ASSOCIATES INC., Brampton (CA)

(72) Inventors: Andrew Paul Turner, Burlington (CA); Tej Sachdev, Milton (CA); Andrew Scott Ogilvie, Toronto (CA); Natalie Panek, Calgary (CA); Steve Fisher, Schomberg (CA); Michael Honeybrown, Glen Williams (CA); Drew Alexander Grandy, Alliston (CA); Victor Nifo, Whitby (CA)

(73) Assignee: MACDONALD, DETTWILER AND ASSOCIATES INC., Brampton (CA)

(*) Notice: Subject to any disclaimer, the term of this patent is extended or adjusted under 35 U.S.C. 154(b) by 74 days.

(21) Appl. No.: 17/785,571

(22) PCT Filed: Dec. 21, 2020

(86) PCT No.: PCT/CA2020/051779
§ 371 (c)(1),
(2) Date: Jun. 15, 2022

(87) PCT Pub. No.: WO2021/119851
PCT Pub. Date: Jun. 24, 2021

(65) Prior Publication Data
US 2023/0028104 A1 Jan. 26, 2023

Related U.S. Application Data

(60) Provisional application No. 62/951,502, filed on Dec. 20, 2019.

(51) Int. Cl.
*B64G 1/40* (2006.01)
*B64D 39/04* (2006.01)
(Continued)

(52) U.S. Cl.
CPC ............. *B64G 1/646* (2013.01); *B64D 39/04* (2013.01); *B64G 1/1078* (2013.01); *B64G 1/402* (2013.01);
(Continued)

(58) Field of Classification Search
CPC ..... B64G 1/646; B64G 1/4024; B64G 1/1078
See application file for complete search history.

(56) References Cited

U.S. PATENT DOCUMENTS 4,750,769 A 6/1988 Tebb
8,074,935 B2 12/2011 Gryniewski et al.
(Continued)

FOREIGN PATENT DOCUMENTS

CN 107322468 A 11/2017
EP 1798007 A1 6/2007

OTHER PUBLICATIONS

International Search Report for PCT/CA2020/051779 dated Apr. 8, 2021, 5 pages.

*Primary Examiner* — Richard G Davis
(74) *Attorney, Agent, or Firm* — HILL & SCHUMACHER

(57) ABSTRACT

The present disclosure relates to a robotically controlled satellite refueling tool and associated robotically controlled support and site preparation tools which facilitates on-orbit refueling by teleoperation of fill/drain valves of various designs and dimensions on satellites not originally prepared for on-orbit servicing, through the installation of quick connect safety valves, using vision-based feedback as well as feedback from sensors embedded in the refueling tool to operate a suite of adaptable and adjustable mechanisms. The refueling tool has an open architecture to allow a refueling tool vision system to see the fill/drain valve and the section of the refueling tool that is engaged with the fill/drain valve. The support tools include a blanket cutter tool, a blanket
(Continued)

handler tool, a wire cutter tool, a gripper tool, and the site preparation tools include a B-nut removal tool and a crush seal removal tool. Each of these tools includes a common base structure which is interfaced to the end effector of the robotic arm for transmitting rotation and torque to the various tools.

14 Claims, 59 Drawing Sheets

(51) Int. Cl.
     *B64G 1/10*          (2006.01)
     *B64G 1/64*          (2006.01)
     *B64G 4/00*          (2006.01)

(52) U.S. Cl.
     CPC ...... *B64G 1/4024* (2023.08); *B64G 2004/005* (2013.01)

(56) References Cited

U.S. PATENT DOCUMENTS

| | | |
|---|---|---|
| 9,567,111 B2 | 2/2017 | Roberts et al. |
| 9,840,010 B2 | 12/2017 | Lee et al. |
| 2006/0151671 A1 | 7/2006 | Kosmas |
| 2008/0237400 A1* | 10/2008 | Gryniewski ............. B64G 1/14 244/172.4 |
| 2013/0153710 A1 | 6/2013 | Roberts et al. |
| 2016/0039543 A1* | 2/2016 | Roberts .................. B64G 1/402 244/172.5 |
| 2017/0233243 A1 | 8/2017 | Mcnicholas |

* cited by examiner

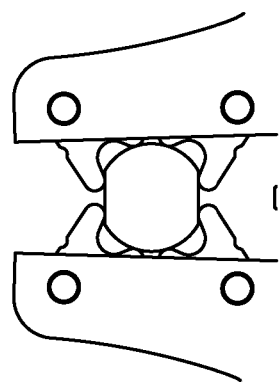
FIGURE 5E
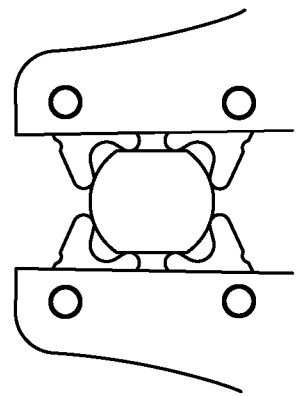
FIGURE 5G
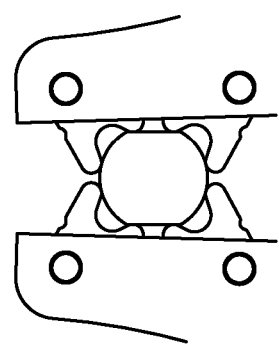
FIGURE 5D
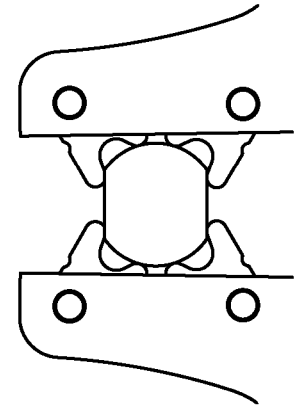
FIGURE 5F
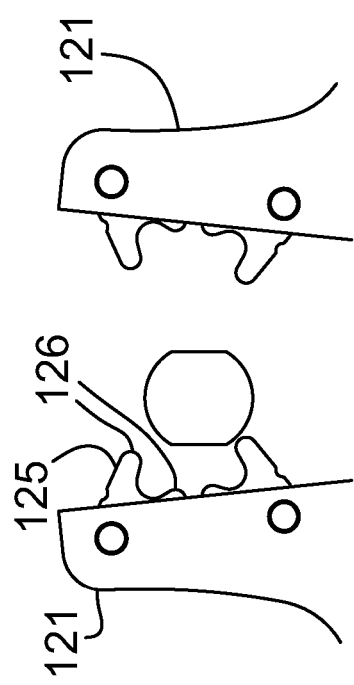
FIGURE 5A
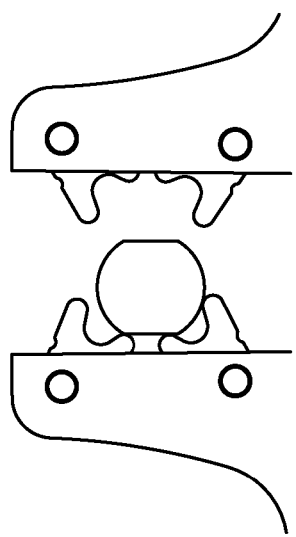
FIGURE 5B
FIGURE 5C

| 1.0 MANIPULATE CLIENT BLANKETS TO ACCESS FDV | 3.0 CUT CLIENT FDV LOCKWIRE | 4.0 PREP CLIENT FDV FOR REFUELING | 5.0 REMOVE B-NUT FROM CLIENT |
|---|---|---|---|
| 1.1 RETRIEVE BLANKET CUTTER / HANDLING SERVICING TOOL | 3.1 RETRIEVE WIRE CUTTER SERVICING TOOL | 4.1 RETRIEVE REFUELING TOOL | 5.1 RETRIEVE B-NUT REMOVAL SERVICING TOOL |
| 1.2 MOVE TO CLIENT WORKSITE | 3.2 MOVE TO CLIENT WORKSITE | 4.2 MOVE TO CLIENT WORKSITE | 5.2 MOVE TO CLIENT WORKSITE |
| 1.3 CUT / MANIPULATE CLIENT BLANKETS | 3.3 CUT BNUT LOCKWIRE ON CLIENT | 4.3 TIGHTEN THE FDV ACTUATION NUT | 5.3 REMOVE B-NUT FROM CLIENT |
| 1.4 MOVE TO SERVICER | 3.4 CUT ACTUATION NUT LOCKWIRE ON CLIENT | 4.4 LOOSEN THE FDV-B NUT | 5.4 MOVE TO SERVICER |
| 1.5 STOW BLANKET CUTTER / HANDLING SERVICING TOOL | 3.5 MOVE TO SERVICER | 4.5 CLIENT TO VERIFY LEAKAGE RATE | 5.5 DISCARD B-NUT AT DISPOSAL BIN |
| 1.6 MOVE TO CLIENT WORKSITE | 3.6 STOW WIRE CUTTER SERVICING TOOL | 4.6 MOVE TO SERVICER | 5.6 STOW B-NUT REMOVAL SERVICING TOOL |
| 1.7 INSPECT FDV | | 4.7 STOW REFUELING TOOL | |
| 1.8 MOVE TO SERVICER | | | |

FIGURE 56A

| 6.0 REMOVE CRUSH SEAL FROM CLIENT | 7.0 REFUELING | 8.0 VENT AFTER PROPELLANT TRANSFER | 9.0 PURGING SYSTEM |
|---|---|---|---|
| 6.1 RETRIEVE CRUSH SEAL SERVICING TOOL | 7.1 RETRIEVE REFUELING TOOL | 8.1 SERVICER TO VENT LINES BACK THROUGH SERVICER | 9.1 MATE REFUELING TOOL TO SAFETY VALVE FIXTURE |
| 6.2 MOVE TO CLIENT WORKSITE | 7.2 ACQUIRE SAFETY VALVE FROM STOWAGE POST | 8.2 VERIFY LEAKAGE RATE ON CLIENT AND SERVICER | 9.2 PURGE HOSE AND REFUELING TOOL THROUGH FIXUTRE |
| 6.3 REMOVE BNUT CRUSH SEAL FROM FDV | 7.3 MOVE TO CLIENT WORKSITE | 8.3 REMOVE REFUELING TOOL FROM SAFETY VALVE | 9.3 DEMATE REFUELING TOOL FROM FIXTURE |
| 6.4 MOVE TO SERVICER | 7.4 INSTALL SAFETY VALVE ON CLIENT FDV | 8.4 MOVE TO SERVICER | 9.4 STOW REFUELING TOOL |
| 6.5 DISCARD CRUSH SEAL AT DISPOSAL BIN | 7.5 CLIENT TO VERIFY LEAKAGE RATE | | |
| 6.6 STOW CRUSH SEAL SERVICING TOOL | 7.6 VENT THE LINE AND FILL WITH PROPELLANT | | |
| | 7.7 OPEN FDV ACTUATION NUT | | |
| | 7.8 SERVICER TO TRANSFER PROPELLANT | | |
| | 7.9 CLOSE FDV ACTUATION NUT | | |

FIGURE 56B

REFUELING TOOL AND SYSTEM INCORPORATING THE REFUELING

CROSS-REFERENCE TO RELATED APPLICATIONS

This application is a National Phase of PCT/CA2020/051779 filed on 21 Dec. 2020, and published on 24 Jun. 2021 as WO 2021/119851, in English, which claims priority to U.S. Provisional Patent Application No. 62/951,502 filed on 20 Dec. 2019, all of which are incorporated herein by reference in their entireties.

FIELD

The present disclosure relates to a method, system and tool for safely accessing, opening and closing fill/drain valves on artificial satellites during on-orbit propellant resupply operations. More particularly the tool is designed for propellant resupply of satellites not originally prepared for being resupplied as well as satellites designed for resupply. The present disclosure is especially designed to ease the propellant resupply of satellites not originally prepared for being resupplied after an initial resupply due to the components left behind on the satellite during the initial resupply.

BACKGROUND

Many satellites currently in operation were designed with a finite amount of propellant and were not designed for the possibility of being resupplied with propellant. The design philosophy relied upon replacement of the satellites after they had exhausted the on-board propellant supply. In view of the expense of replacing satellites, it would be very advantageous to be able to resupply satellites with propellant which are either near their end of propellant life but otherwise functional, or have suffered an insertion anomaly, or have been maneuvered more than originally intended for their nominal operations, thereby extending their operational life by several or many years. It is estimated that as many as half of all GEO communication satellites end their 10 to 15 year life with all or most of their subsystems still functional and it is only the depletion of the carefully budgeted propellant load that drives retirement of the satellite. Using a current economic model, the ability to resupply these end of life satellites in one mission with propellant, would extend each of their useful lives by 3 to 5 years and thereby delay the need to outlay the very high capital costs to launch a replacement for each satellite. Some satellites suffer from primary propulsion system failures or launch vehicle upper stage related failures soon after they are launched. In these cases the entire book value must be written off and compensation paid to the operator by the insurer. The satellite becomes an asset of the insurer and will eventually have to be disposed of in a graveyard or re-entry orbit. If one of these assets can be resupplied with propellant, enabling it to transfer to an orbital station in geosynchronous orbit and extending its life by 5 to 10 years, most or all of the value of the spacecraft can be recovered.

In addition, new long duration satellite concepts are being proposed where a modular satellite consists of an underlying structure supporting power generation, guidance and control and payload modules, some or all of which can be exchanged or added to over a lifetime that may be significantly longer than current satellites. These satellites benefit from not only an initial resupply of propellant, but from repeated resupply missions over many years of operation.

The key technical difficulty is that these satellites were not designed for robotic servicing, and it is not generally accepted that such missions are technically possible. Specifically, most satellites are designed with propellant fill and drain valves, (or FDVs), that were intended to be filled once prior to launch and never opened or manipulated again. Thus, accessing these FDVs remotely in-orbit presents several major challenges and would involve several operations, each of which is difficult to accomplish robotically including: cutting and removal of the protective thermal blankets, removal of several lockwires hand wrapped around the valves, unthreading and removing outer and inner valve caps, mating a fuel fill line to the valve nipple, mechanically actuating the valve, and when resupply with propellant is complete, replacing the inner valve cap. On-orbit servicing has been the subject of much study over the past thirty years. The idea of maintaining space assets rather than disposing of and replacing them has attracted a variety of ideas and programs. So far the concept has only found a home in the manned space program where some success can be attributed to the Solar Max and Hubble Space Telescope repair missions, Palapa-B2 and Westar rescue missions and the assembly and maintenance of the International Space Station.

Robotic capture and servicing of operating geostationary spacecraft has never been demonstrated. Until recently there have been no technologies disclosed that can solve the problem of accessing the propellant system of an unprepared satellite for the purpose of replenishing station keeping propellant. The majority of artificial satellites in orbit today were not designed with orbital propellant resupply in mind and access to the propellant system is designed to be accessed by a human on earth before launch. The technologies required to access the client spacecraft's propellant system for the purposes of resupply of propellant still have a very low technology readiness level, and are generally considered to be the main obstacle to a successful servicing mission.

Transferring fuels used for spacecraft propulsion systems from one source to another is very dangerous, due to the corrosive and explosive nature of the liquids involved. For example, inadvertent mixing of fuel and oxidizer in bipropellant systems will cause immediate combustion, so a liquid transfer system for bipropellant-based fuels needs to ensure that no accidental mixing occurs. It would be very advantageous to provide a system of tools that are designed for opening and closing of a variety of types/sizes of satellite FDVs during a propellant resupply operation being conducted on an unprepared satellite, such as but not limited to, removal of the sealing cap assembly, coupling/decoupling of propellant hoses to the client satellite, installation of a new sealing cap assembly to mention just a few.

The FDVs on existent satellites come in several designs, of varying dimensions and operating concepts. Therefore, to maximise the economic benefit of such a propellant resupply system, the minimum number of tools of minimum mass should be carried on any mission to permit the resupply of the widest selection of FDV designs using a single tool. Further mass and operational advantages accrue if various aspects of the refueling tool function can be evaluated and controlled using visual means as opposed to relying upon a host of limited sensors.

A further advantage can be realised if the resupply system can be engaged successfully with the broadest possible arrangement of FDVs on the satellite to be resupplied, this being exemplified by being able to accommodate the smallest possible spacing between FDVs.

U.S. Pat. No. 8,074,935 B2 issued to Gryniewski et al. issued Dec. 13, 2011, discloses a system and method for refueling unprepared satellites from a servicing spacecraft which includes a robotic arm, suitable tools which can be affixed to the end effector of the robotic arm required for accessing, opening and closing the fuel fill valve on the satellite being serviced, storage and retrieval stations on a tool caddy on which the tools and various fuel fill valve caps are stored. Several discreet sockets are included for the different sized components making up the fill drain valve that must be removed prior to the refueling operation and returned post refueling. During engagement with the removable features of the fill drain valve (FDV) the sockets cover the entire part being removed. In addition, this refueling tool could not accommodate the variation of vertical/longitudinal axis position of the removable or actuatable features on the variety of fill drain valves to be serviced.

U.S. Pat. No. 9,567,111 issued to Roberts et al. discloses a system and tool for accessing fill/drain valves during propellant resupply of a client satellite by a servicer satellite. This apparatus uses two to three cam wrenches which fit down over the FDV with one wrench engaging unmovable flats and the other engaging rotatable features of the removable valve components. Advantages of this system is that it provides intrinsic torque balancing via the use of a differential gearbox. The wrenches are also configured to be able to accommodate a range of torque feature sizes and shapes (reaction flats, hex, round with flats, square) and is designed with a 2× torque margin.

Disadvantages of both systems above is there is no sensing of the tool states or valve states due to the valve and tools being generally obscured. The cam wrenches of the latter system work as two opposing pairs operating at two elevations on features of different size, each relying on a complex hinging engagement that is triggered by rotating contact of the cams as they close towards the valve body at the base and the actuation nut higher up. The engagement of both pairs of cam wrenches can only occur simultaneously, as they are driven in opposing directions via a differential that can only generate torque through one pair of cam wrenches acting against the other. The strength of this approach is the ability to accommodate a range of sizes and a range of shapes, as well as intrinsic torque balancing, however this also makes it impossible to determine exactly when or if engagement has begun to occur, hence it is impossible to determine the exact state of FDV features. New information from one FDV supplier indicated excessive rotation of the actuation nut in the opening direction could result in a failure of the actuation nut retention feature and subsequently the unintended removal of the actuation nut and the generation of uncaptured debris. Consequently a new requirement was generated for a maximum rotation of the actuation nut, not to be exceeded. This leads directly to a need for enhanced sensing of the valve states.

SUMMARY

Disclosed herein is a system and a device which facilitates on-orbit refueling by teleoperation of FDVs of various designs and dimensions on satellites not originally prepared for on-orbit servicing, through the installation of quick connect safety valves, using vision-based and sensor-based feedback to operate a suite of adaptable and adjustable mechanisms.

There is provided a method of transferring fluid from a servicer spacecraft to a client spacecraft, the client spacecraft including a tank and a fill drain valve coupled to the tank, the fill drain valve including a valve actuation nut for opening and closing the fill drain valve, the fluid being selected from the group consisting of fuel and oxidizer, the method comprising instructing a robotic arm on the servicer spacecraft to perform the steps of:

a. removing an access valve cap on the fill drain valve;
b. providing a sensed confirmation that the removal action has successfully occurred;
c. establishing a fluid connection between a safety valve and a source of propellant on the servicer spacecraft;
d. providing a sensed confirmation that the connection has been established;
e. attaching the safety valve to the fill drain valve to provide a safe fluid coupling permitting fluid flow into but not out of the fill drain valve;
f. providing a sensed confirmation that the safety valve has been installed;
g. opening the fill drain valve by actuating the valve actuation nut;
h. providing sensed confirmation that the actuation nut has been actuated, and
i. transferring fluid into the tank through the safety valve.

The steps b), d), f) and h) of providing a sensed confirmation may be accomplished using a combination of feedback provided by real-time visual images and feedback from sensors strategically located, to observe and to sense positions of the access valve cap, the safety valve, the fluid line, the fill drain valve and valve actuation nut.

method of refueling a client satellite by accessing one or more fill drain valves which are in flow communication with one or more propellant storage tanks located in the client satellite, the method of refueling being conduced using a servicer spacecraft having stowed thereon a) one or more safety valves;
b) a refueling tool having refueling tool vision system which includes at least one camera, a rotatable wrench portion, an open architecture structure such that when the refueling tool is engaged with a fill/drain valve, a field of view of the camera encompasses the fill/drain valve being engaged and the rotatable wrench of the refueling tool and a coupling nut of a safety valve installed on the fill/drain valve, including strategically placed sensors on selected movable components of the refueling tool in order to sense a position of the selected movable components during the refueling operation,
c) a suite of supporting tools for preparing the client satellite to receive the refueling tool and assisting in the refueling operation, the servicer spacecraft having mounted thereon
a) a robotic arm mounted to the servicer spacecraft at its proximal end,
b) a berthing device for rigidly connecting the client satellite to the servicer spaceship,
c) a propellant transfer system for transferring propellant from the servicer spacecraft to the client satellite, and
d) a propellant coupling mounted in the end effector coupled to the propellant transfer system for transferring propellant to the client satellite through the propellant coupling, the method of refueling comprising the steps of:
a) maneuvering the servicer satellite into close proximity with the client satellite and rigidly berthing the client satellite to the servicer satellite using berthing device, b) exposing the fill/drain valve by instructing the robotic arm to acquire in a sequential manner the tool and the supporting tools to loosen and remove any objects covering the fill/drain valve, and once a given object is removed stowing the tool, c) after the fill drain valve is exposed, instructing the robotic arm to acquire the refuelling tool which is configured such that a fluid connection between the safety valve and propellant tank on the servicer spacecraft is established, and once acquired, instructing the robotic arm to acquire a safety valve thereby connecting the propellant transfer system to the safety valve, d) instructing the robotic arm to install the safety valve on a refueling nipple of the fill drain valve based on real-time visual images obtained by the refueling tool vision system and feedback from one or more of sensors, e) transfer propellant to the client satellite with the propellant passing through the tool and safety valve, f) once propellant has been transferred, instructing the robotic arm to disconnect the propellant transfer system by disconnecting the refuelling tool from the fill/drain valve, and g) disengage the berthing deviced from the client satellite.

The method may include logging an output of the one more sensors. The sensors may be one or more microswitches, and one or more potentiometers, or any combination thereof.

The sensors may be microswitches, and wherein the feedback from one or more of microswitches is the status of the microswitch at that particular time during the refueling operation.

The microswitches may be placed within a mechanism tasked with installing the safety valve on the fill/drain valve to sense the safety valve during acquisition and to sense a safety valve coupling nut of the safety valve contacting the refueling nipple of the fill/drain valve during refueling operation.

The present disclosure provides a system mounted on a servicing spacecraft for transferring fluid to a client satellite, the client satellite including a tank and a fill drain valve, the tank being coupled to the fill drain valve, the fill drain valve having an actuation nut for opening and closing the fill drain valve and an access valve cap on the fill drain valve, comprising:

a. fluid transfer means for transferring a fluid from a fluid tank on the servicing spacecraft to the tank on the client satellite, wherein the fluid is selected from the group consisting of fuel and oxidizer;

b. tool means for removing and replacing the access valve cap, for coupling a fluid line to the fill drain valve and decoupling therefrom, and for actuating the valve actuation nut to open and close the fluid valve;

c. a first sensing means for determining a relative displacement between the tool means and the fill drain valve;

d. a second sensing means for determining the state of the fill drain valve during the successive steps of accessing and manipulating the fill drain valve and subsequently coupling a fluid line and decoupling therefrom;

e. a safety valve attachable to the fill/drain valve for providing a safe fluid coupling with the safety valve having one or more independent seals against leakage during and after refueling;

f. positioning means connectable to the tools means, for positioning the tool means with respect to the fill drain valve; and g. control means in communication with the first and second sensing means, the positioning means, and the tool means, for controlling operation of the positioning means and the tool means based on feedback from the first and second sensing means.

The tool means may include a first tool for loosening the access valve cap, actuating the valve actuation nut to open and close and coupling a fluid line to the fill drain valve and decoupling therefrom, and a second tool for removing the access valve cap.

The tool means may include a third tool for removing a crush seal from the fill drain valve.

The first sensing means may be a vision system positioned to have a field of view to observe the relative displacement between the tool means and the fill drain valve.

The second sensing means is a combination of a vision system positioned to have a field of view that encompasses a work space that includes the first and second tools engaging the fill drain valve, and sensing means embedded in the tool means that sense and log a position of selected movable components during fluid transfer operations.

The present disclosure provides a refueling tool mounted on a servicer spacecraft for opening and closing one or more fill/drain valves on a client satellite to be refueled with the one or more fill/drain valves being in flow communication with a fuel tank on the client satellite, the one or more fill/drain valves having rotatable and static features coaxially aligned along a first axis, the servicer spacecraft including stowed safety valves to be installed on the fill/drain valves during refueling prior to passing fuel through the safety valve and fill/drain valves, and further including a refueling system configured to be mated to the safety valve during refueling operations, comprising:

a refueling tool structure including a) a mechanism A for registering to and clamping onto the fill drain valve body and torque reaction flats of a target fill drain valve;

a rotatable wrench comprising a mechanism B1 for closing and opening of the rotatable wrench;

a mechanism B2 for rotation of the wrench, mechanism B1 for closing and opening the wrench being compliantly mounted to the mechanism B2;

a mechanism C for elevation adjustment of the rotatable wrench;

the mechanism B2 being mounted to mechanism C, with the mechanisms A, B1, B2 and C forming a substructure that forms a torque reaction loop that ensures that torque induced by rotating the rotatable wrench is reacted at the valve body via the torque reaction flats, as required;

b) a mechanism D for connection of the refueling system to a refueling nipple of the target fill drain valve being engaged, the mechanism D being connected to the substructure and to a top plate connected to the substructure by side plates to form a complete refueling tool structure;

an end effector interface connected to the top plate and configured to be grasped and mated to a robotic end effector mounted to a robotic arm mounted on the servicer spacecraft;

one or more sensors placed within mechanism D, to sense the safety valve during acquisition and to sense safety valve coupling nut of the safety valve contacting the refueling nipple of the fill/drain valve during refueling operations; and a tool vision system which includes at least one camera attached to the refueling tool structure, the substructure having an open architecture such that when the refueling tool is engaged with a fill/drain valve, a field of view of the at least one camera encompasses the fill/drain valve being engaged and the rotatable wrench of the refueling tool and a coupling nut of the safety valve such that during the refueling operation, wherein all states of the rotatable wrench and the fill/drain valve and the safety valve can be sensed and/or observed using a combination of a status of a status of the microswitches and real-time images from the at least one camera.

The sensors may be microswitches, and wherein the feedback from one or more of microswitches is the status of the microswitch at that particular time during the refueling operation.

The sensors may be one or more microswitches, and one or more potentiometers, or any combination thereof.

The present disclosure provides a system for refueling a client satellite, comprising:

a) a servicer spaceship having mounted thereon:
  a robotic arm mounted to the servicer spacecraft at its proximal end, an end effector mounted to a distal end of the robotic arm,
  a berthing device for rigidly berthing the client satellite to the servicer spaceship,
  a propellant transfer system,
  propellant coupling mounted in the end effector coupled to the propellant transfer system for transferring propellant to the client satellite through the propellant coupling,
  a control system in communication with the robotic arm, the end effector, the propellant transfer system and the refueling tool for controlling the refueling operation based on feedback from the sensor system and the at least one camera;
  a communication system for remote communication with the servicer spacecraft,
b) the servicer spaceship having stowed thereon:
  the refueling tool
  one or more safety valves to be installed on the fill/drain valves during refueling prior to passing fuel through the safety valve and fill/drain valves, the propellant coupling being configured to be mated to the one or more safety valves, the one or more safety valves being configured to be picked up by, and mated to, the end effector;
  a suite of site preparation tools configured to be picked up by, and mated to, the end effector, the site preparation tools configured to perform selected tasks to prepare the client satellite to receive the refueling tool; and
  a suite of refueling support tools configured to be picked up by, and mated to, the end effector, the refueling support tools configured to engage the fill/drain valves to prepare them to receive the safety valve.

The present disclosure provides a suite of supporting tools for preparing a client satellite to be refueled, comprising:

a suite of tools each having a specific function, each tool having a drive shaft and tool section configured for its specific function;

a common tool base to which each of the suite of tool tips are permanently attached, the common tool base including
  a housing with a grasping interface on one side thereof configured for robotic grasping by an end effector attached to a distal end of a robotic arm mounted on a servicing satellite, the grasping interface including a grapple fixture, the other side of the housing configured to have a tool attached thereto and to receive the driveshaft of the tool;
  two tool mechanism drive interfaces used for enacting functions of a given tool tip via a drive actuator mechanism that is located in the end effector of the robotic arm, one of the two tool mechanism drive interfaces being used to drive specific tool tip on each of the support tools, and the second being use to drive a tie-down stowage mechanism for retaining the common base when not grasped by the robotic arm,
  a tool mechanism gear train located in the housing that transfers rotation and torque from one of the tool mechanism drive input interfaces to the tool driveshaft via the tool mechanism gear train interface, for actuation of tool function.
  a tie-down mechanism 'active-half', coupled to, and driven by the second tool mechanism drive interface for use when retaining the common base in the tie-down mechanism when it is not being used and is demated from the end effector.

The tie-down mechanism comprises a receptacle housing secured to the servicing spacecraft having a passive locking mechanism configured to receive the tool retained in the common base and to engage with, and lock, the tie-down mechanism 'active-half' of the common base.

The common base and the receptacle housing include visual cues to visually assist the robotic arm aligning the common base with the receptacle housing during operations to insert and lock the common base in the receptacle housing.

The suite of supporting tools may include site preparation tools each of which include a common base and a tool tip attached thereto with each tool tip including a specific device action, the tool tip common structure includes a housing with an interface configured to be bolted to the common base, an internally threaded drive shaft having a portion extending out of the housing which is inserted into the common base to engage one of the two mechanism drive interfaces, an advancing externally threaded rod which is threadably installed in the a portion of the drive shaft located inside the housing, a set of input linkages and a set of output linkages located at the distal end of the common structure, wherein rotation of the drive shaft causes the linear movement of the advancing threaded rod which in turn moves a set of input linkages which in turn cause pivotally connected output linkages forming part of the device action features to pivot about a specific point in the given tool tip causing the device action features to open or close, depending on the direction of motion.

The supporting tool may be a thermal blanket scissor device, such that the device action features are a pair of cutting shears integrally formed with distal ends of the output pivotally connected output linkages to provide cutting action.

The supporting tool may be a thermal blanket handling device, such that the device action features are a pair of blanket paddles integrally formed with distal ends of the output pivotally connected output linkages to provide a gripping action for gripping and removing pieces of thermal blanket.

The supporting tool may be a wire cutter and gripping tool, such that the device action features are a pair of wire cutter shears with wiring gripping features integrally formed with distal ends of the output pivotally connected output linkages to provide a gripping action for gripping and cutting wires.

The suite of supporting tools may include a crush seal removal tool for removing crushed seals produced when the fill/drain valve B-nut is removed, the crush seal removal tool including the common base and attached thereto a crush seal removal tool tip which includes an interface configured to be bolted to the common base, an internally threaded rotatable drive shaft which has a portion which is inserted into the common base to engage one of the two mechanism drive interfaces, an externally threaded plunger partially into the internally threaded drive shaft and reciprocally moveable therein, the plunger having a distal plunger face, including a pair of flex jaw linkages pivotally connected together a pivot point, the flex jaw linkages each having a distal flex jaw tip, the flex jaw linkages extending through openings in cage which is rigidly mounted on tool tip base structure, wherein when the drive shaft is rotated, plunger translates backwards into the drive shaft and while the plunger translates, the pivot point of the flex jaw linkages moves with the plunger causing the flex jaw tips to close and retract making contact with a valve stem of the fill/drain valve and dragging along the fill/drain valve stem, the flex jaw tips become preloaded against the fill/drain valve stem and dragged along until they hook onto the crush seal and pry it loose where it is trapped in the cage between the flex jaw tips and the distal plunger face, and wherein rotation of the drive shaft in the reverse direction opens the flex jaw tips and ejects the crush seal from the tool tip by pushing the plunger face forward and pushing the crush seal out of the cage.

The suite of supporting tools may include a B-nut removal tool, the B-nut removal tool including the common base and permanently attached thereto a B-nut removal tool tip, the B-nut removal tool tip including a tool tip base structure which is permanently attached to the common base, a drive shaft having a portion which is inserted into the common base to engage one of the two mechanism drive interfaces, spring wrench fingers coupled to a distal end of the drive shaft, a collet, having a keyed connection to the spring wrench fingers at the proximal end of the spring fingers allowing only motion along the axis of rotation of the drive shaft, the collet having a slots in the outer diameter of the collet, enclosed in a pin carrier housing, including cam-pins mounted in the pin carrier housing that run in the slots, and the pin carrier housing delayed from rotation by the ratchet disc via preloaded against the pin carrier housing at the ratchet disc interface by the preload spring, where rotation of the ratchet disc is restricted by the key feature between the ratchet disc and the tip base structure, so that in order for the pin carrier housing to rotate with the drive shaft the collet must move axially forward as driven by the cam-pins in the pin slots until the end of the pin slots forcing the collet to close the spring fingers over the B-Nut against the B-Nut hex features and continued drive shaft rotation causing rotation of the pin carrier housing, with the collet enclosing the spring fingers and B-Nut, as the ratchet disc interface preload spring preload force is overcome and allows the pin carrier housing surface with ramp features to repeatedly slide over the ratchet disc surface with ramp features thus unthreading the B-Nut from the FDV and such that reversing the drive shaft rotation retracts the collet and allows the spring fingers to open so that the B-Nut is no longer contained and is able to be discarded.

BRIEF DESCRIPTION OF THE DRAWINGS

Embodiments of the mechanism for teleoperation of satellite FDVs will now be described, by way of example only, with reference to the drawings, in which:

FIGS. 5A through 5E collectively demonstrate the adaptability of mechanism A 12.

FIG. 5A is a sequence of images showing the self-centring behaviour inherent in mechanism A wherein the initially large lateral offset is corrected before final seating of contact fingers 126 on valve body 32 and torque reaction flats 34.

FIGS. 5B and 5C show the closed configuration on a small valve body 32 in both the parallel and perpendicular orientations.

FIGS. 5D and 5E show the closed configuration on a large valve body 32.

FIGS. 5F and 5G show the closed configuration on a still larger valve body in both the parallel and perpendicular configurations.

FIG. 56 is a block flow chart that describes in detail the steps taken by the servicer spacecraft 80 when it is engaged with the client satellite 81 during refueling operations.

DETAILED DESCRIPTION

Figure 1:
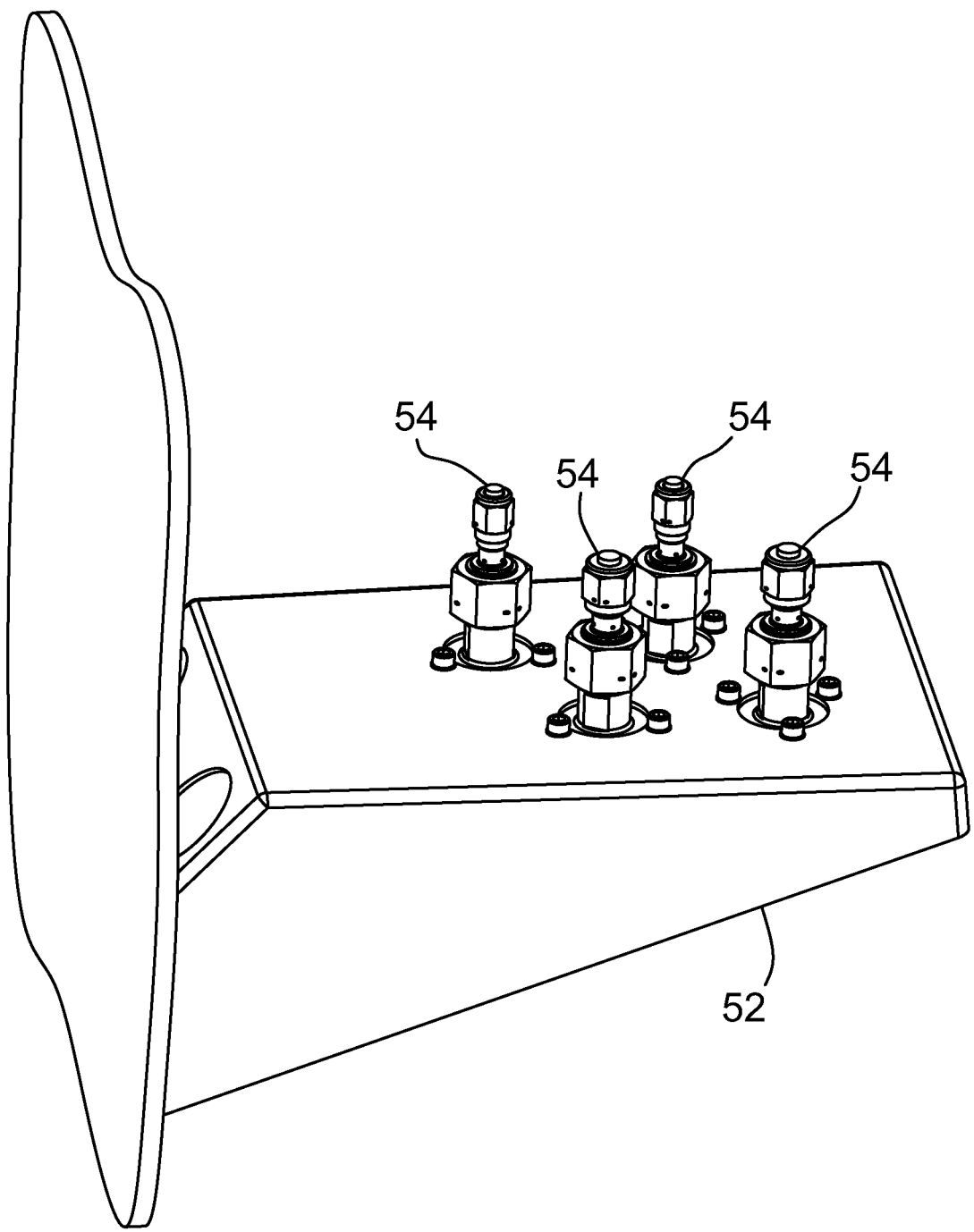
FIG. 1 shows a typical arrangement of FDVs 54 on FDV bracket 52, including a section view in FIG. 1A through the lower body 56 of the FDVs in the region which includes torque reaction flats 58, the region being the region where registration of the FDV occurs via mechanism A 12.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Embodiments of the refueling tool comprise the following components in reference to the Figures.

PARTS LIST

10—refueling tool
12—mechanism A, centre and clamp
14—mechanism B1, wrench closing/opening
16—compliance mechanism
18—mechanism B2, wrench rotation
20—mechanism C, wrench elevation
22—mechanism D, FDV connection
26—transmission
40—refueling tool vision system-based architecture
42—camera
44—camera bracket
46—camera shield
50—FDV worksite
52—FDV bracket
54—fill/drain valve, FDV
56—valve body 58—torque reaction flats
60—FDV axis
62—FDV actuation nut
64—B-nut
66—FDV flange
68—FDV welded connection
70—FDV nipple
80—servicer spacecraft
81—client
82—stowage post
84—safety valve fixture
84—robotic arm
102—mechanism "A" input shaft
103—thrust ball bearing
104—thrust needle roller bearing
105—tension housing
106—lead nut
107—piston
108—cross pin
109—springs
110—spacer
111—spacer
112—end cap
113—tension assembly
114—linear bearing rail
115—linear bearing block
116—drive link
117—rocker arm
118—connection links
119—push rod
120—bushing
121—jaw
122—pivot
123—roller
124—roller bracket
125—gripper
126—contact finger
127—microswitch
128—mechanism "A" frame
129—mechanism A mounting interface
150—B1 lead screw
151—lead screw drive gear
152—B1 housing
153—B1 cover
154—wrench jaw
155—lead nut
156—nut clamp
157—locking pin
158—idler gear
159—B1 drive input gear
160—B1 drive actuator
161—B1 actuator adaptor
162—B1 housing actuator recess
163—retaining clip
164—actuator adaptor pin
165—plunger guide
166—plunger spring
167—plunger
168—plunger bifurcated head
169—microswitch
170—B1 mounting lugs
171—shoulder bolts
172—bearing
173—idler shaft
174—idler bearing
175—torque reacting recess
176—torque reacting shaft 200—torque cell plate
201—torque cell
202—coupling bracket
203—down-swept protrusion
204—coupling platform
205—protruding lug
206—ball bushing
207—bushing circlip
208—first pair of precision shafts
209—second pair of precision shafts
210—length-adjustable locking shaft collar
211—compression spring
212—compliance mechanism mounting interface
250—rotation track plate
251—B2 drive gear
252—internally splined hub
253—B2 drive housing
254—bearing
255—thrust pad
256—segment gear assembly
257—segment gear
258—segment gear carrier
259—first pair of track rollers
260—end-of-travel pin
261—tensioner assembly
262—tensioner yoke
263—second pair of track rollers
264—tensioning screw
265—disc spring
266—microswitch
267—microswitch spacer
268—precision rolling surfaces
269—segment gear bumper
270—wrench rotation axis
271—elevation travel indicator
272—interface to mechanism A
300—refueling tool back plate
301—refueling tool mid plate
303—linear bearing rail
304—linear bearing block
305—right angle bracket
306—non-metallic bumper
307—retracted microswitch
308—bearing
309—mechanism B2 spline shaft
310—mechanism C lead screw
311—extended microswitch
350—safety valve assembly
351—safety valve body
352—external locking groove
353—coupling nut
354—spring
355—quick connect nipple
356—check valve
357—safety valve shoulder
360—mechanism D base plate
361—hose bracket
362—first set of linear guide rails
363—adjustable end stop
364—dual microswitch assemblies
365—flexible hose
367—safety valve carriage assembly
368—safety valve carriage
369—linear guide block
370—locking arm post
371—flanged bushing
372—locking arm 373—actuation slot
374—safety valve sensor assembly
375—compliant coupling assembly
376—first actuation actuator
377—microswitch striker
378—second set of linear guide rails
380—mate/de-mate carriage assembly
381—mate/de-mate carriage
382—linear guide block
383—track roller
384—lead nut
385—quick connect coupling
386—propellant manifold
387—dual microswitch assembly
388—travel stop
390—splined input shaft
391—drive bracket
392—gear
393—bearing
394—safety valve lead screw
395—lead nut
396—guide housing
397—guide pin
398—connecting pin
400—compliance housing
401—compliance base
402—shuttle
403—spring
405—sensor housing
406—sensor base
407—trigger plate
408—ready-to-latch microswitch
409—spring
410—limiting pin
415—compliance microswitch
416—compliance striker
417—advance microswitch
418—retract microswitch
450—transmission housing
451—top cover
452—bottom cover
453—gears
454—input gear
455—input gear common axis
456—output gear
457—internally splined hub
458—bearing
459—support housing
460—thrust washer
461—complete rim
462—partial rim
463—cylindrical groove
464—housing bore
465—locating pin hole
466—locating pin
467—transmission housing mounting interface
470—transmission bracket
471—linear guide rail
472—linear guide block
473—transmission support plate
474—lead nut
475—nut clamp
476—linear potentiometer
477—potentiometer mounts
478—potentiometer rod bracket
479—refueling tool top plate
480—transmission lead screw
481—bearing
482—bearing retainer
483—refueling tool side plate
484—transmission lead screw
485—transmission range of motion
490—contact sphere
491—touchdown rod
492—touchdown arm
493—touchdown bracket
500—refueling tool end effector interface
501—grasp fixture
502—first rotary input shaft
503—second rotary input shaft
504—electrical connectors
505—quick connect nipple
506—target
507—first rotary input gear
508—transfer gear
509—quill shaft
510—bearing
511—retainer
512—quill shaft external splines
513—fuel channel
514—quill shaft drive gear
515—transfer housing
516—grapple fixture probe
550—dexterous end effector, DEE
551—capture mechanism
552—first rotary input socket
553—second rotary input socket
554—movable electrical connectors
555—movable quick connect propellant coupling
556—end effector camera
601—Servicing Support Tool, Generic
603—common tool base
605—blanket cutter tool
606—blanket handling tool
607—wire Cutter Tool
608—B-Nut Removal Tool
609—crush seal removal tool
610—grapple fixture
612—tool mechanism drive interface—primary
613—tool mechanism drive interface—secondary
614—tool mechanism gear train
618—tie-down mechanism active half
620—common tool base structure
630—generic tool tip embodiment
632—tool mechanism gear train interface
634—tool tip drive shaft
636—tool tip common structure
638—tool base to tool tip bolted interface
640—advancing threaded rod
642—input linkages
644—output linkages
645—cutting shears
646—gripping paddles
647—wire cutter shears and wiring gripping features
650—blanket cutter tool tip
652—blanket handler tool tip
654—wire cutter tool tip
660—B-Nut Removal Tool Tip
662—collet
664—drive shaft
666—cam-pins
668—slots for cam pins
670—spring wrench fingers
672—b-nut hex nut feature 674—ratchet disc interface
676—pin carrier housing
678—ratchet disc
680—tool tip base structure
682—key feature
684—preload spring
686—ratchet disc surface with ramp features
688—pin carrier housing surface with ramp features
700—crush seal removal tool tip
702—crush seal, part of FDV
704—drive shaft
706—plunger
708—driveshaft to plunger threaded interface
710—pivot point
712—flex jaw linkages
714—flex jaw tips
716—fdv valve stem
718—cage
719—tool tip base structure
720—plunger face
730—tool tie-down, tool side
732—tool tie-down, receptacle
734—visual cue
736—spline, receptacle
738—drive shaft
740—spline, tool side
742—ball lock sleeve
744—lock balls
746—ball indentations
748—tie-down body
750—ball lock sleeve protrusion
752—spring loaded indicator
800—command and control system
802—bus
813—communications interfaces
825—computer control system
830—processor
835—memory
845—power supply
850—robotic vision system
860—I/O devices and interfaces
862—propellant transfer flow control system
930—communication system
934—two-way radio link
940—earth
950—berthing device
960—propellant transfer system
980—propellant outlet hose
FDV Worksite, 50

Figure 1A:
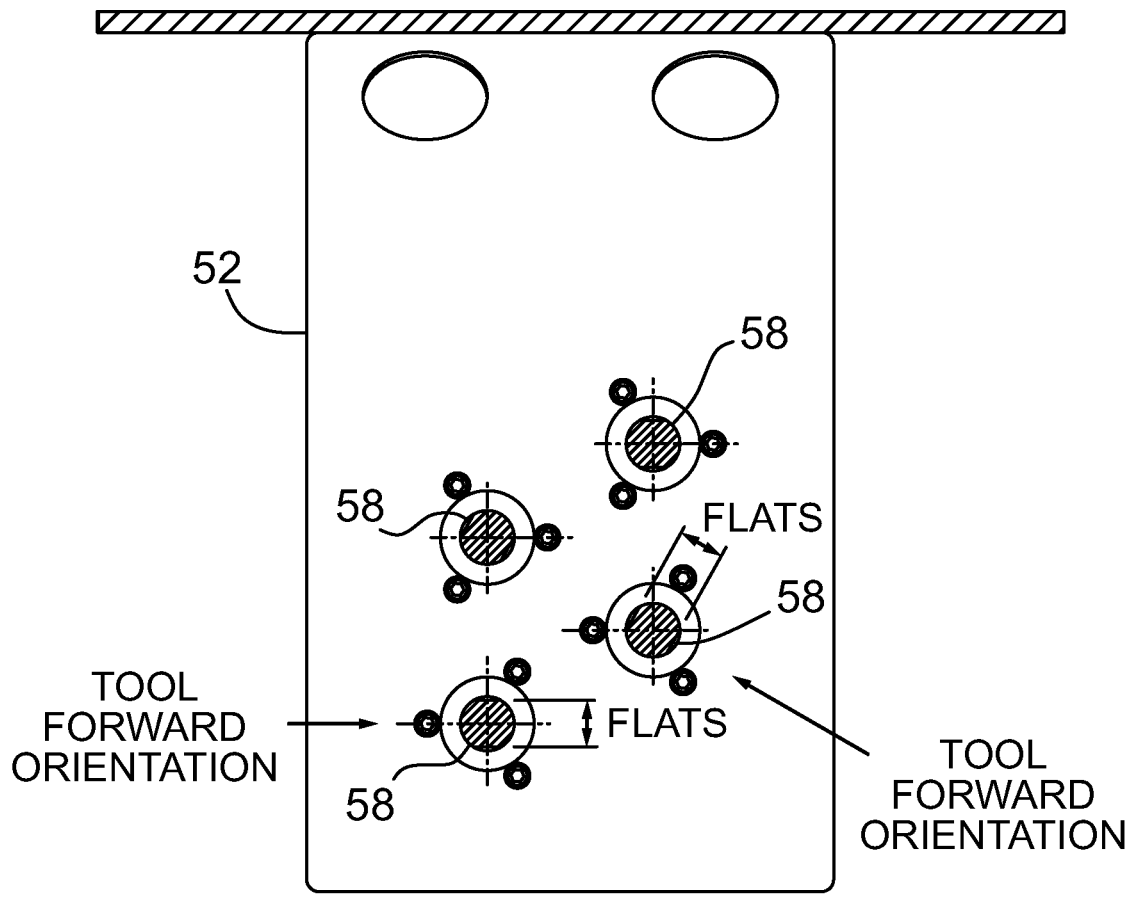
FIG. 1B shows a side view of the FDVs 54
FIG. 1C shows individual features of the FDV.
FIG. 1D shows the components which cap the valve.
Figure 1B:
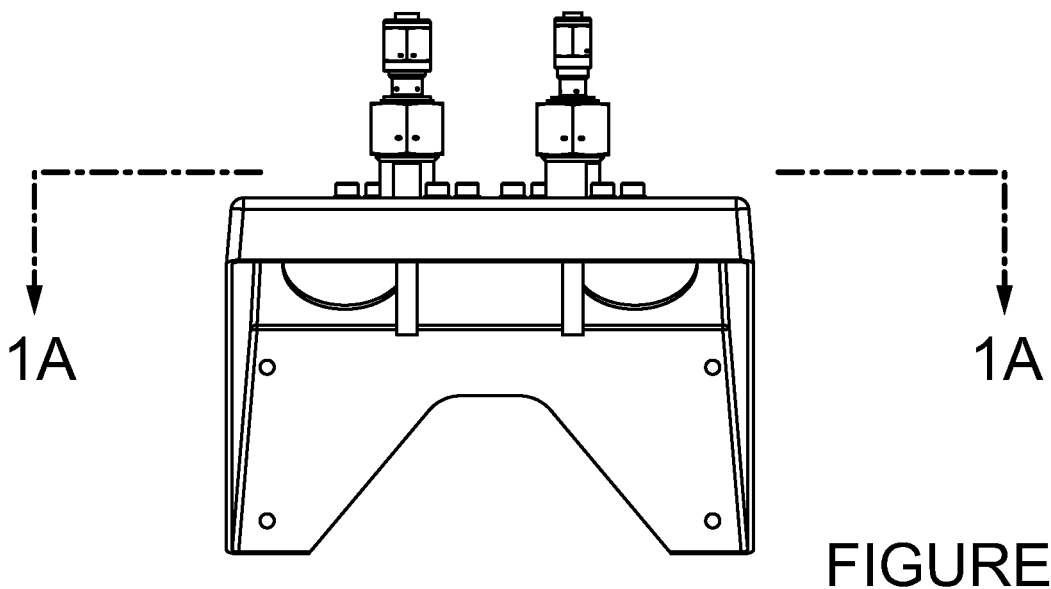
Figure 1D:
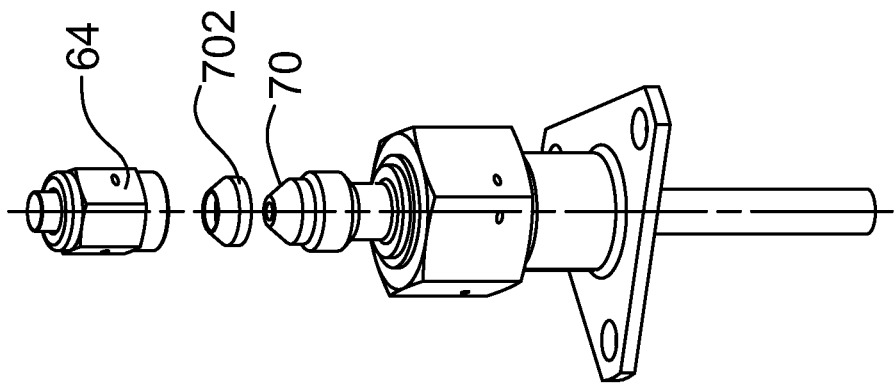
Figure 1C:
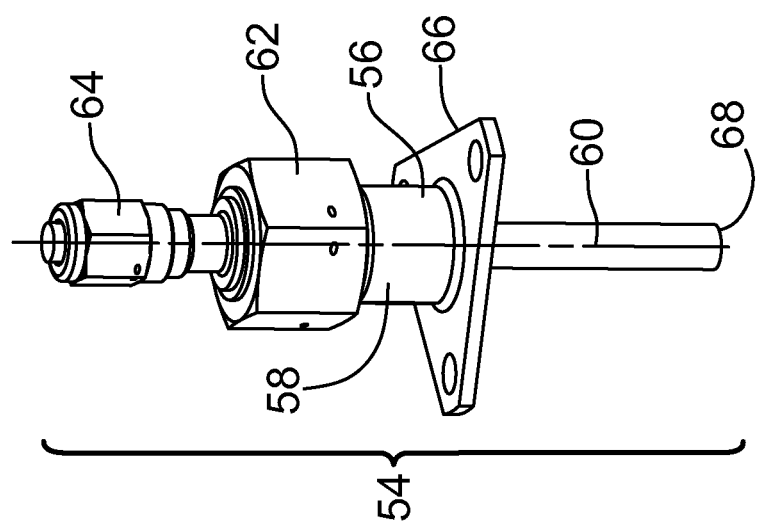

FIGS. 1, 1A and 1B show a typical geometric arrangement of FDV's 54 with minimum spacing. The arrangement is shown if FIG. 1A, wherein a first pair of FDVs are vertically aligned and 2.25" apart, and a second pair of FDVs are also vertically aligned and 2.25" apart. The first and second vertically aligned pairs are spaced 2" horizontally apart in a symmetrical, staggered pattern. Note that at the base of each FDV valve body 56 and above the level of mounting screw heads, there are a pair of torque reaction flats 58, the mid plane between the flats being in alignment with one of 3 mounting screws. The close spacing of fill drain valves 58 as shown in FIG. 1A creates a limited access envelope through which a refueling tool on the servicing robotic arm can be positioned to access the features on the FDVs 58. FIG. 1C outlines the relevant features of FDV 54, namely B-nut 64 (also known as a valve access cap), actuation nut 62, valve body 56 with torque reaction flats 58, mounting flange 66 and welded connection 68 that is completed at installation. FIG. 1D is an exploded view of the FDV showing FDV nipple 70 and the components which cap the valve, B-nut 64 and crush seal 702.

As the mounting hole pattern is equally spaced, each FDV can be installed in one of three possible orientations and the final, installed configuration is not a matter of record. Consequently there are three possible orientations of the torque reaction flats on each valve instance. Each of the three possible orientations would be satisfactory for the technician at initial installation, although some would be more awkward than others and hence less likely, but nonetheless possible. A detailed examination of each possible orientation, in each of the four locations, reveals that an automated system must be able to adapt to the torque reaction flats being either parallel to, or perpendicular to the approach direction of the refueling tool. Relying on only one of these two relative orientations, rather than the possibility of either, results in a system that cannot reliably grip the torque reaction flats of any valve in any possible installed configuration.

Also note there are two separate designs of valve in the arrangement shown, and both the valve body diameter and the across-flats dimension are different between the two designs. This is typical of bi-propellant systems, where the two valve sizes actually differentiate between the fuel circuit and the oxidizer circuit by employing different sizes of threaded connection, such differentiation meant to further reduce the remote risk of accidental mixing by attaching a fueling line to an oxidizer circuit, or vice versa, when fueling on the launch pad. This presents a further challenge to mechanism A 12, the function of which is to register alignment with the valve body and clamp onto the valve body and the reaction flats such that the torque applied by the wrench rotation mechanism can be reacted at the valve body and prevented from transmission to the FDV mounting bracket or welded tube connection 68.

Refueling Tool Vision System-based Open Architecture, 40

Insurability requires that no single point failures impede mission success; therefore a robotic operator of the refueling payload must be able to confirm successful completion of each task, or have the ability to continue the mission under degraded conditions.

Refueling operations can be categorized into two scenarios:

1. Initial alignment of the Refueling Tool (RT) 10 onto a FDV, such as:
    Using external cameras aid a tele-operator or an automatic control system to help guide the motion of the robotic arm holding the RT to a starting condition at the worksite i.e. RT touching down on the spacecraft deck.
2. Tool operations while on the FDV, such as:
    Identifying vertical alignment of tool reaction features with B-nut or actuation nut of the FDV.
    Identifying when tool reaction features are engaged with the B-nut or actuation nut of the FDV and confirmation that the FDV feature has actually rotated.

An operator should always have a minimum two options for sensing each task, which achieves the following:
    Provides confidence to an operator that what they see in a camera view is supported by a secondary source of information i.e. torque readings, turn count, switches, robot arm Force Moment Sensor (FMS) output etc.
    In off-nominal conditions (lighting, obstructions, camera failure, reflectivity) additional information is readily available.

Based on trade studies performed, cameras have been identified as the baseline primary sensing during alignment operations because the only reliable way of confirming alignment to the target FDV is through visual indication. This leads to an open architecture solution, where the tool volume around the FDV is kept open to allow camera viewing access. The same refueling tool vision system-based solution for ensuring initial alignment of the refueling tool to the FDV, when properly implemented with complementary tools, is ideal for continually monitoring the FDV state.

The present disclosure is designed around the primary requirement for the refueling tool vision system-based sensing as the main source of operator feedback to validate that various access, alignment, clamping actions of the refueling tool and rotation states of the FDVs b-nut and actuation nut can be validated, including but not limited to; initial coarse alignment and readiness for registration, successful registration to valve body and torque reaction flats, initial wrench alignment to a hexagonal feature both rotationally and in elevation, successful rotation of a hex feature, confirmation of safety valve acquisition, initial alignment of safety valve coupling nut to FDV, including contact confirmation, and confirmation of safety valve coupling nut advancement on FDV threaded connection.

The implementation of refueling tool vision system-based sensing in geosynchronous orbit requires cameras suitable to the task, the environment and the journey to orbit. Video devices tend to be sensitive to extreme temperature ranges, radiation exposure and other aspects of the environment and require extensive qualification testing to demonstrate suitability for the application. Most video devices are designed for consumer or industrial applications and require additional shielding and/or repackaging or reworking for material substitution to meet requirements for the geosynchronous environment. As such, the range of qualified video devices available to the design is limited, and in particular the highly miniaturised video devices ubiquitous in hand held computers are not now, nor likely in the foreseeable future to be suitable for use in geosynchronous orbit. Qualified devices tend to be large compared to their counterparts in the consumer marketplace.

Managing multiple video streams is also challenging within the environment and requires video switching devices made specifically for the task, thereby representing another overhead to any approach involving a large number of cameras. Thus this design is based on a single operational camera view, with the critical nature of that single camera view requiring that it have a fully redundant backup.

Designing operations for camera views leads directly to a device that must operate almost entirely in the background of the image with respect to the target FDV, such that the FDV features can be seen at all times and the view does not become obstructed or unduly shadowed. For this reason, for example, wrenching with an open end wrench from the far side of the camera view is advantageous over wrenching from above with a socket.

Figure 2:
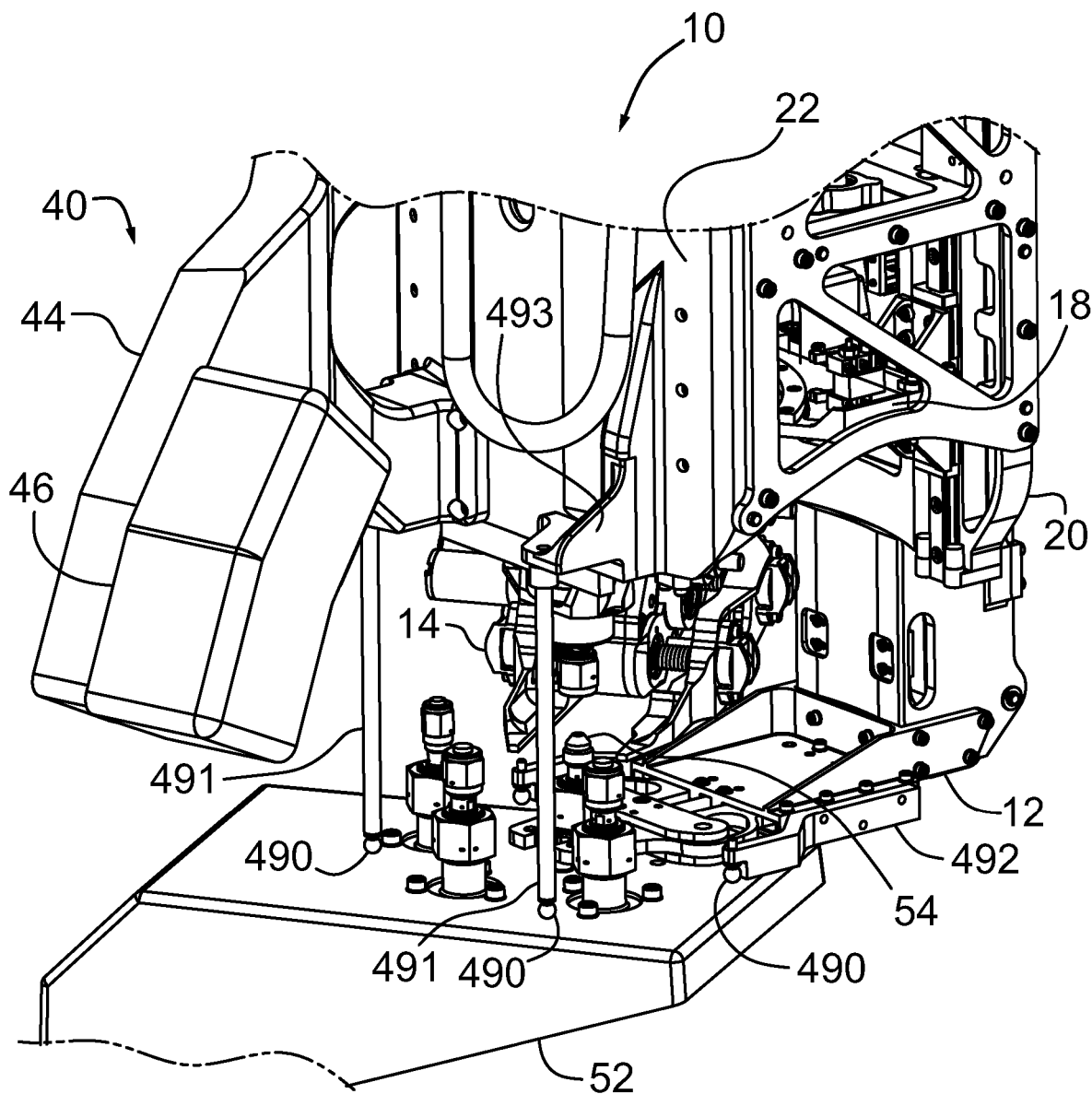
FIGS. 2 and 2A are perspective views of the refueling tool 10 aligned and registered with an FDV 54, in preparation for refueling.
Figure 2A:
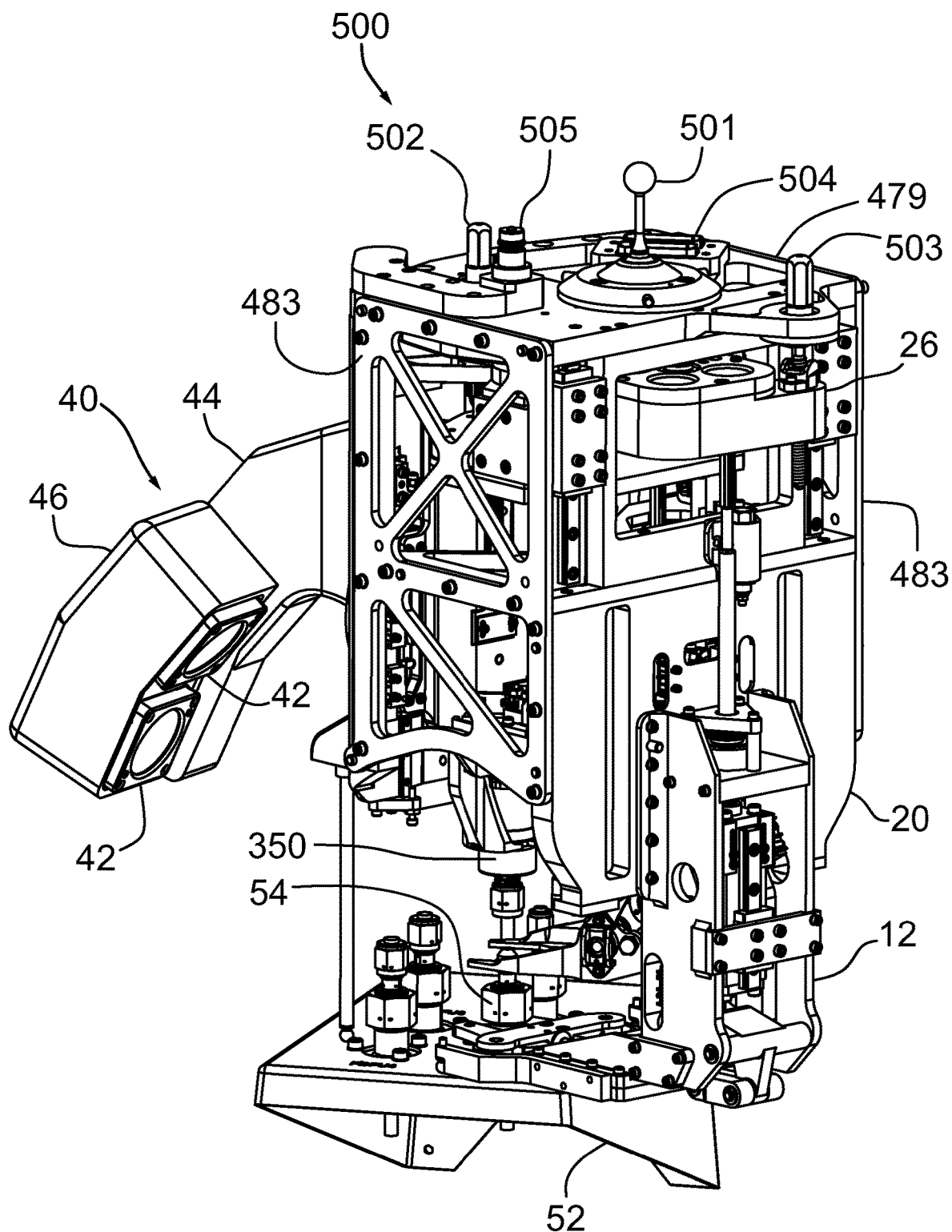
Figure 3A:
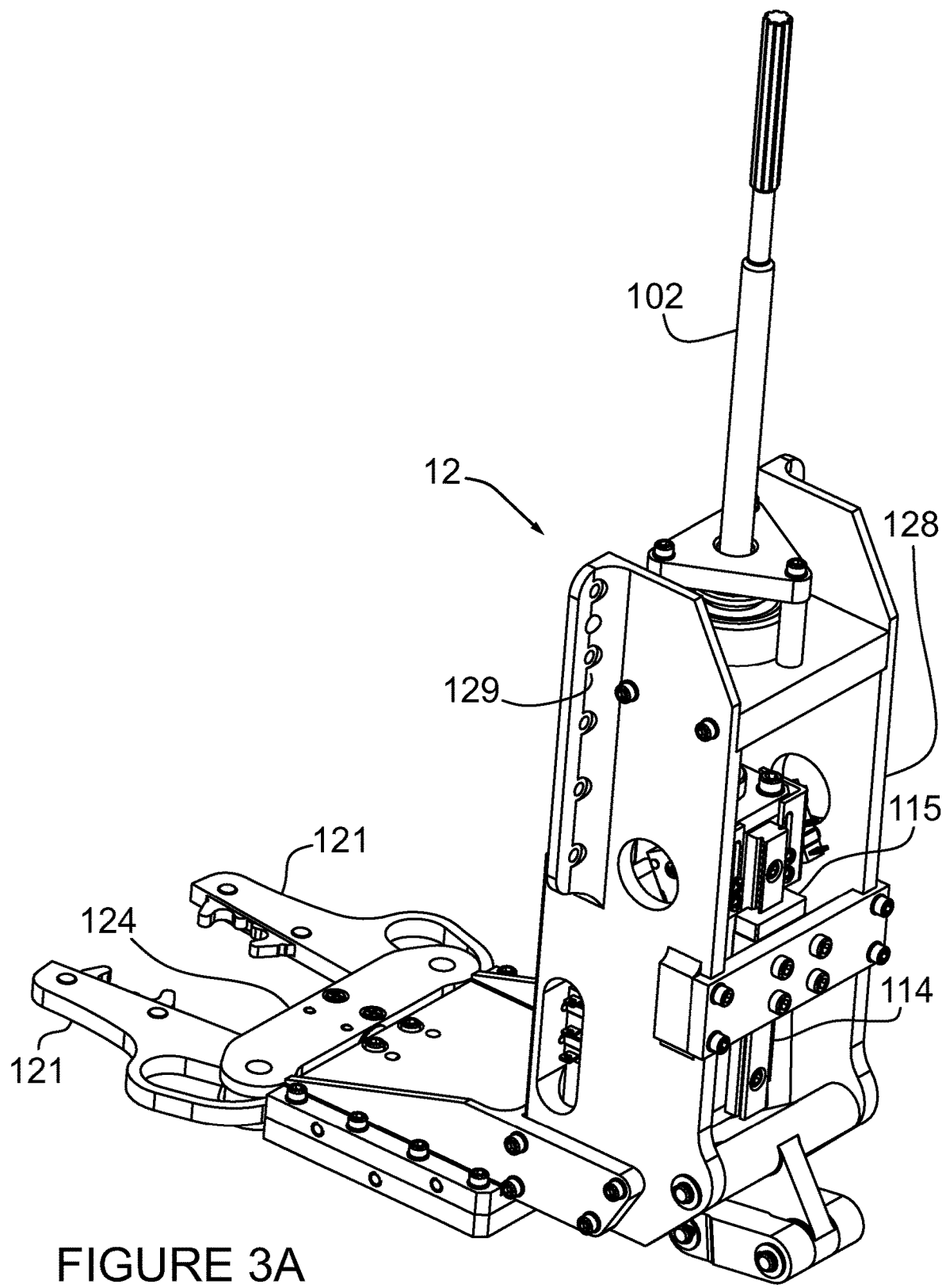
FIG. 3A is a perspective view of mechanism A 12.
Figure 3B:
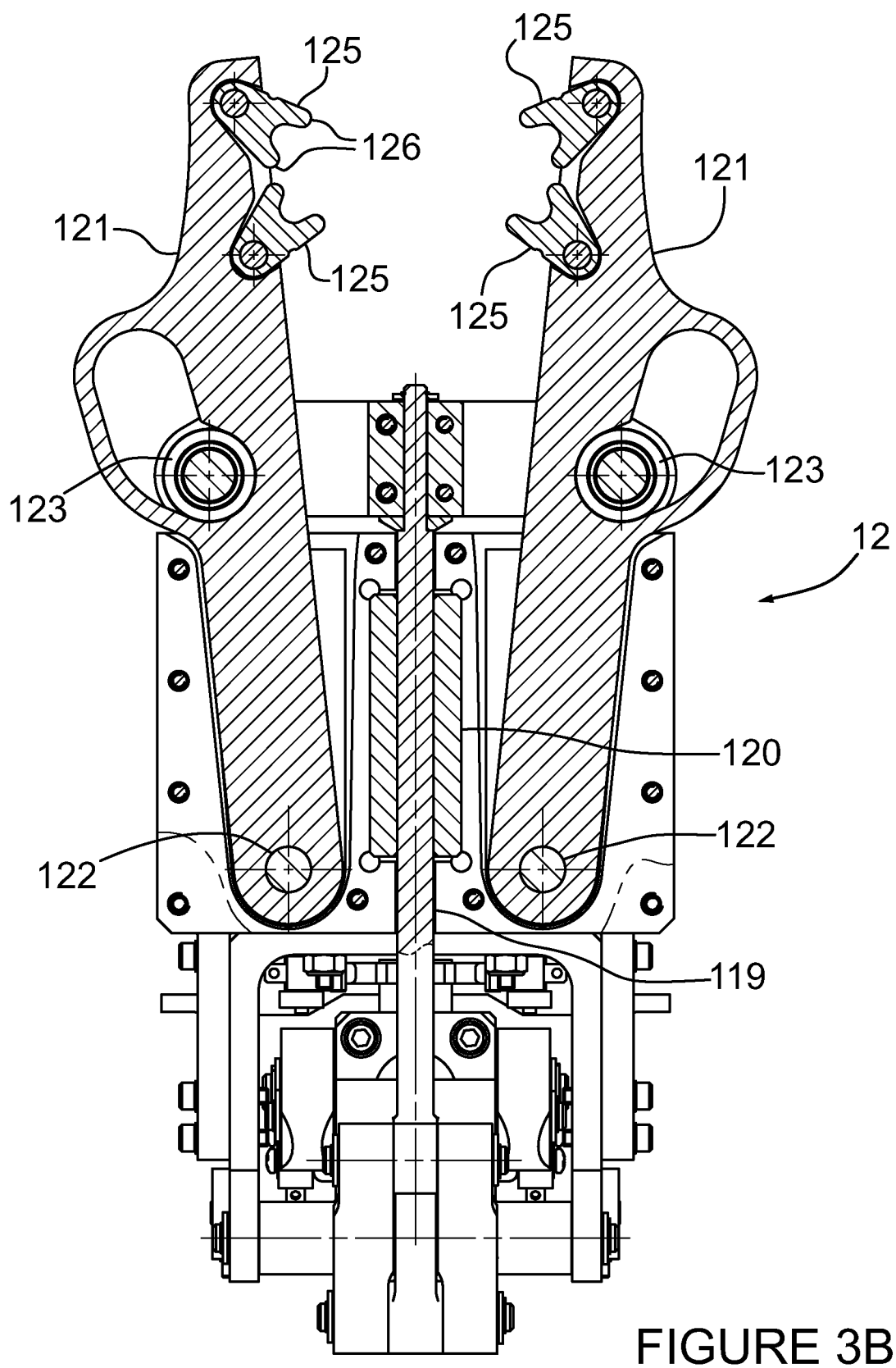
FIG. 3B is a view of the underside partially sectioned to show the arrangement of jaws 121, rollers 123 and grippers 125.
Figure 4A:
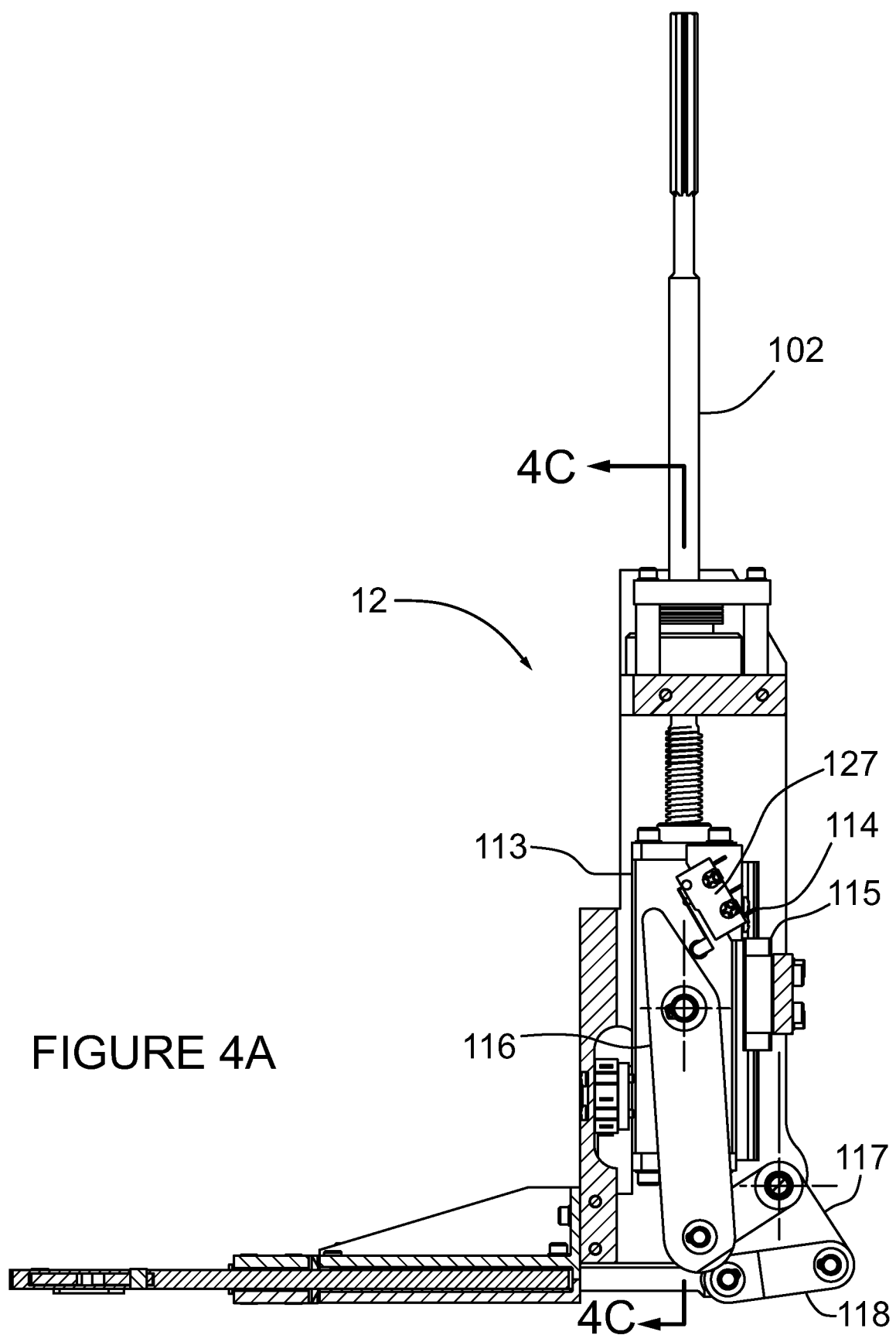
FIGS. 4A, 4B and 4C are shows section views of mechanism A 12, including the tension assembly 113 and drive link 116, rocker 117 and connecting links 118.
Figure 4B:
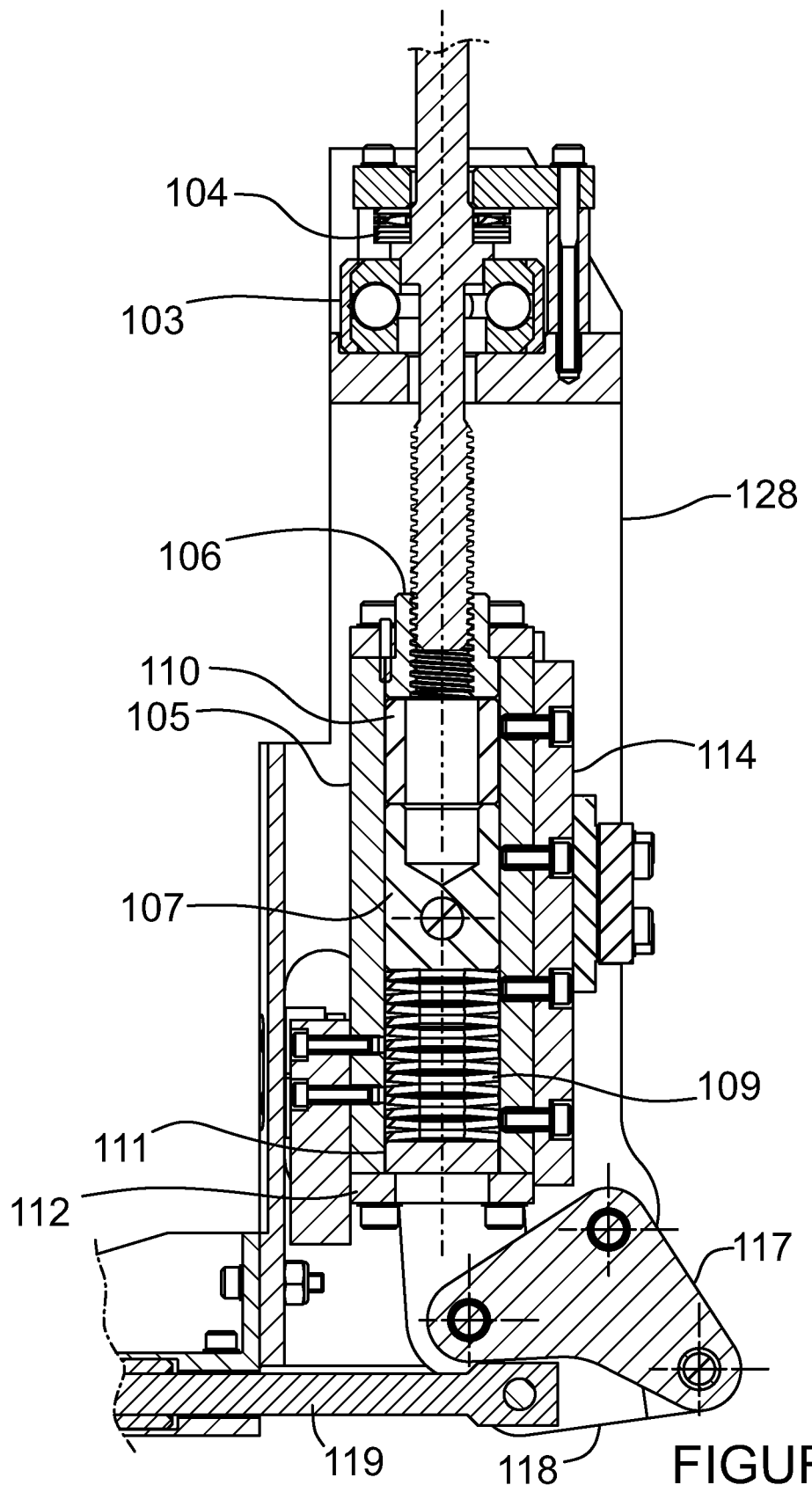
Figure 4C:
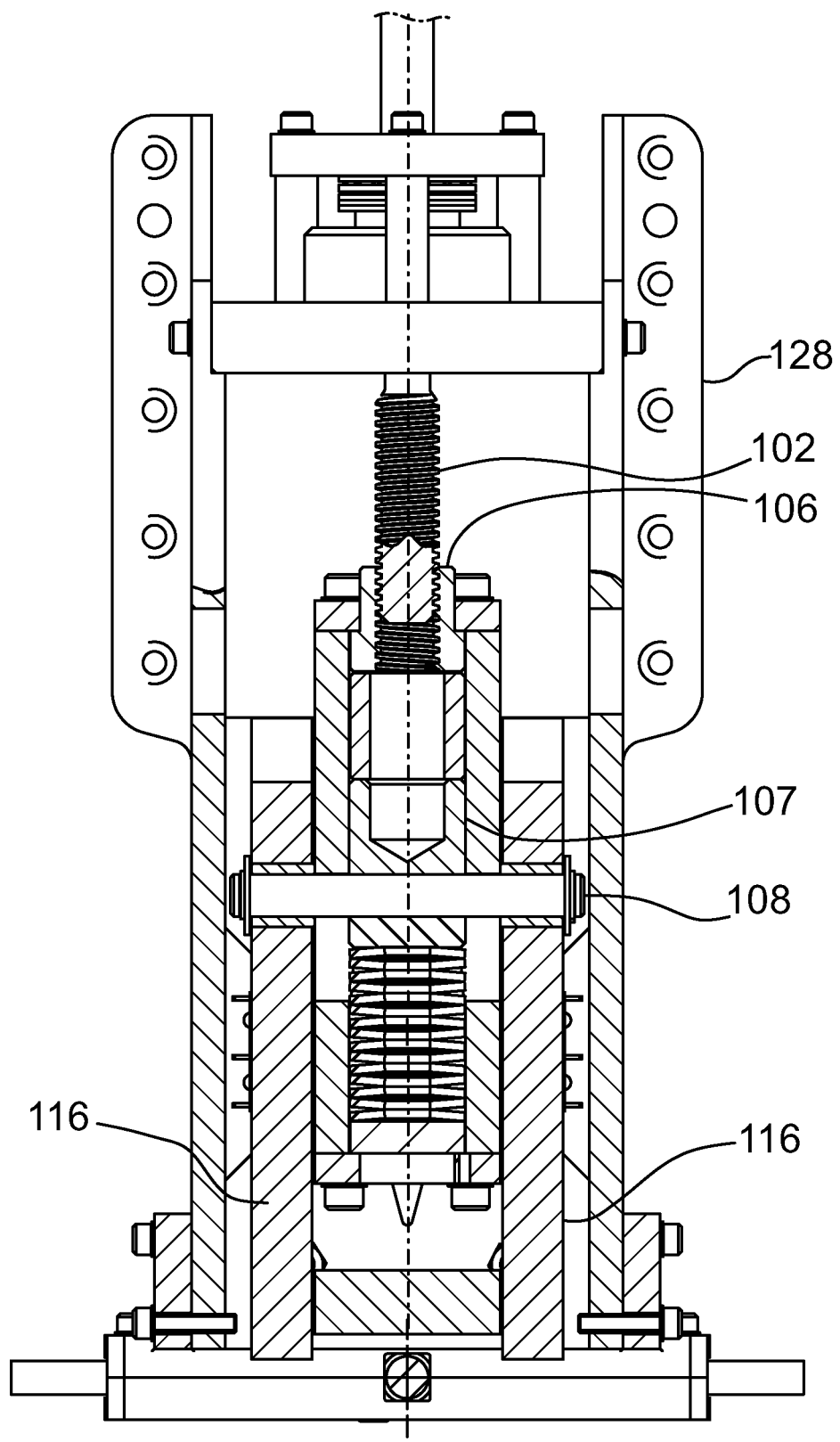
Figure 6A:
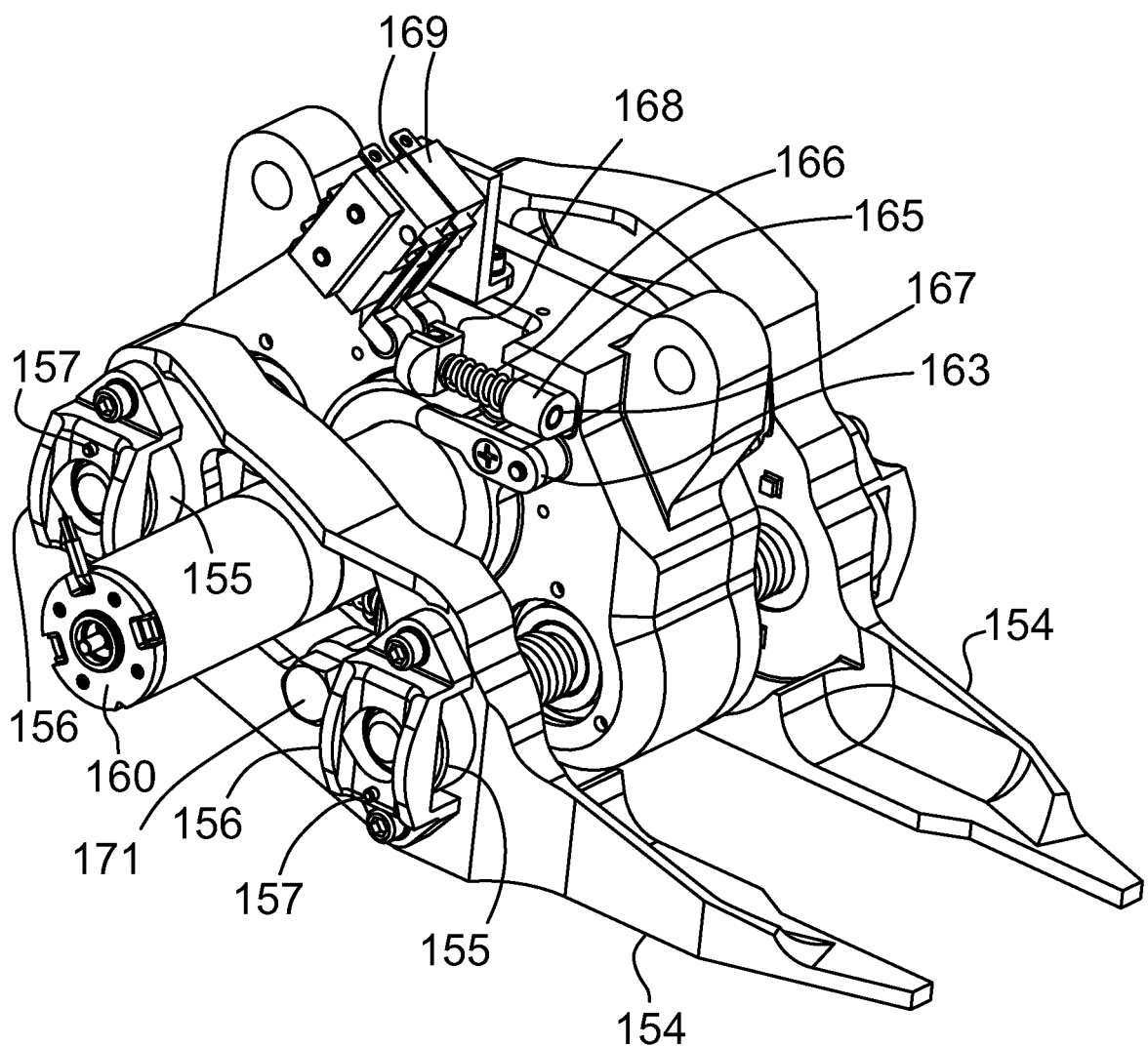
FIGS. 6A and 6B are perspective views of mechanism B1 14.
Figure 6B:
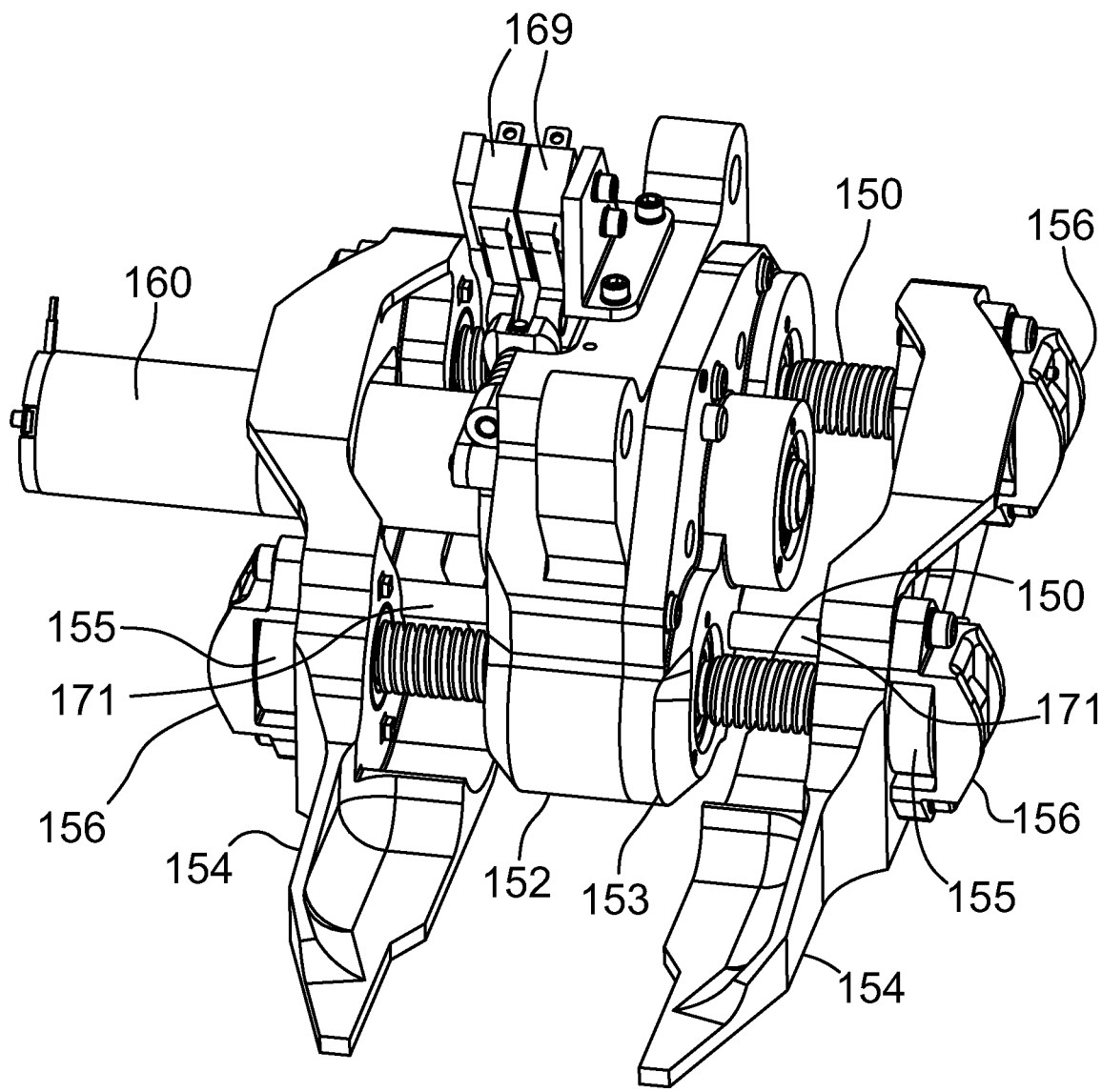
Figure 6C:
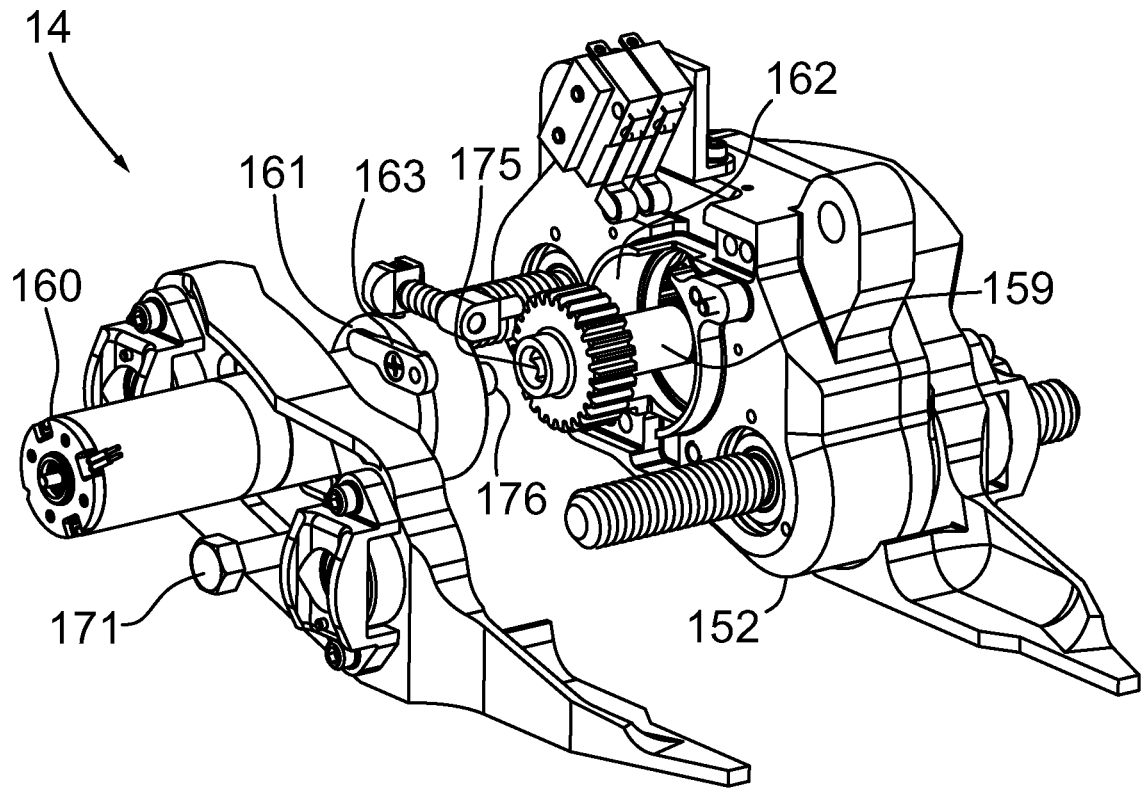
FIG. 6C is an exploded view showing details of the B1 actuator mounting arrangement.

The present disclosure is shown in FIGS. 2 and 2A. Refueling tool 10 is depicted in the process of servicing one of four FDVs 54 arranged in a symmetrical pattern on a typical FDV bracket 52. Note that one of four the FDVs 54 is shown part way through a refueling operation, wherein the B-nut has been removed and safety valve 350 is about to be installed. Cameras 42, beneath camera shield 46 are arranged on camera bracket 44 such that each camera has a complete view of the worksite and all interactions between the refueling tool and the target FDV. Alternatively, a prime and redundant camera pair could be implemented with a single lens and a beam splitter, thus affording each camera the ideal view rather than each camera having a view that is compromised for the sake of the other camera.

The cameras shown are representative of visions systems in the broader sense. A complete refueling tool vision system may be as simple as a single camera intended for a human operator, or may comprise a suite of optical sensors including but not limited to cameras, lidar and laser range finders more suitable to an automated, machine vision-based system. Additionally, a single camera may be used in conjunction with a detailed optical survey performed by another tool or apparatus on the robotic arm, such that the camera view relates the tool position to the target FDV within a computer generated 3D rendering. In this sense a refueling tool vision system-based architecture encompasses any optical system used in conjunction with a human or machine operator to validate the successive states of the refueling operation.

Also visible in FIG. 2 are four contact spheres 490, one on each of two touchdown rods 491 and two touchdown arms 492, one of the touchdown rods mounted to camera bracket 44 and the other to touchdown bracket 493, the purpose of the contact spheres being to indicate contact between the refueling tool and the FDV bracket 52 via force/moment sensing and control or other means within the robotic arm 84. The contact spheres, touchdown rods and arms shown are representative of a means of touchdown sensing and could alternatively employ other technologies including but not limited to proximity sensing and sensing by mechanical actuation of switches by either direct or indirect means.

FIG. 2A also shows the elements of refueling tool end effector interface 500, namely, grasp fixture 501, first rotary input shaft 502, second rotary input shaft 503, electrical connectors 504 and quick connect nipple 505. The refueling tool consists essentially of a collection of mechanisms, each with a specific function, namely, mechanism A 12 for registering to and clamping onto valve body 56 and torque reaction flats 58, mechanism B1 14 for closing and opening the wrench, mechanism B2 18 for rotation of the wrench, mechanism C 20 for elevation adjustment of the rotating wrench, and mechanism D 22 for connection of the refueling system to the nipple of the target FDV. Each mechanism requires one independent actuation, except for mechanism D which requires two.

Mechanism B1 for closing and opening the wrench is compliantly mounted to mechanism B2 for wrench rotation, which is in turn is mounted to mechanism C for wrench elevation. Mechanism A for registration and clamping onto the valve body is also mounted to mechanism C. This sub-structure forms the torque reaction loop that ensures torque induced by rotating the wrench is reacted at the valve body via the torque reaction flats, as required. This sub-structure is connected to mechanism D, which includes the refueling delivery system and refueling tool top plate 479, which includes the end effector interface by bolted and pinned connections to side plates 483, thus forming the complete refueling tool assembly or structure.

Requiring a high number of separately controlled actuations could be considered a detriment to this design approach, particularly if each requires a discrete actuator, as drive electronics for the discrete actuators may reside on the robotic arm, with the associated interconnections passing separably through the electrical connectors of the end effector of the robotic arm and the refueling tool.

The end effector of the robotic arm optimally has two external tool drives, since the majority of tools used in the complete refueling operational concept are passive, externally driven devices requiring one tool drive input for stowing and un-stowing and a second tool drive input for operation of the mechanism, the passive tools (site preparation and refueling support tools discussed herein after) including but not limited to those for cutting and manipulating thermal blankets, cutting and removing lock wire and removing B-nuts and crush seals.

In order to minimize the number of discrete actuators, associated drive electronics, and separable electrical interconnections, a power transmission device 26 moveably located adjacent to the refueling tool end effector interface is used to selectively direct a first end effector rotary drive shaft 502 to one of 4 discrete outputs, one for each of mechanisms A, B2, C and D. A second end effector rotary drive shaft 503 is used to actuate the transmission device, the actuation being for the purpose of selecting which of the mechanisms to connect to the first tool drive input. The power transmission device may optionally include additional mechanisms to perform additional actuations within the refueling tool, such as stowing and un-stowing of the refueling tool.

Each of the aforementioned mechanisms, and other elements of the current disclosure are further described in the paragraphs below.

Mechanism A, Register and Clamp, 12

Referring to FIGS. 3A, 3B and 4A and 4*b*, mechanism A is driven in a closing motion by clockwise rotation of input shaft 102 supported between lower thrust ball bearing 103 and upper thrust needle roller bearing 104, the former selected for the high thrust loads induced by mechanism A clamping and the latter for the comparatively low thrust loads involved in driving the mechanism through free space to the fully open position. Clockwise rotation induces upwards motion of tension assembly 113 comprising tension housing 105, lead nut 106, piston 107 with cross pin 108, springs 109, spacers 110 and 111, end cap 112 and linear bearing rail 114. Cross pin 108 passes through slots on both sides of tension housing 105. Linear bearing block 115, mounted to mechanism A frame 128, guides motion of tension assembly 113 and maintains alignment with input shaft 102. Springs 109, being positioned between end cap 112 and piston 107, allow for continued upwards motion of the tension assembly after the rest of the mechanism has contacted the valve body and stopped moving, such continued motion being used to compress the springs and produce a predetermined level of clamping load.

Vertical motion of the tension assembly induces horizontal motion of pushrod 119 via drive links 116, rocker arm 117 and connecting links 118, the drive links 116 being connected to cross pin 108. Pushrod 119 is guided within bushing 120 which is contained within mechanism A frame 128. Mechanism A frame 128 forms the structural framework for aligning the refueling tool 10 to the FDV axis 60 via mechanism A mounting interface 129.

Mechanism A jaws 121 rotate on pivots 122 housed within body 128, and are driven to close symmetrically by rollers 123 contained within roller bracket 124, as the roller bracket is driven forward towards the target FDV by virtue of its connection to pushrod 119. Rollers 123 run inside closed slots within jaws 121 such that the rollers drive the jaws both in the close direction and in the open direction, the closed slots being shaped to produce a closing motion that is fast in the region of stroke allotted to centring, then much slower within the region of stroke devoted to clamping, this latter region designed to accommodate FDV bodies of various sizes and orientations. The slower closing motion within this region of stroke devoted to clamping affords a better mechanical advantage to the roller bracket 124.

Jaws 121 are each equipped with two grippers 125 which are free to rotate through approximately 10 degrees. Each gripper has two contact fingers 126 and as the jaws close around the base of FDV 54 one finger from each gripper will contact the cylindrical surface and the other the torque reaction flat 58 on valve body 56. This arrangement allows the grippers to close around a range of valve body diameters in two distinct orientations; with torque reaction flats parallel to the mechanism A pushrod and with torque reaction flats perpendicular to the mechanism A pushrod as depicted in FIGS. 5A, 5B, 5C, 5D, 5E, 5F and 5G, Prime and redundant microswitches 127 mounted to tension assembly 113 change state from closed to open when springs 109 have reached the desired compression, the switches informing the operator of the latched condition.

Mechanism B1, Wrench Closing/Opening, 14

Referring to FIGS. 6A, 6B, 6C, 7A, 7B, 8A and 8B, mechanism B1 is a wrench close/open device based on twin lead screws 150 with right hand thread and left-hand thread on opposing ends, in a parallel screw clamp arrangement such that similarly handed threads are on each side of the assembly with right hand threads on the actuator side. Two wrench jaws 154, each housing two similarly handed lead nuts 155, are mounted onto the corresponding lead screw threads on each side of the mechanism B1, the wrench jaws being configured such that the location where the wrench jaws intersect the FDV axis 60 lies on a line formed by the lead screw centres. Each lead nut 155 is retained by nut clamp 156, the lead nut being free to rotate within the wrench jaw and the nut clamp during initial setup in order to establish a parallel arrangement of the wrench jaws. The lead nuts are locked from rotation thereafter by drilling holes through the nut clamps, lead nuts and wrench jaws and installing locking pins 157.

The need for B1 actuation to be independent of other mechanism motion, most notably wrench rotation, combined with the complexity of motion of the B1 actuation axis, provides ample justification for a discrete actuator for this mechanism.

Figure 7A:
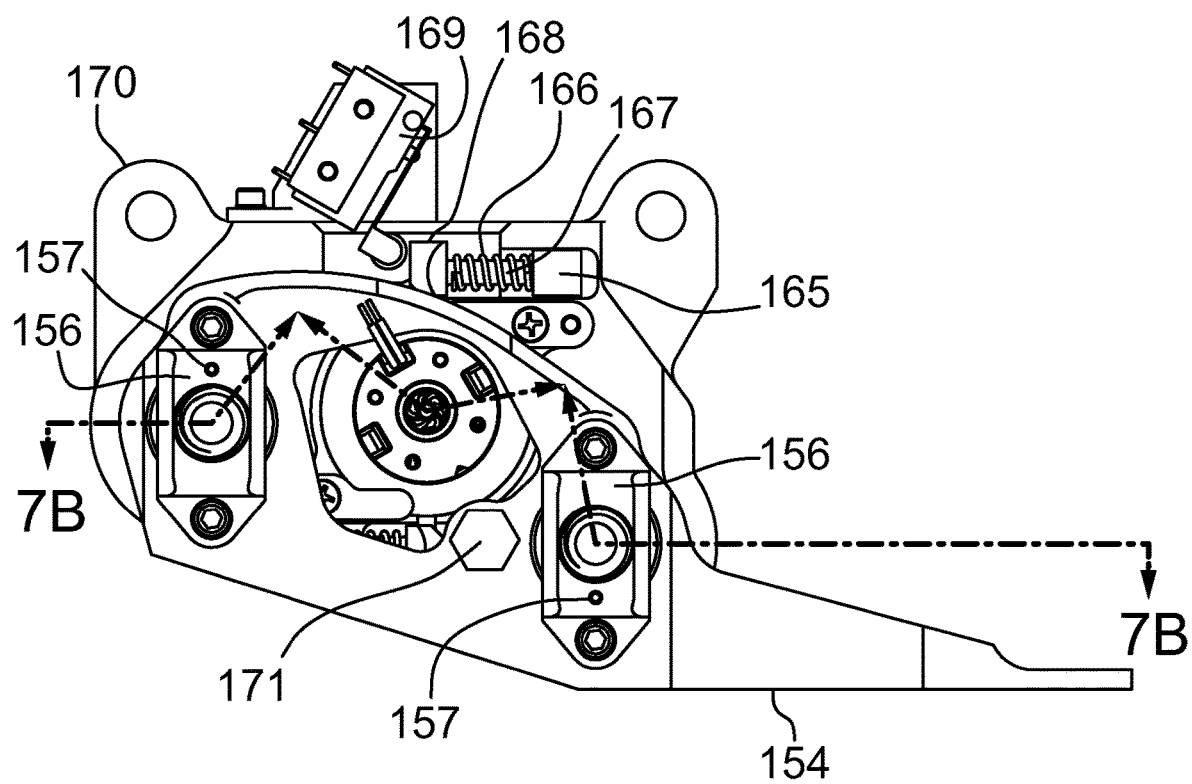
FIG. 7A is an orthographic view of mechanism B1 14.
Figure 7B:
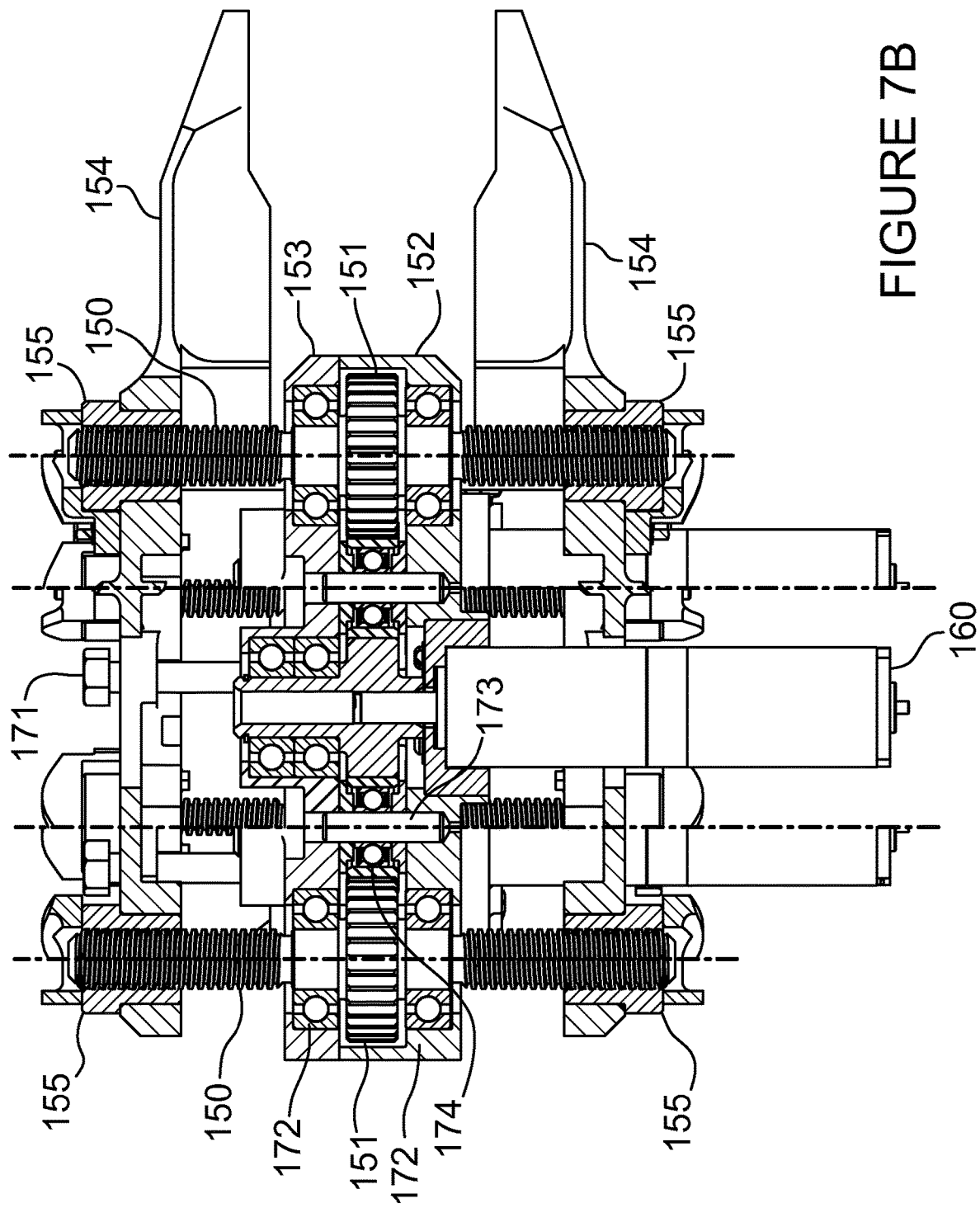
FIG. 7B is a folded section through all rotation centres.
Figure 8A:
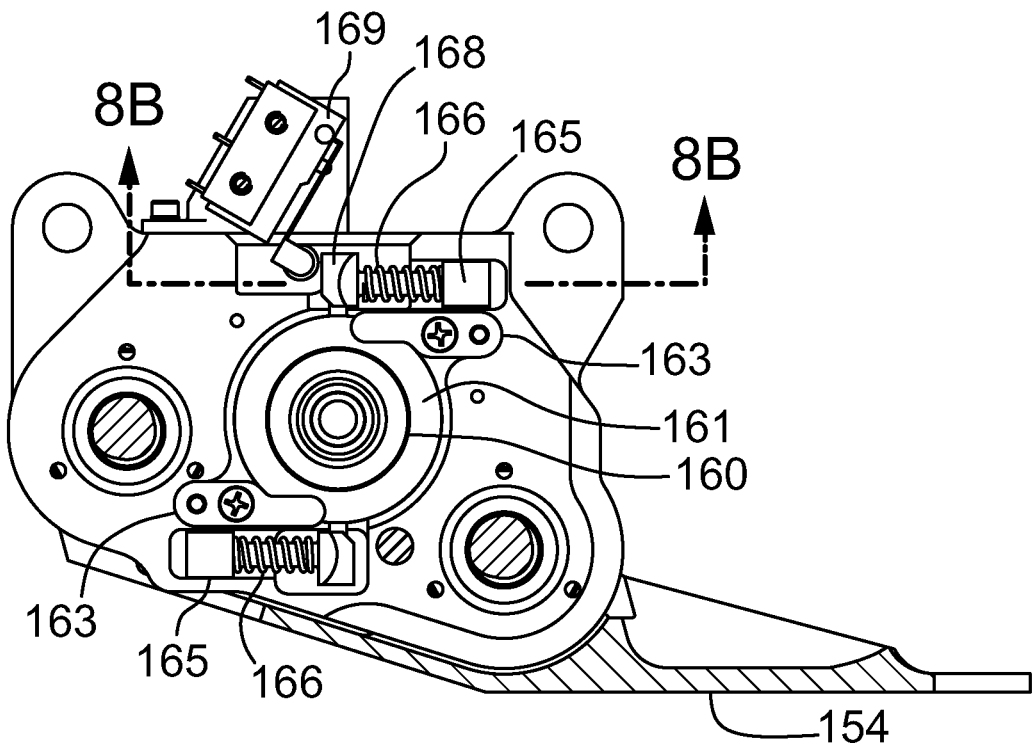
FIGS. 8A, 8B and 8C are section views of mechanism B1 showing the spring plungers related to the auto-stop feature of wrench closing.
Figure 8B:
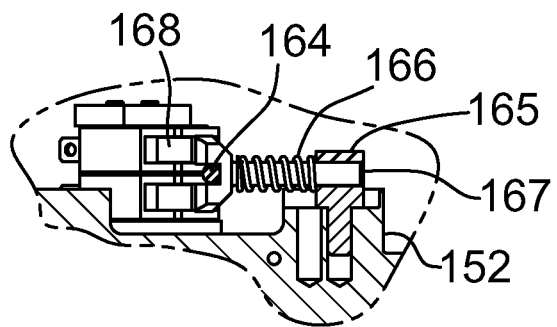
Figure 8C:
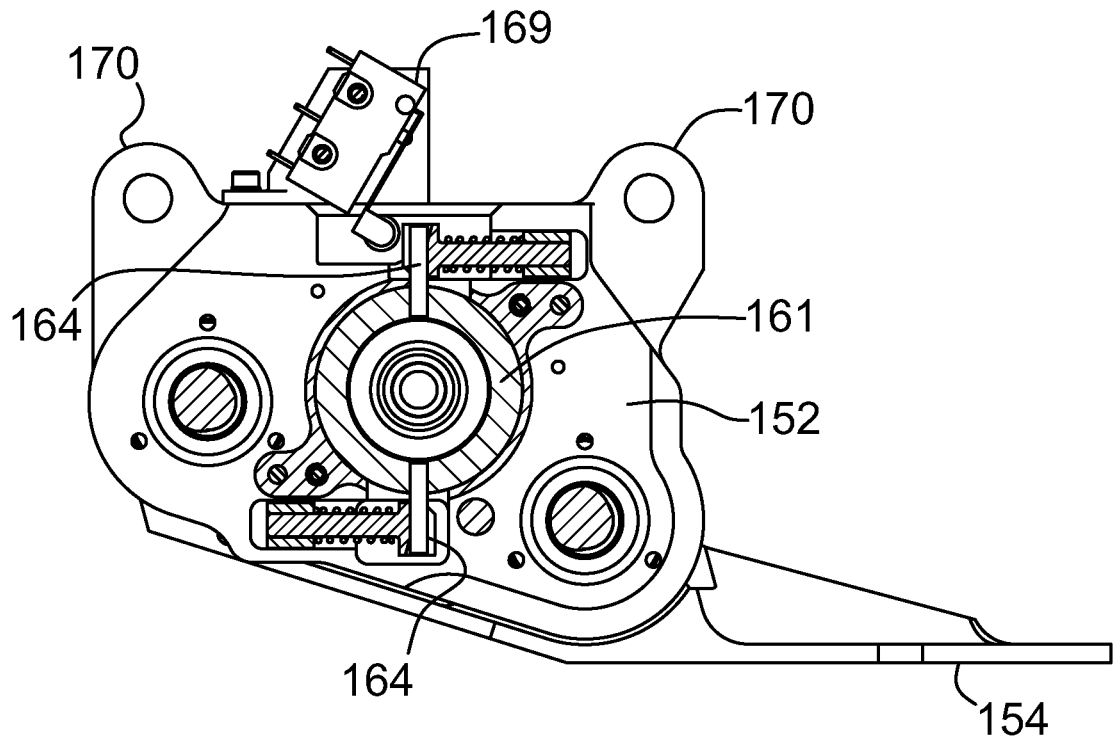
Figure 8D:
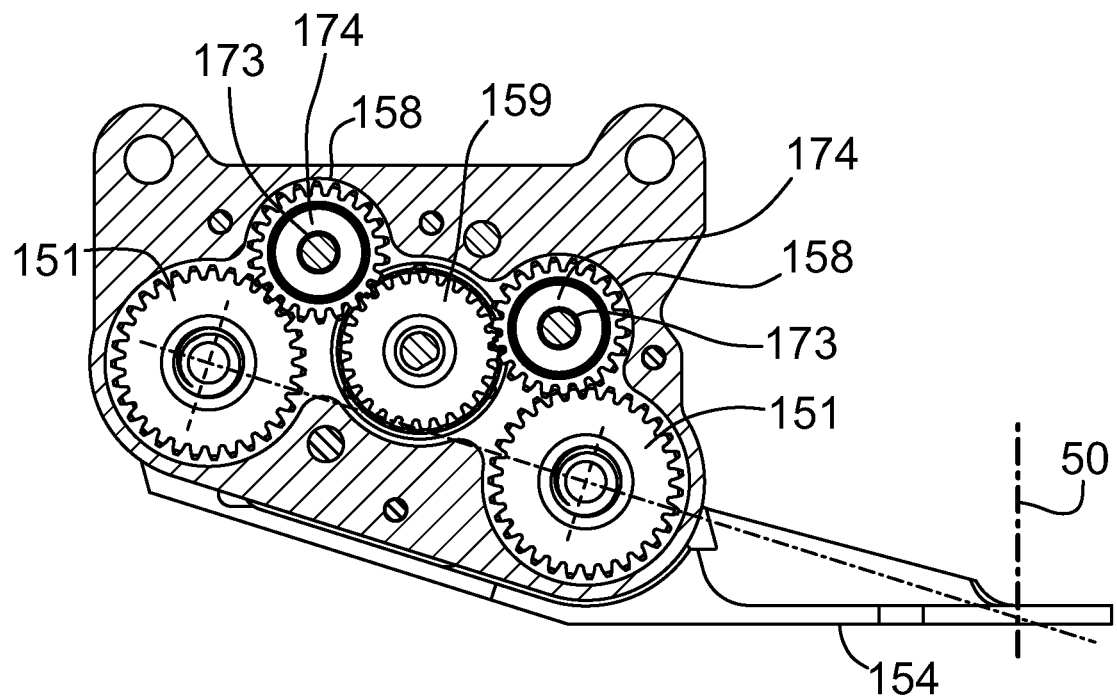
FIG. 8D shows the gear train of mechanism B1.
Figure 9A:
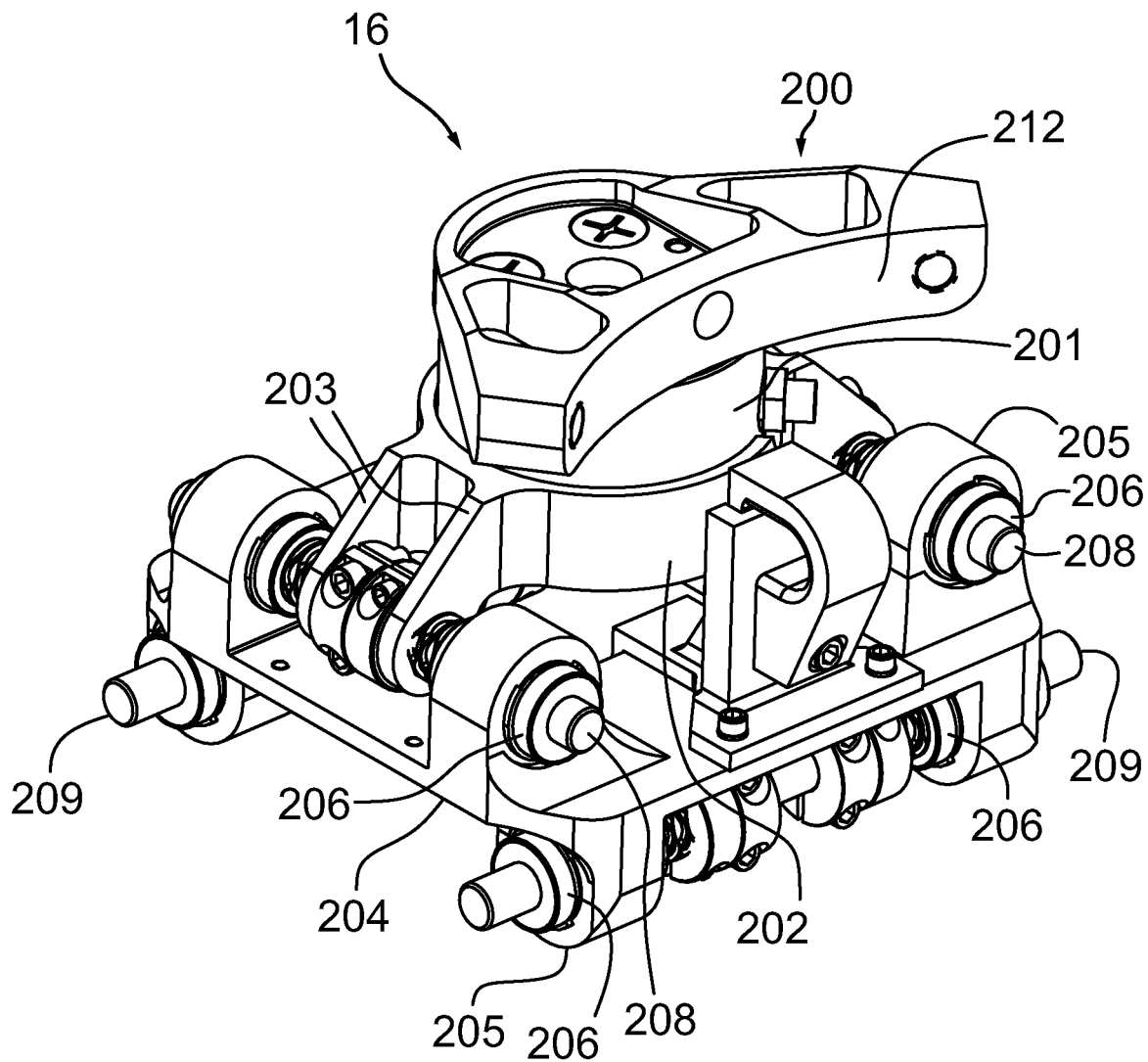
FIGS. 9A and 9B are perspective views of compliance mechanism 16, the latter including the relationship to mechanism B1 14.
Figure 9B:
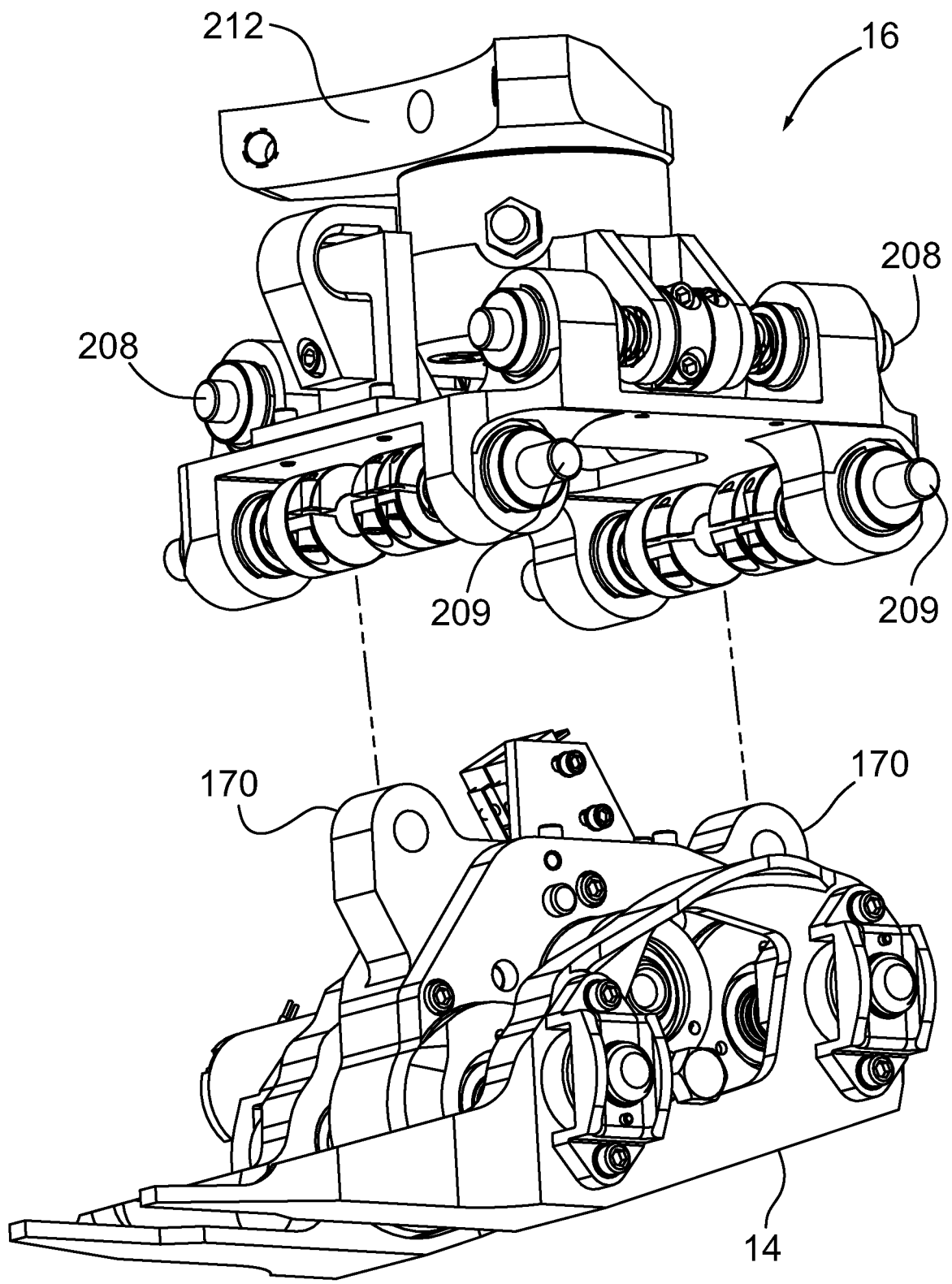
Figure 10A:
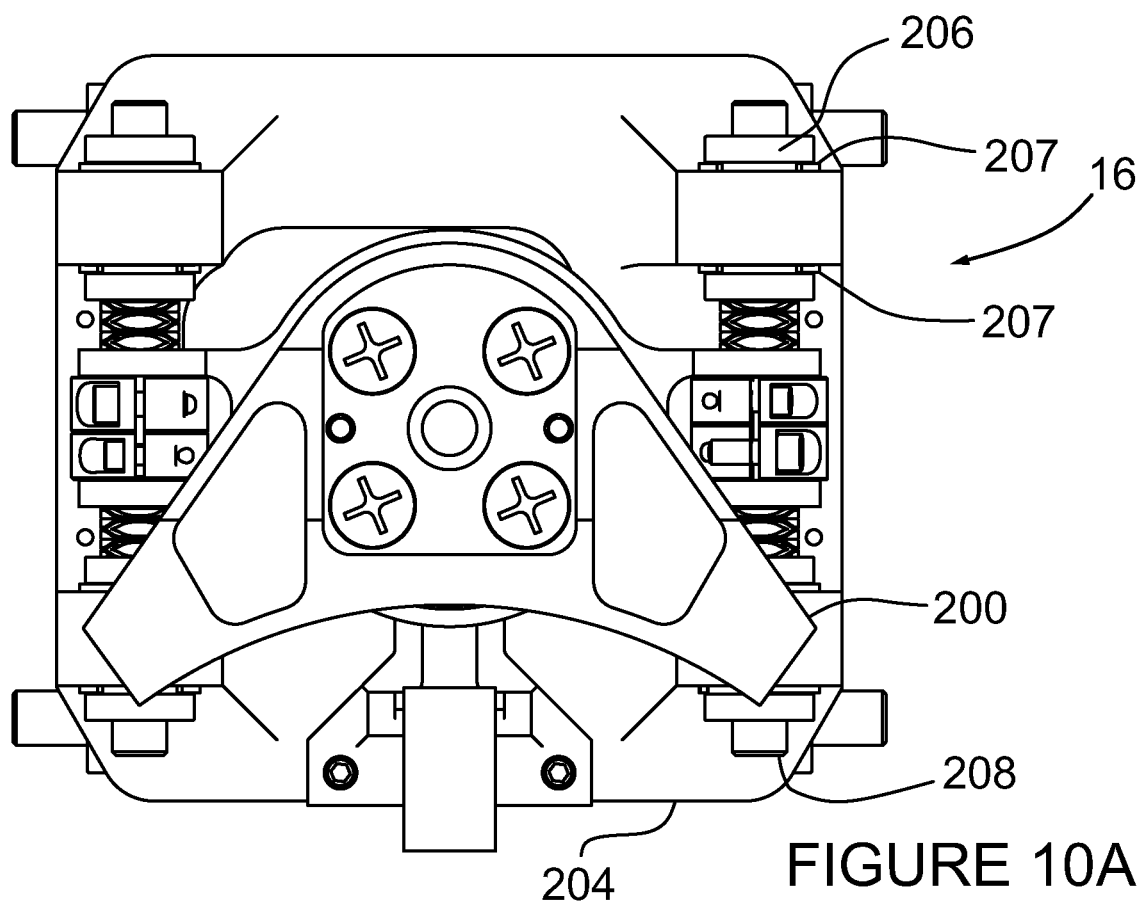
FIGS. 10A, 10B and 10C are orthographic views of compliance mechanism 16.
Figure 10B:
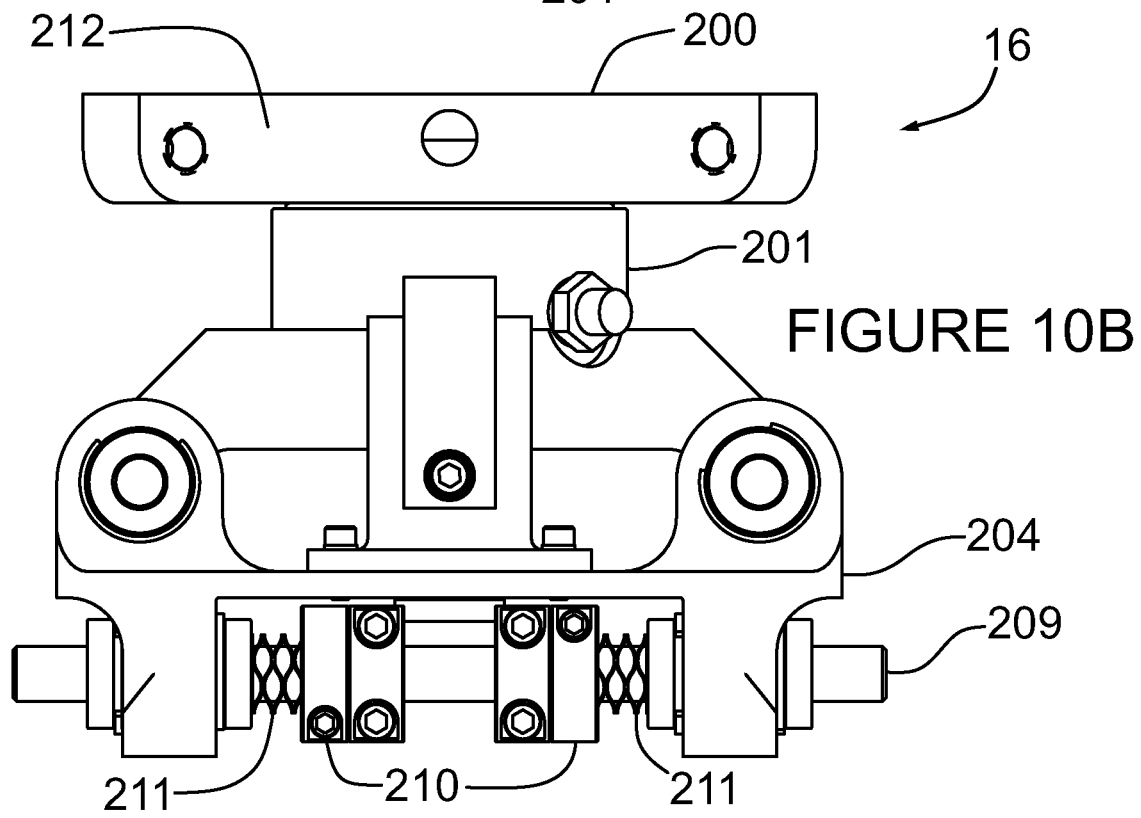
Figure 11B:
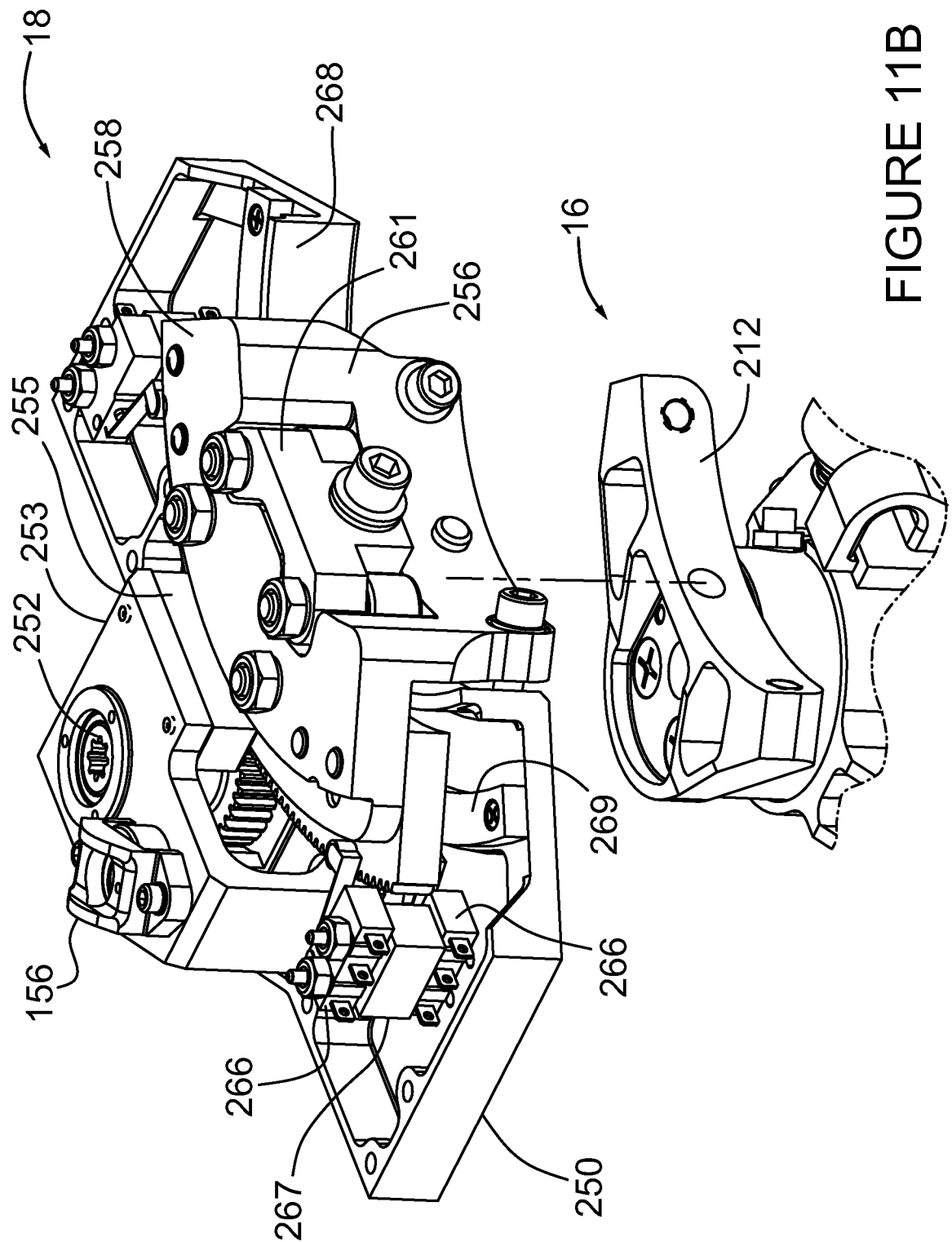
FIGS. 11A and 11B are perspective views of mechanism B2 18, the latter including the relationship to compliance mechanism 16.
Figure 10C:
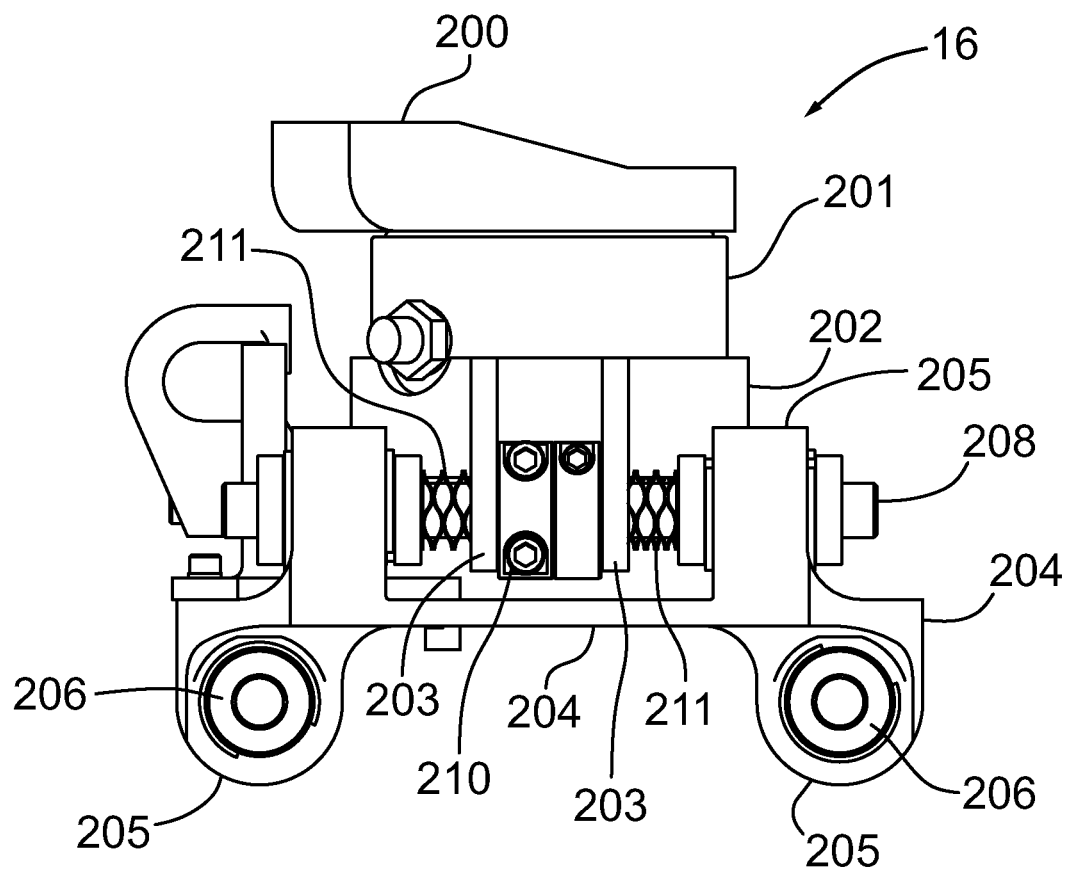
Figure 11A:
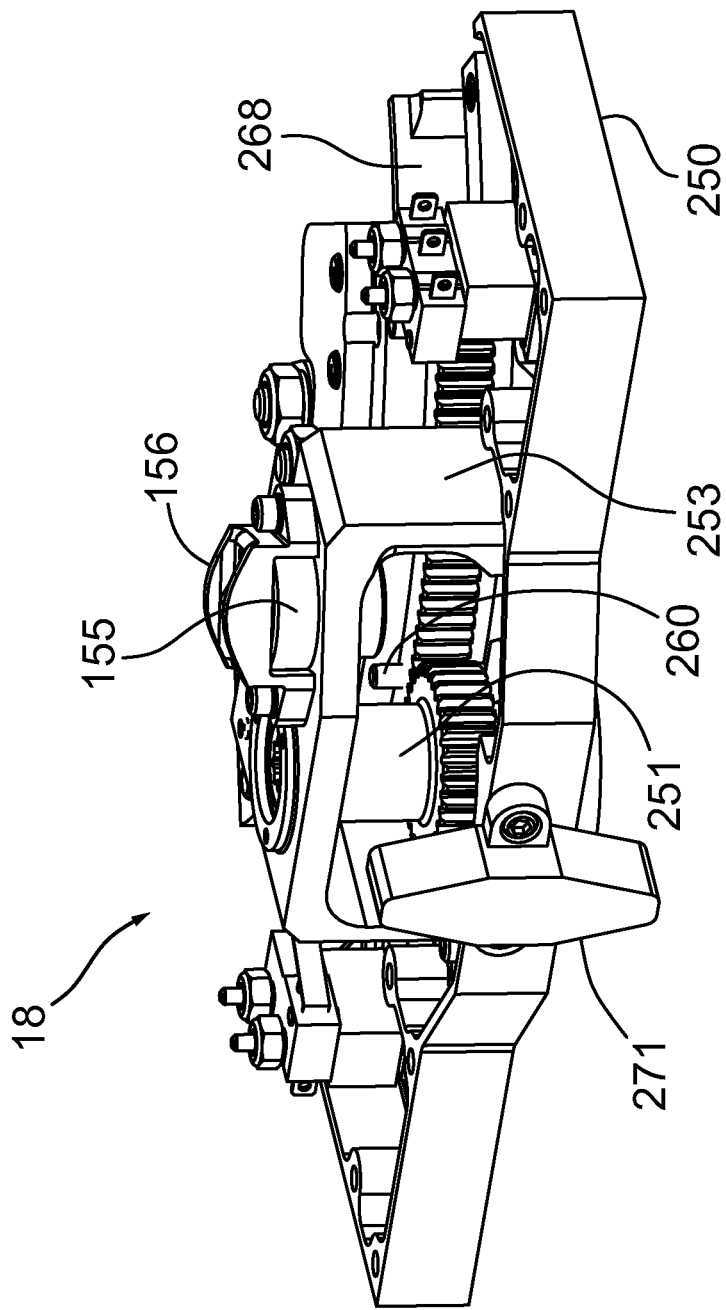
Figure 12A:
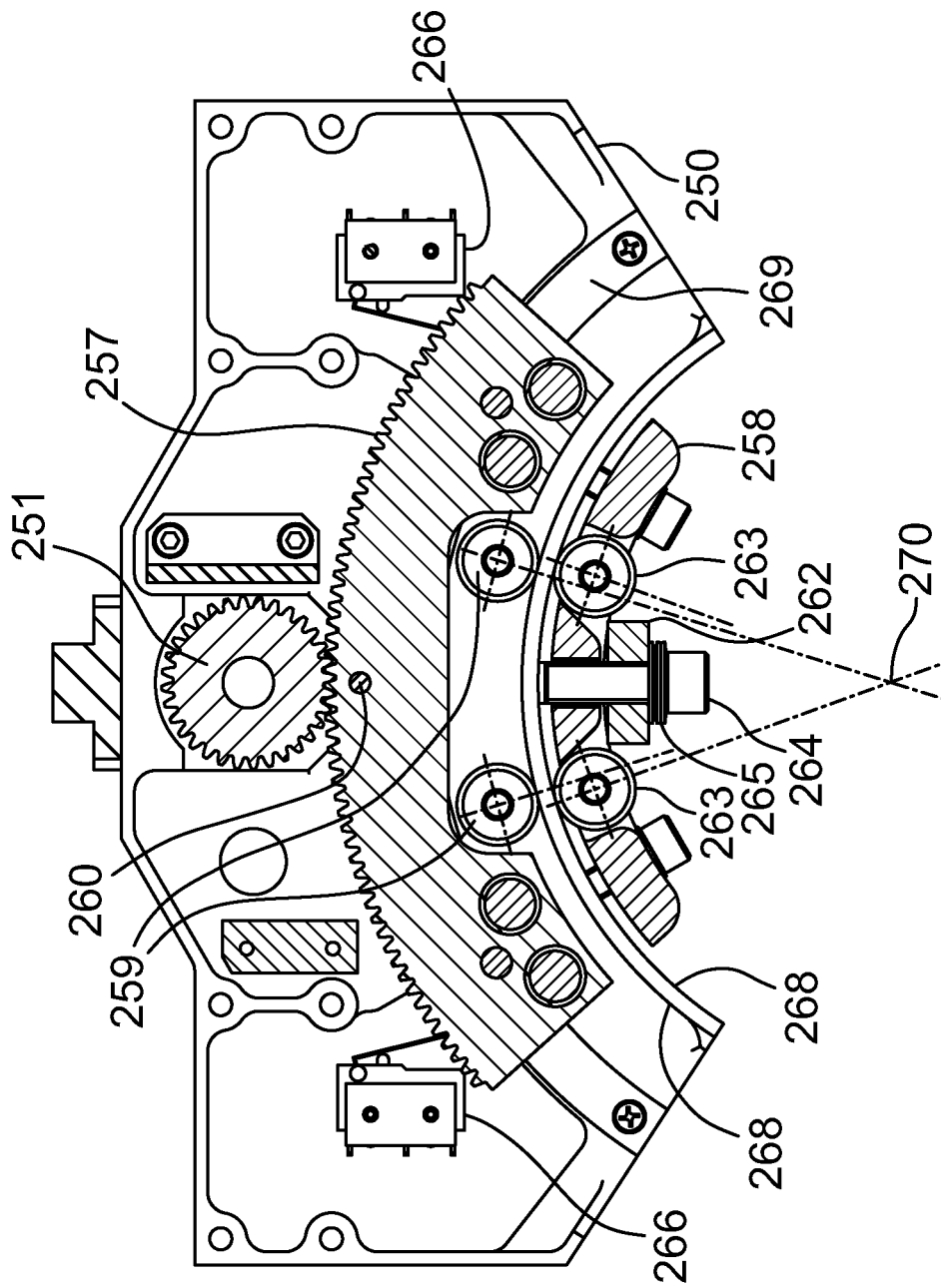
FIGS. 12A and 12B are orthographic views of mechanism B2 18.
Figure 12D:
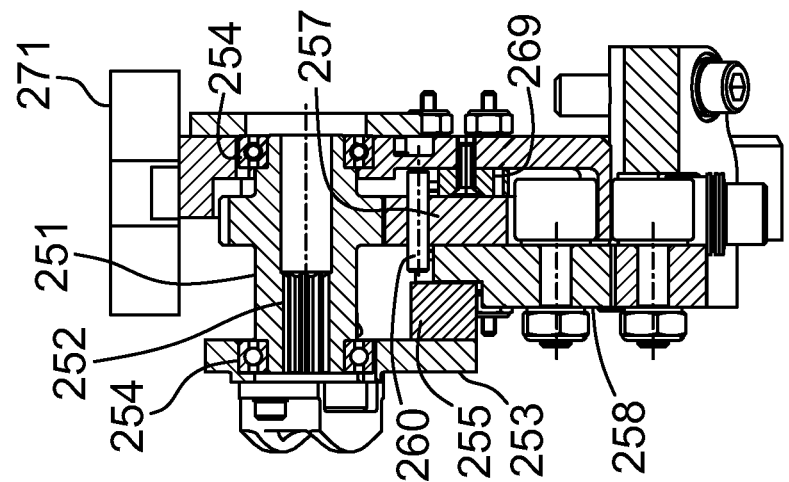
FIGS. 12C and 12D are section views of mechanism B2 18.
Figure 12C:
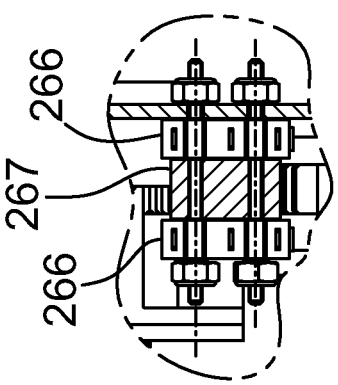
Figure 12B:
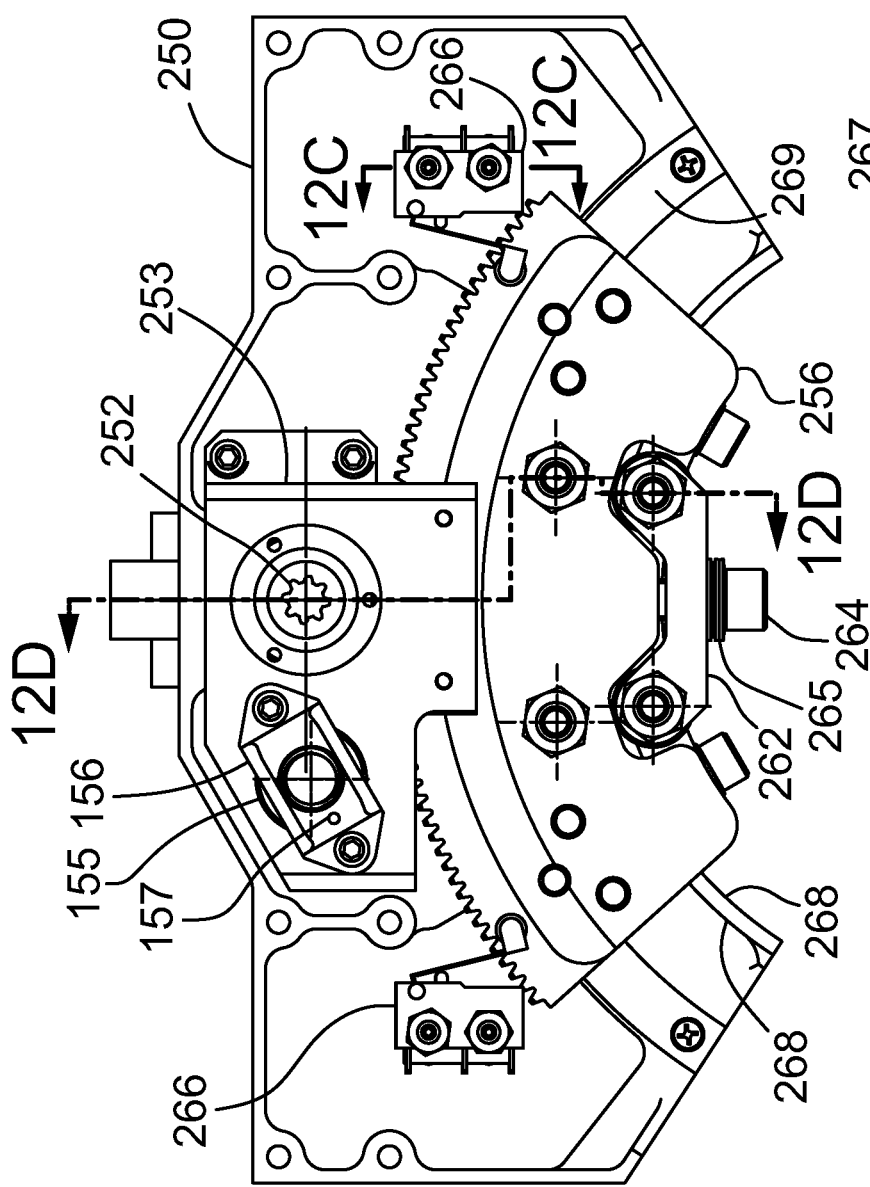
Figure 13A:
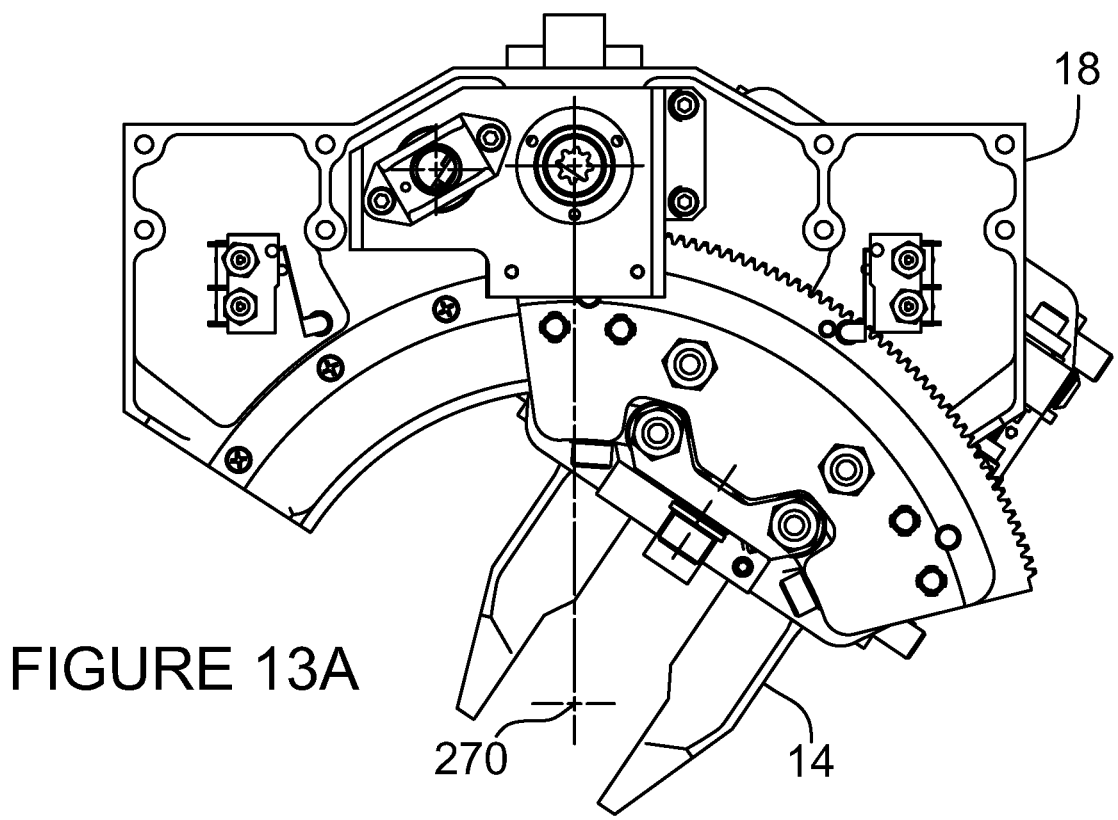
FIGS. 13A and 13B shows mechanism B2 18 with compliance mechanism 16 and mechanism B1 14 at clockwise and counter-clockwise travel limits.
Figure 13B:
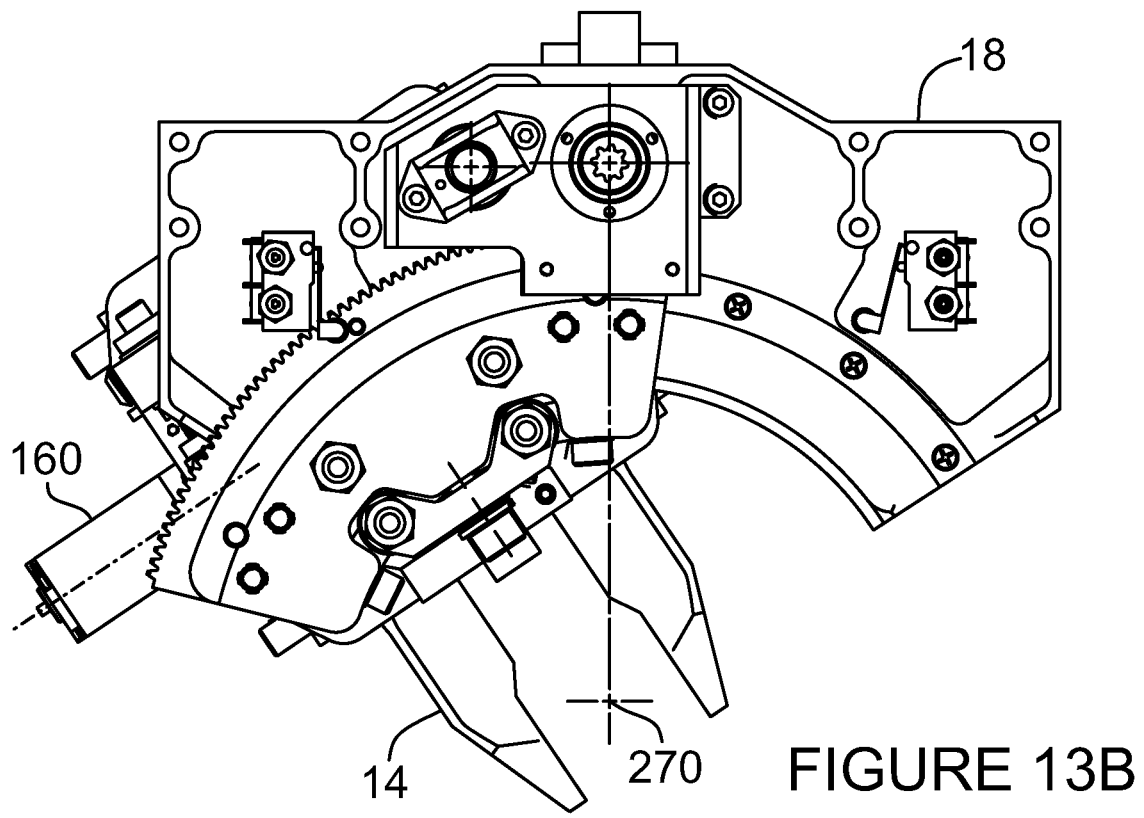

Mechanism B1 housing 152 and B1 cover 153 enclose and locate the central gear 151 of each lead screw via bearings 172, one in each of the housing and cover and two idler gears 158 via idler shaft 173 and idler bearing 174. B1 drive input gear 159 is supported via a pair of bearings 172 located side by side within the cover, thereby permitting the axis of the drive input gear to be exposed through an opening in the B1 housing. Referring to FIG. 7A, the B1 drive input gear has, on the exposed drive axis, a torque reacting recess 175 precisely manufactured to accept torque reacting shaft 176 of B1 drive actuator 160, the torque reacting recess in this embodiment being in the form of a shaft with a flat. The mechanism B1 housing 152 provides a unique mounting arrangement for B1 drive actuator 160, which is coaxially mounted to a puck-shaped adaptor 161 made of self-lubricating material. This adaptor is located and contained within a corresponding recess 162 in the mechanism B1 housing 152, and retained therein by two retaining clips 163. The adaptor is fitted with two pins 164 oriented radially on opposing sides of the adaptor such that the pins are coaxial. B1 housing actuator recess 162 has cut-outs to accommodate the radially opposed pins and to allow for rotation of the actuator adaptor with the pins on the order of 15 degrees. Two spring plunger assemblies, each comprising a post-mounted plunger guide 165, compression spring 166 and plunger 167 with bifurcated head 168 are arranged tangentially to the B1 housing actuator recess 162 with the bifurcations straddling the radially opposed pins such that both spring plunger assemblies exert a counter-clockwise torque on the actuator adaptor as viewed from the end of the actuator opposite to the actuator shaft. The torque forces the radially opposed pins to be seated against one end of the B1 actuator recess cut-outs and collectively the fit and retention of the actuator adaptor within the B1 actuator recess in conjunction with the arrangement of spring plunger assemblies allows the actuator mounted on the adaptor with the radially opposed pins to rotate clockwise within the B1 housing actuator recess in opposition to the tangentially arranged spring plungers when the wrench jaws have closed on an object or have reached the end of travel in the closed direction.

One of the spring plungers with bifurcated head 168 interacts with a pair of microswitches 169 such that the switches are closed when the spring plungers are fully extended, becoming open as the spring plungers are compressed, the actuator being commanded to stop when the microswitches change to the open state. This arrangement causes the actuator to shut off at a predetermined torque value regardless of position within the mechanism stroke, the torque value being determined by the selection of springs for the spring plungers.

Shoulder bolts 171 installed through the wrench jaws into the B1 housing and B1 cover define travel limits of the wrench jaws in the closed direction.

Two mounting lugs 170 on B1 housing 152 provide a means for attachment.

Compliance Mechanism, 16

Residual misalignment between the refueling tool wrench rotation axis and the FDV axis after clamping onto the FDV body could induce side loads on the FDV when the wrench is clamped onto the FDV, and also when the wrench is rotated. In order to minimize the side loads, a small range of spring-centred compliance is afforded by the compliance mechanism, in both radial and tangential directions.

Referring to FIGS. 9A, 9B, 10A, 10B and 10C, a rectangular coupling platform 204 features a coaxial pair of protruding lugs 205 along each of two parallel first edges on the upper side of the platform such that each lug is near a platform corner. A similar arrangement of coaxial pairs of protruding lugs 205 is similarly placed on the underside of the platform along two edges that are perpendicular to the first edges, the first edges being oriented radially with respect to the workspace of the FDV and the second edges being oriented tangentially with respect to the workspace. Ball bushings 206 are fitted into the protruding lugs on both sides of the platform, the bushings being secured to the protruding lugs by a bushing circlip 207 placed at both ends of the ball bushings, the circlips straddling the protruding lugs.

A first pair of precision shafts 208 is supported within the ball bushings on the upper side of the platform, one shaft per pair of coaxial pair of bushings, such that at least 3 mm of shaft extends beyond the outward ends of the coaxial pairs of bushings. Coupling bracket 202 is mounted onto, and straddles the first pair of precision shafts on the upper side of the platform via a pair of down-swept protrusions 203 symmetrically located on each of two sides of the coupling bracket, the pairs of down-swept protrusions being spaced to accommodate length-adjustable locking shaft collars 210 between them, the shaft collars being used to secure the coupling bracket to the precision shafts centrally between the pairs of ball bushings, adjustment of the length-adjustable locking shaft collars being used to eliminate free play between the coupling bracket and the first pair of precision shafts. A pair of compression springs 211 placed on each of the first pair of precision shafts on the upper side of the platform, each one located between a ball bushing 206 and a down-swept protrusion 203, each of the compression springs partially compressed at installation, permit limited, spring-centred bilateral motion of the coupling bracket, shafts and shaft collars with respect to the coupling platform, parallel to the axes of the first pair of precision shafts.

A second pair of precision shafts 209 is supported within the ball bushings on the underside of the platform, one shaft per pair of coaxial pair of bushings, such that at least 3 mm of shaft extends beyond the outward ends of the coaxial pairs of bushings. Mechanism B1 14 is mounted onto, and straddles the second pair of precision shafts via B1 mounting lugs 170. The mounting lugs are secured to each of the second pair of precision shafts via two length-adjustable locking shaft collars 210 per shaft, one on either side of each of the mounting lugs, at a central location on the shafts, adjustment of the length-adjustable locking shaft collars being used to eliminate free play between the mechanism B1 and the second pair of precision shafts. A pair of compression springs 211 placed on each of the second pair of precision shafts on the lower side of the platform, each one located between a ball bushing 206 and a length-adjustable locking shaft collar 210, each of the compression springs partially compressed at installation, permit limited, spring-centred bilateral motion of the mechanism B1, shafts and shaft collars with respect to the coupling platform, parallel to the axes of the second pair of precision shafts. Torque cell 201 is mounted between coupling bracket 202 and torque cell plate 200, the torque cell plate including the mounting interface 212 of the compliance mechanism to the mechanism B2.

Mechanism B2, Wrench Rotation, 18

Mechanism B2 is a wrench rotation device designed to rotate wrench close/open mechanism B1 through a hard stop limited arc of 70 degrees in either the clockwise or counter-clockwise direction, thus achieving one full turn of a hexagonal feature in six increments by repeatedly closing and opening the B1 mechanism in concert with back and forth rotation through 60 degrees, the extra 10 degrees being a buffer between commanded motion and end of travel. Incremental rotation allows for the mechanism to occupy primarily one side of the volume surrounding the FDV axis, thus permitting a clear view of the overall operation via cameras situated on the opposite side of the volume.

Referring to FIGS. 11A and 11B, 12A to 12D and 13A and 13B, segment gear assembly 256, comprising segment gear 257, end-of-travel pin 260, segment gear carrier 258, a first pair of track rollers 259 and tensioner assembly 261, itself comprising a second pair of track rollers 263, tensioner yoke 262, tensioning screw 264 and disc springs 265, is constrained to rotate about wrench rotation axis 270 via contact and preload between precision rolling surfaces 268 of rotation track plate 250 and the first pair and the second pair of track rollers, the former in contact on the outer precision rolling surface and the latter on the inner, the precision rolling surfaces being sufficient in arc to allow plus and minus 35 degrees of rotation of the segment gear assembly about a central position, with a thickening of the rim formed by the precision rolling surfaces beyond the arc forming travel stops, the wrench rotation axis being defined by the precision rolling surfaces.

Mechanism B2 drive housing 253 supports lead nut 155 and nut clamp 156, the lead nut being locked against rotation within the B2 drive housing and the nut clamp by locking pin 157. B2 drive gear 251 with internally-splined hub 252 is supported via bearings 254 housed in the B2 drive housing and the rotation track plate. The segment gear assembly is constrained along the wrench rotation axis by segment gear bumper 269 and thrust pad 255, the former mounted to the rotation track plate and the latter to the B2 drive housing.

Pairs of microswitches 266 separated by microswitch spacers 267 are mounted in stacked configurations via slots in the rotation track plate near each end of the range of motion of the end-of-travel pin mounted within the segment gear, the slots permitting the adjustment of the stacked pairs of microswitches such that they change from a free state to an operating state to signal an end to rotation in advance of the travel-limiting thickening of the rim formed by the precision rolling surfaces. Elevation travel indicator 271 is mounted to the rotation track plate.

Mechanism C, Wrench Elevation, 20

Figure 14A:
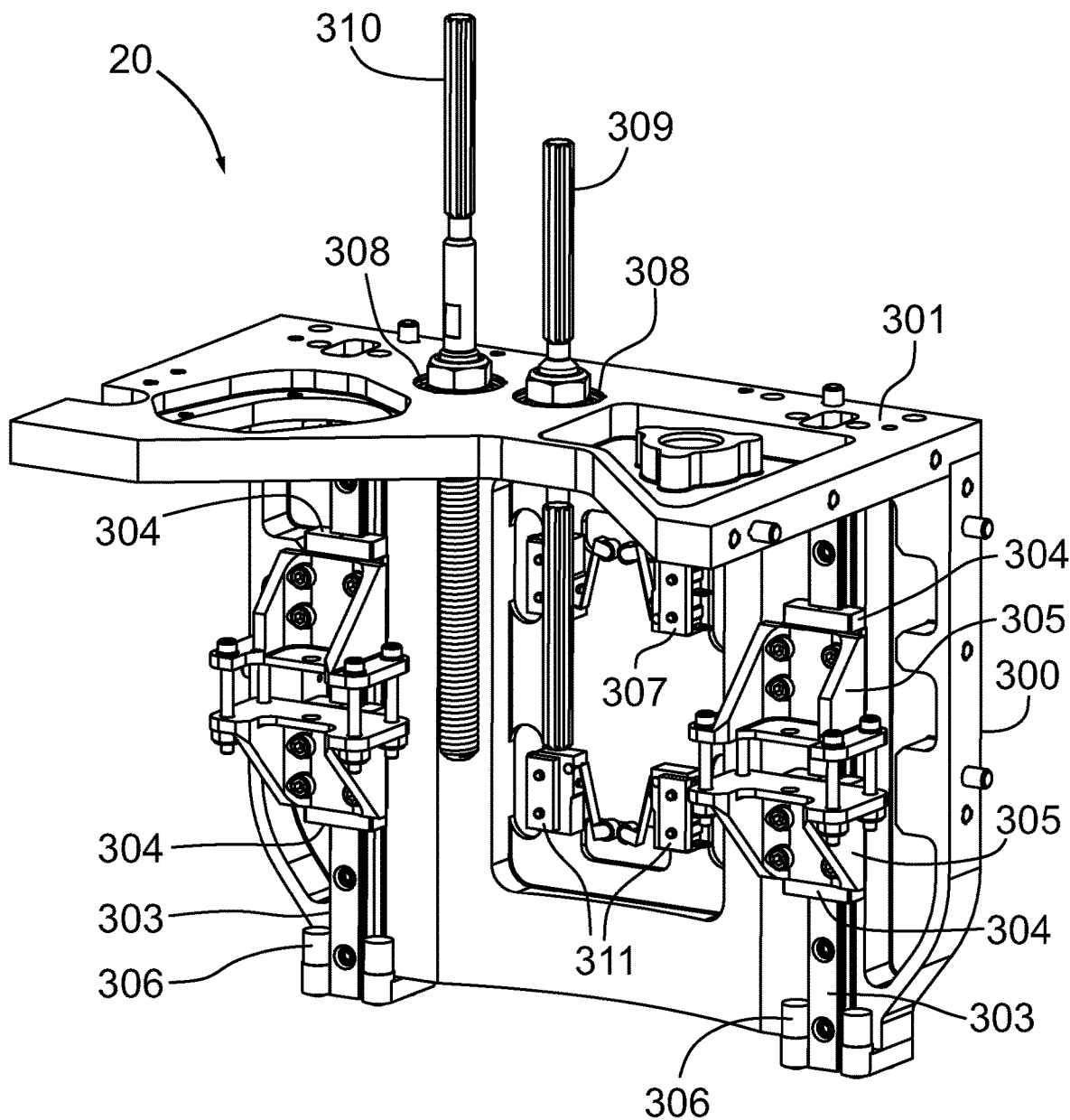
FIGS. 14A and 14B are perspective views of mechanism C 20, the latter including the relationship to mechanism B2 18.
Figure 14B:
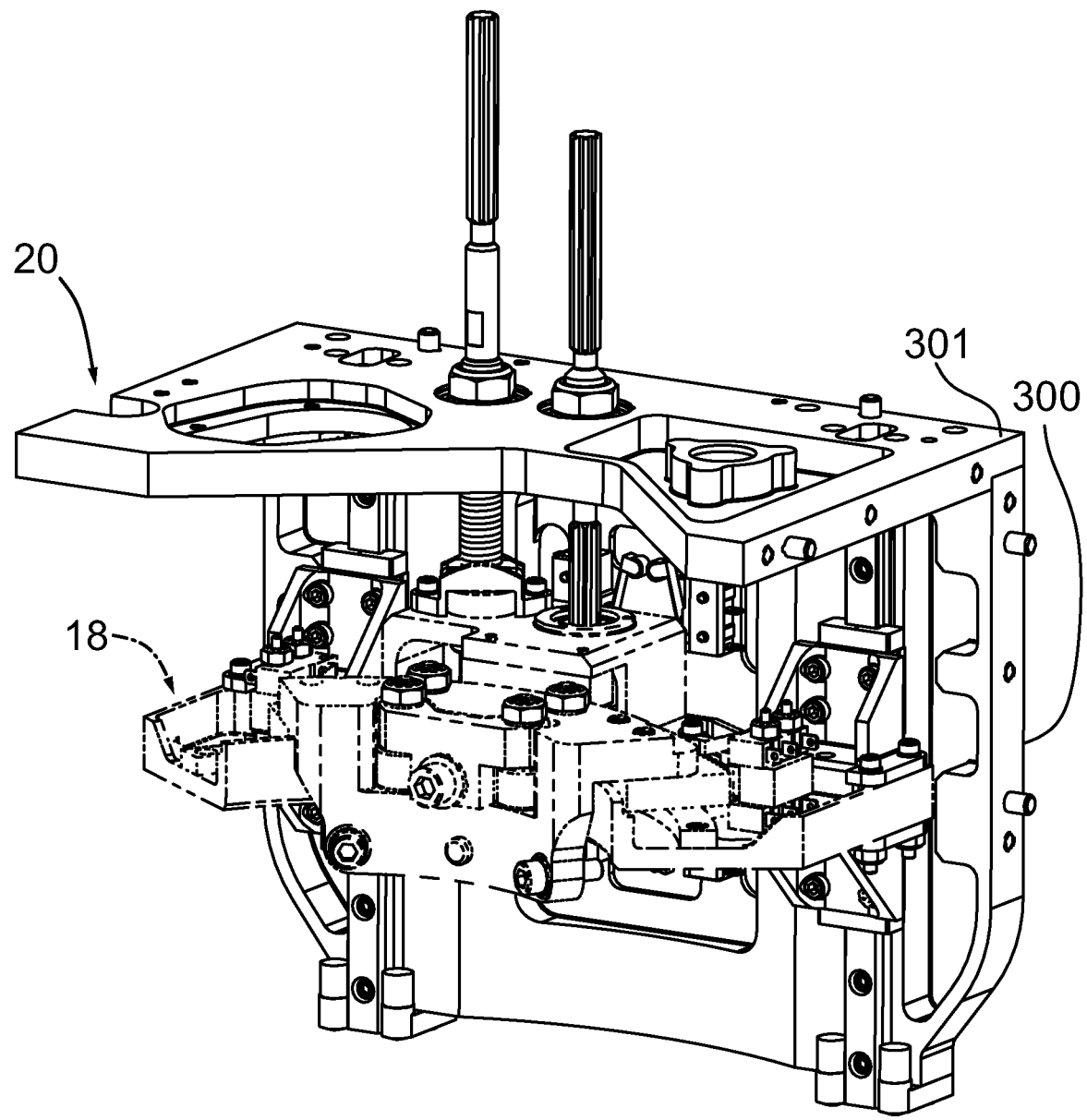

Mechanism C is an elevation stage for the wrench rotation mechanism B2 which requires mechanism B2 to be present in order to function as a mechanism. Consequently, FIG. 14A depicts mechanism C parts alone, while FIG. 14B, from the same perspective, includes mechanism B2 for clarification.

Figure 15:
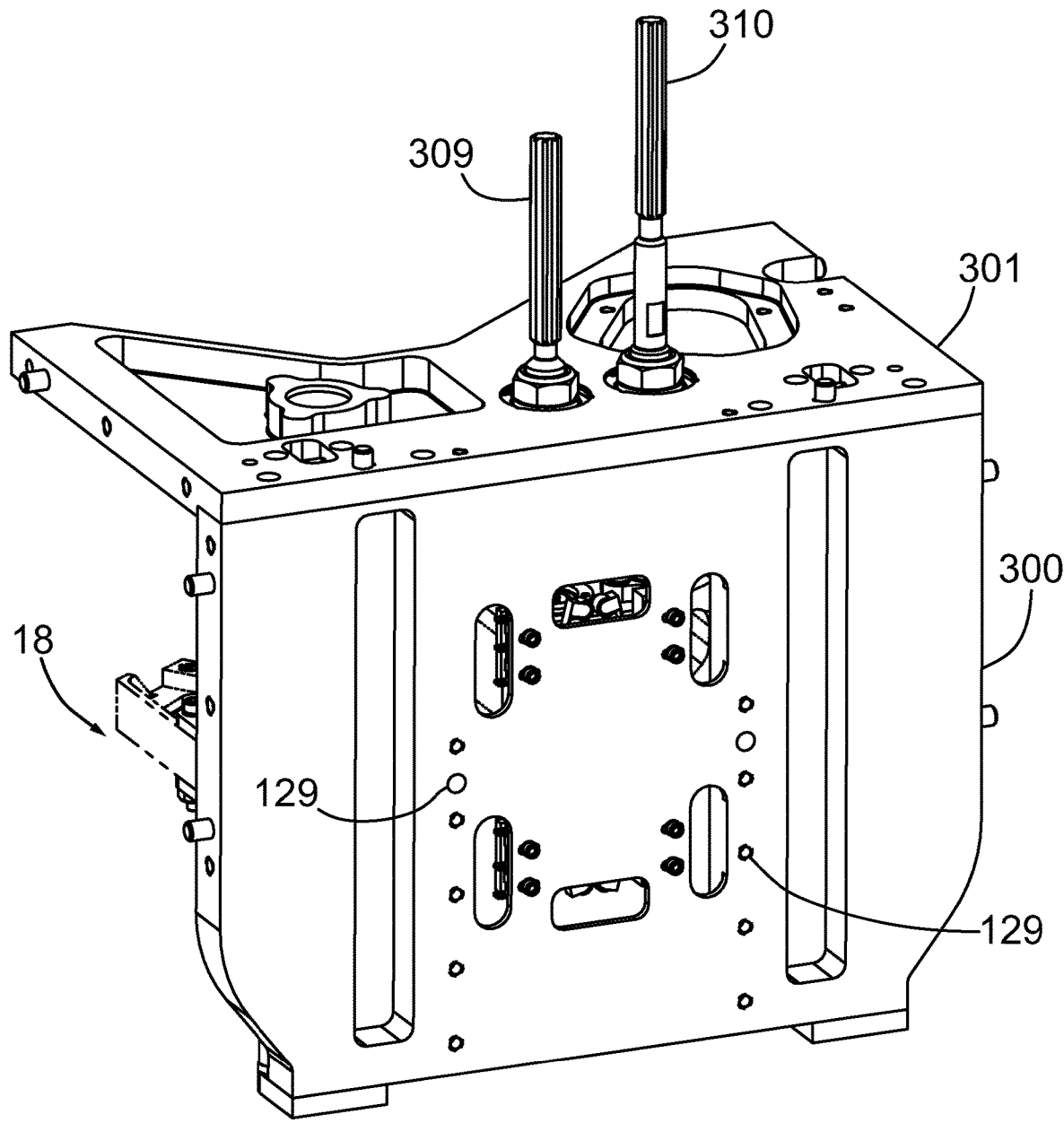
FIG. 15 shows a different perspective view of mechanism C 20 depicting the region where mechanism A 12 attaches to mechanism C 20.

Referring to these figures, and FIG. 15 from a different perspective, back plate 300, including interface to mechanism A 129, and mid plate 301 are secured together and form a basis for the RT structural frame. A pair of linear bearing rails 303 are secured to the inward-facing side of the back plate oriented vertically and widely spaced on the back plate. A pair of linear bearing blocks 304 are precisely guided on each of the linear bearing rails. Right angle brackets 305 are mounted to the linear bearing blocks, one per the block and arranged like bookends, such that each pair of the brackets straddle and support rotation track plate 250 of mechanism B2 18. A pair of non-metallic bumpers 306 mounted to the back plate at each end of each of the linear bearing rails define the limits of travel.

A pair of retracted microswitches 307 is mounted via slots in the back plate, near the upper end of travel of elevation travel indicator 271 of mechanism B2 18, the slots permitting the adjustment of the retracted microswitches such that they change from a free state to an operating state to signal an end to mechanism C motion in the upwards direction prior to contact with the non-metallic bumpers. A pair of extended microswitches 311 is similarly mounted via slots in the back plate, near the lower end of travel of elevation travel indicator 271, the slots permitting the adjustment of the extended microswitches such that they similarly signal an end to mechanism C motion in the downwards direction prior to contact with the non-metallic bumpers. It will be appreciated that the present system and tools uses sensing means that are microswitches but it will be appreciated other types of sensors may be used, a non-limiting example being potentiometers.

Bearings 308 mounted within mid plate 301 support mechanism B2 spline shaft 309 and mechanism C lead screw 310, the spline shaft aligning and interfacing with internally-splined hub 252 of B2 drive gear 251, thus transferring torque to the B2 drive gear regardless of mechanism C position, the lead screw aligning and interfacing with lead nut 155 of mechanism B2 18 in order to drive mechanism C through its range of motion.

Mechanism D, FDV Connection, 22

Figure 16B:
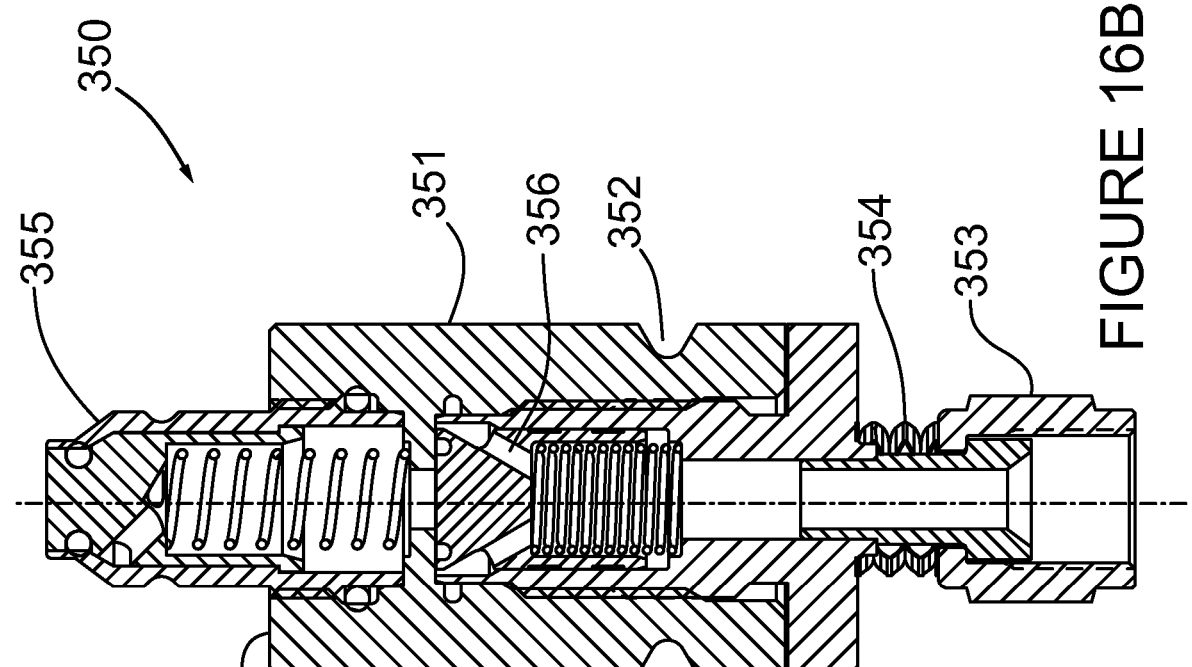
FIG. 16B shows conceptually the safety valve internal components.
Figure 16A:
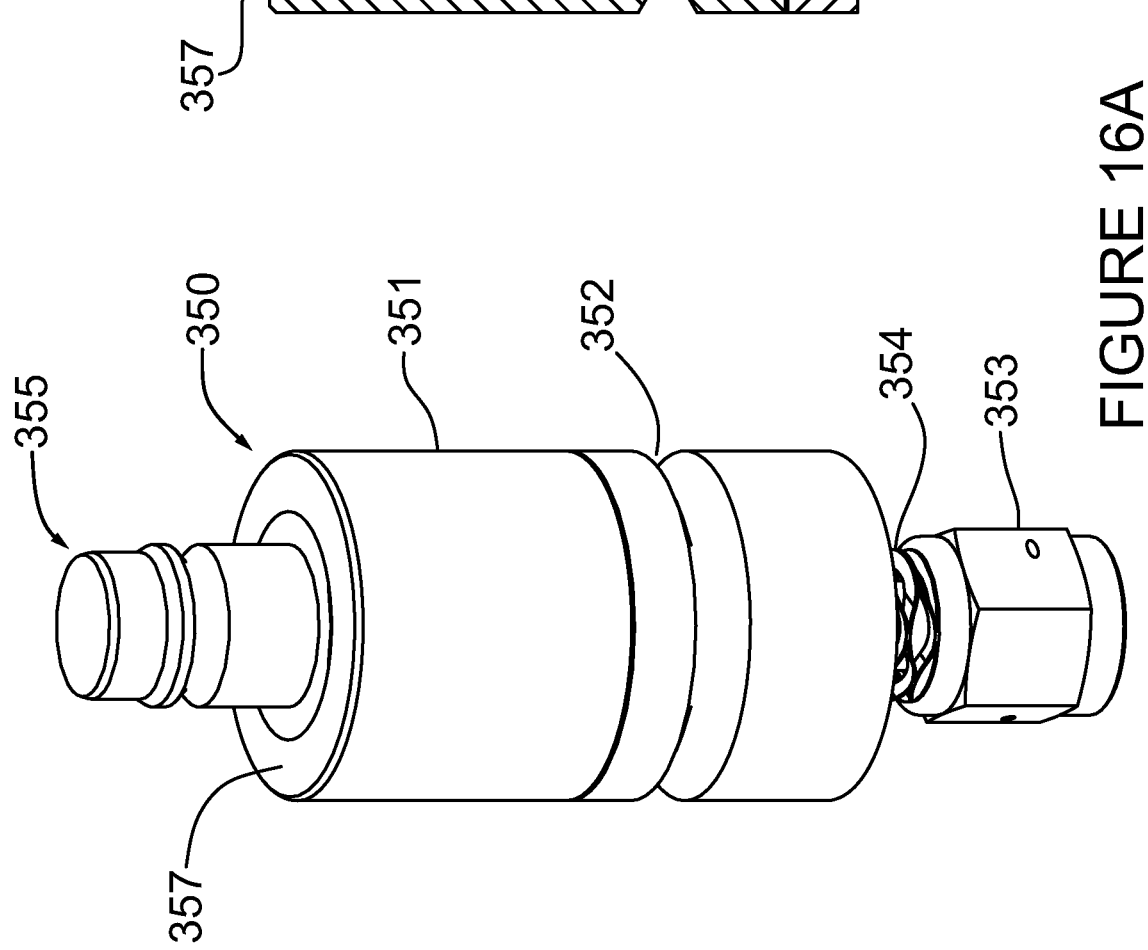
FIG. 16A shows the safety valve.
Figure 17:
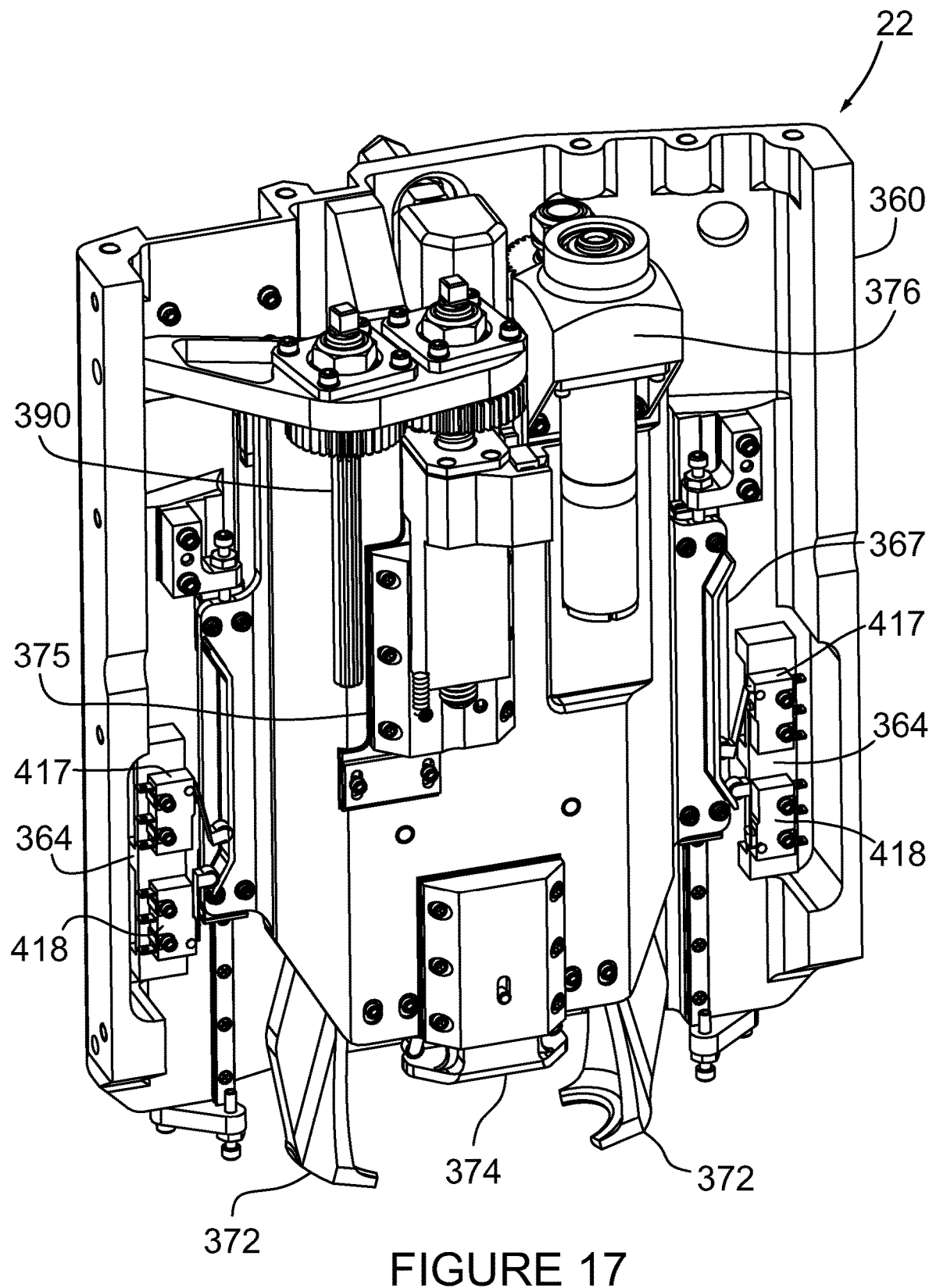
FIG. 17 shows perspective views of mechanism D 22.
Figure 18:
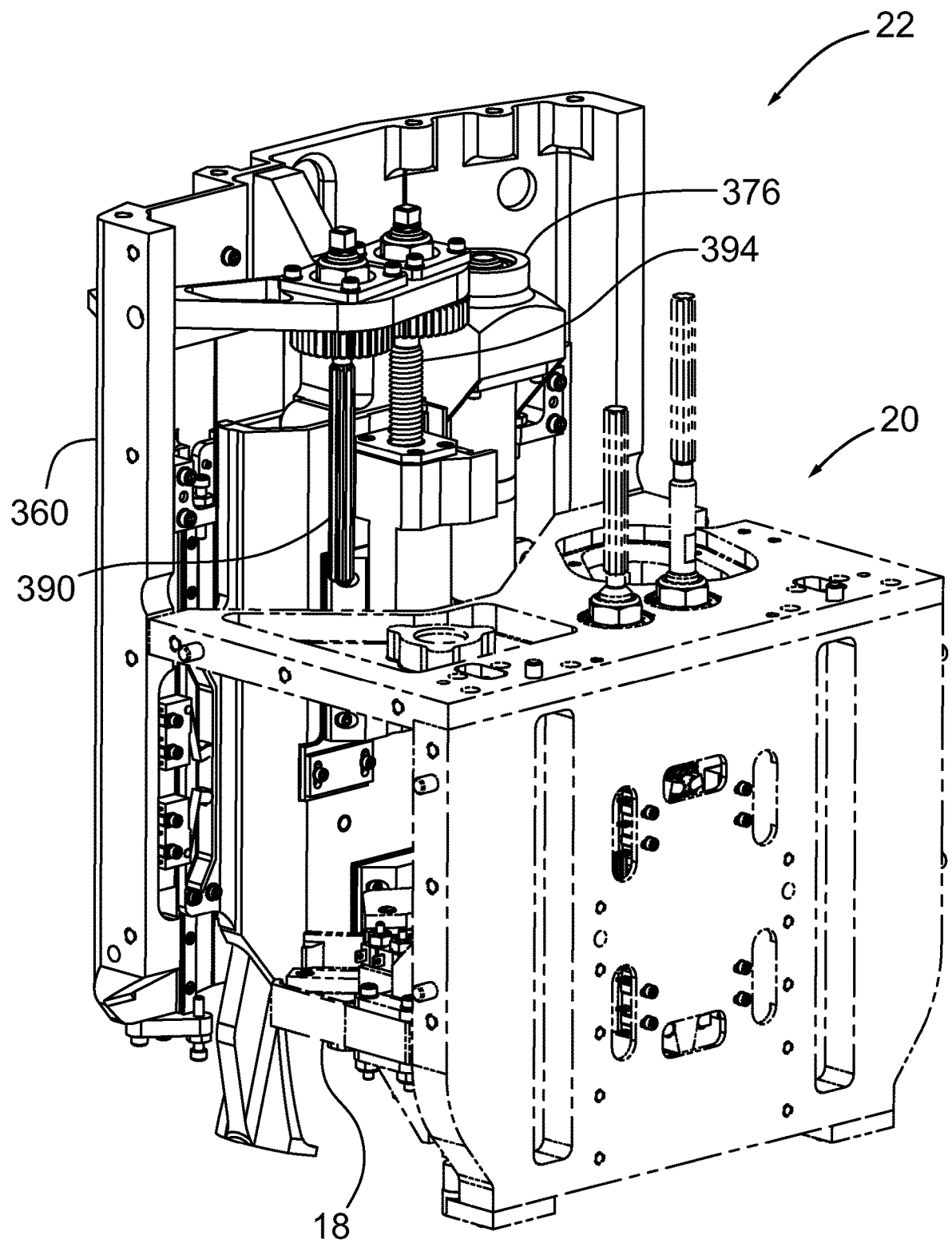
FIG. 18 shows a different perspective view of mechanism D 22 including the relationship to mechanism C 20.

Mechanism D 22 is used to connect the refueling system to the FDV nipple 70 via the installation of a safety valve 350. The safety valve 350 is a non-latching quick connect device with a secondary check valve and is designed to be mounted to an FDV permanently in place of the B-nut after the B-nut has been removed. Once installed, it acts as a safe fluid coupling to pass fuel or oxidizer through a FDV into the client spacecraft, providing two independent seals against leakage beyond the seat of the actuation nut of the FDV, which is itself the primary seal in the line. Referring to FIGS. 16A and 16B, the safety valve 350 comprises a valve body 351 with external capture groove 352, coupling nut 353 and spring 354, the valve body featuring a fully independent check valve 356 and a quick connect nipple 355 which is essentially another check valve that is either forced open by the act of coupling or by the application of pressure via flowing gas or liquid after coupling. The quick connect coupling and nipple are of a non-latching variety.

Specifically, unlike the vast majority of quick connect systems in common usage, known as latching quick connects, which latch together via the interaction of detent balls and a groove, the locking action being released by the axial movement of a spring-loaded external locking collar, the non-latching quick connect coupling and nipple require an externally applied force to maintain the connection of the coupling and nipple. A latching quick-connect coupling design could be adopted in another embodiment, though the latching function is superfluous when used with the refueling tool as presented here.

The safety valve 355 is designed to be installed on the FDV after removing the b-nut and prior to passing fuel or oxidizer. Once fuel or oxidizer is transferred through the safety valve 355, the safety valve 355 is left on the client valve. The quick connect coupling on the safety valve 355 enables subsequent refueling operations of the client satellite 81 at later points in time to be more quickly and safely performed, with the refueling operation no longer requiring the removal or re-installation of the b-nut or the actuation of the valve actuation nut to open or close it, with the added advantage that leakage outboard of the valve actuation nut is now being mitigated through the check valve and quick disconnect coupling.

As shown in FIGS. 17 through 20, Mechanism D 22 features two independent coaxial actuations of two carriages; hereafter referred to as D1 actuation and D2 actuation. Mechanism D2 actuation is dedicated to capturing and holding onto the safety valve and thereafter the ability to mate and de-mate the propellant delivery system of the robotic arm to the safety valve via actuation of a quick connect coupling 385 in order to force together the coupling and the nipple. Mechanism D1 actuation is dedicated to acquisition of and manipulation of the safety valve along the FDV axis in order to remove it from a storage location and install it on an FDV, the height of the FDV being dependent on the variety of FDV being accessed. The D2 actuation results in motion between mate/de-mate carriage assembly 380 and safety valve carriage assembly 367. The mechanism D1 actuation results in motion between the safety valve carriage assembly and mechanism D baseplate 360, the safety valve carriage assembly carrying all components of the D2 actuation, the D1 and D2 actuations being along the FDV axis in both a first direction and a second direction, the first direction being towards the FDV and the second direction opposite to the first direction.

The current embodiment uses a discrete actuator for the D2 actuation. Optionally the D2 actuation could be performed by an additional mechanism within transmission 26.

Figure 19:
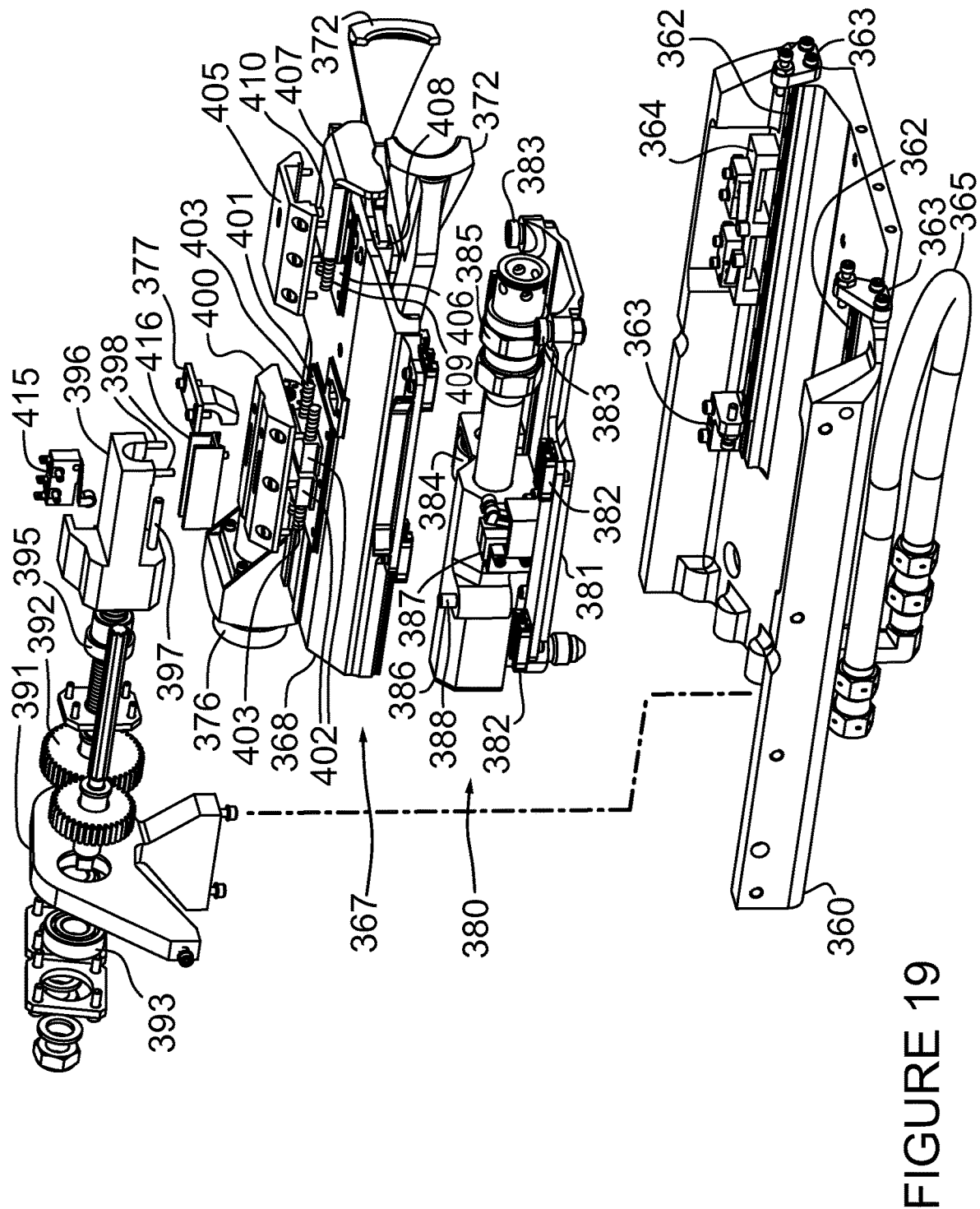
FIGS. 19 and 20 are exploded views of mechanism D 22.
Figure 20:
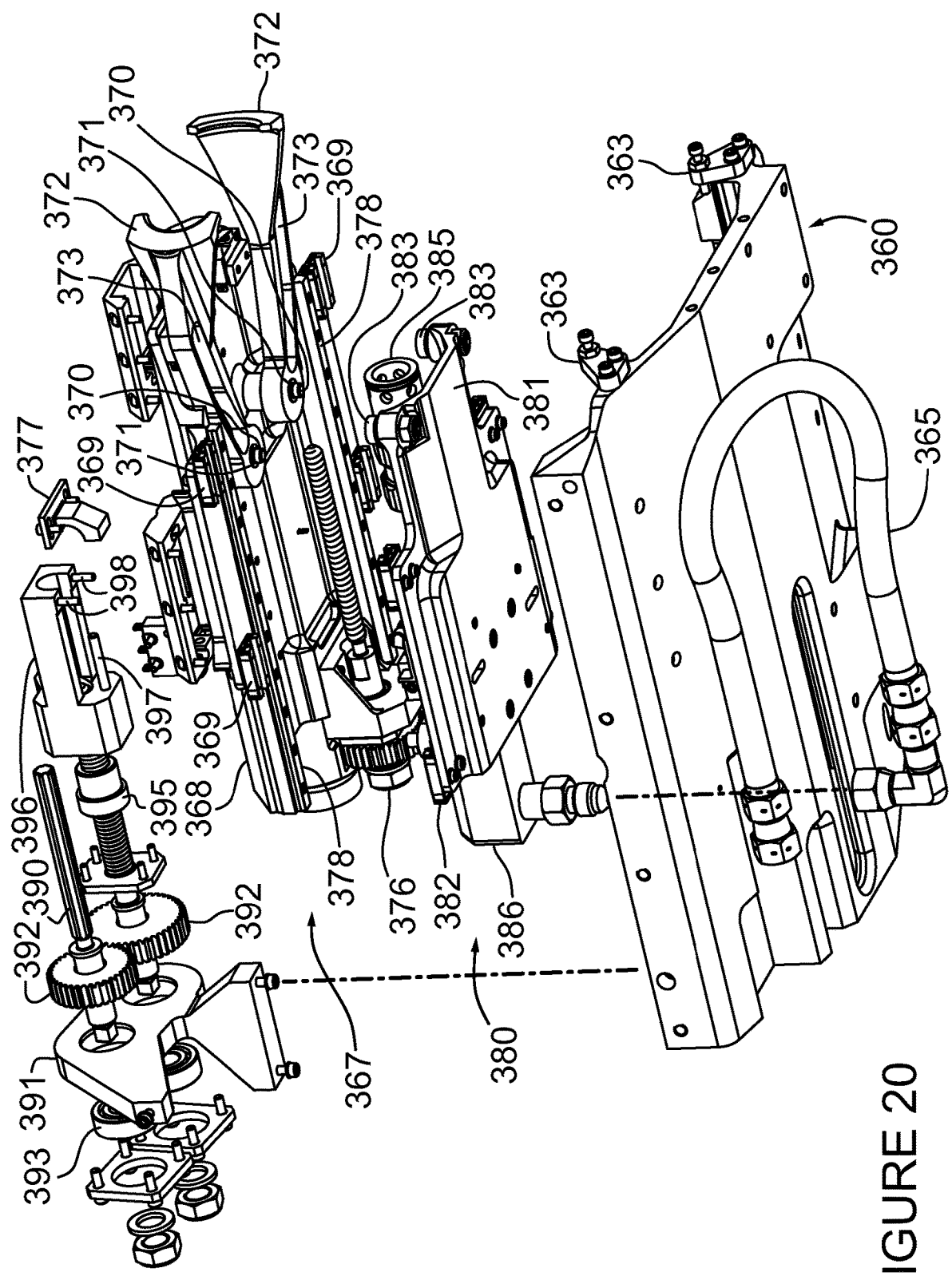

Referring to FIGS. 19 & 20, a first set of linear guide rails 362 is mounted to the mechanism D base plate 360, along with, four (4) adjustable end stops 363, and two dual microswitch assemblies 364, the microswitch assemblies acting to limit the commanded motion of the safety valve carriage assembly. Each of the dual microswitch assemblies includes advance microswitch 417 and retract microswitch 418.

The safety valve carriage assembly includes safety valve carriage 368 with two locking arm posts 370 along the edge of the safety valve carriage closest to the FDV and symmetrically spaced about the FDV axis, the posts forming short-stroke rotation centres for two symmetrical safety valve locking arms 372, mounted on flanged bushings 371, the distal ends of the locking arms being shaped to collectively form a diameter compatible with the external capture groove of the safety valve body, the locking arms each including a precisely shaped actuation slot 373 on the side adjacent to the mate/de-mate carriage assembly. Linear guide blocks 369, safety valve sensor assembly 374, compliant coupling assembly 375, first actuation actuator 376, microswitch striker 377 and a second set of linear guide rails 378 are all mounted to the safety valve carriage, the linear guide blocks maintaining precise alignment to the mechanism D base plate via the first set of linear guides.

Mate/de-mate carriage 381 forms the platform for the mate/de-mate carriage assembly and includes two track rollers 383 symmetrically spaced about the FDV axis along the edge closest to the FDV, the track rollers residing in the actuation slots of the locking arms such that relative motion between the mate/de-mate carriage assembly and the safety valve carriage assembly in the first direction causes the locking arms to swing towards each other and to fit precisely within the external locking groove of the safety valve, the precision slots being shaped to produce first a rapid closing motion to the closed position and thereafter to maintain the locking arms in the closed position while allowing continued motion of the mate/de-mate carriage assembly, the continued motion being optionally exercised only when attempting to fully mate the quick connect coupling and nipple.

Also mounted to the mate/de-mate carriage are linear guide blocks 382, lead nut 384, quick connect coupling 385, manifold 386 with travel stop 388, and dual microswitch assembly 387, the linear guide blocks ensuring precise alignment between the mate/de-mate carriage assembly and the safety valve carriage assembly via the second set of linear guides, the lead nut completing the connection to the mechanism D2 actuator, the dual microswitch assembly interacting with the microswitch striker to signal the end of travel in the first direction.

Relative motion of the mate/de-mate carriage assembly with respect to the safety valve carriage assembly in the second direction correspondingly de-mates the quick connect coupling and nipple if mated and then fully releases the safety valve.

The shape of the actuation slots in the locking arms ensures that the commanded motion of the mate/de-mate carriage with respect to the safety valve carriage can only be completed when the shaped ends of the locking arms coincide with the external locking groove of the safety valve, the external locking groove of the safety valve being shaped with generous lead-in to assist with the alignment. Excessive misalignment causes the locking arms to close around the outer diameter of the safety valve instead of the external locking groove, causing the D2 actuation to stall and preventing the mate/de-mate carriage from completing the commanded motion, the commanded motion being aborted by a current limit on the D2 actuation.

To further assist in the alignment of the locking arms with the external locking groove of the safety valve, the D2 actuation is triggered by safety valve sensor assembly 374 comprising sensor housing 405 and sensor base 406, both of a self-lubricating material, trigger plate 407, prime and redundant ready-to-latch microswitches 408, compression springs 409 and limiting pin 410, the compression springs selected to be installed with preload and final load chosen in consideration of robotic arm performance, force-moment sensing capabilities and/or techniques if any, and FDV load limits, the limiting pin acting within a slot within the housing, the slot commensurate in length with microswitch stroke. The microswitches, in contact with one side of the trigger plate, change state when contact between the opposite side of the trigger plate and the top surface of the safety valve result in motion of the trigger plate sufficient for the indication.

Flexible hose 365 is also shown in FIG. 19 and on the opposite side of mechanism D baseplate 360 and includes a right angle fitting which passes through a slot in the baseplate to form a connection with manifold 386.

The D1 actuation, between mechanism D base plate 380 and safety valve carriage assembly 367, is accomplished via rotation of splined input shaft 390 which drives safety valve lead screw 394 via gears 392 and bearings 393 housed within drive bracket 391, the drive bracket being rigidly mounted to the mechanism D base plate. Rotation of the lead screw induces linear motion of lead nut 395 contained within guide housing 396, the housing supporting guide pin 397, and connecting pins 398, the guide pin and connecting pins forming a connection to compliant coupling assembly 375 permitting limited, bi-lateral, spring-centred compliance between the safety valve carriage and the D1 actuation, the compliance afforded by the action of shuttles 402 and springs 403 contained within compliance housing 400 and compliance base 401, both made of a self-lubricating material.

Compliance microswitch 415 mounted to the guide housing and interacting with compliance striker 416 mounted to the safety valve carriage, changes state when motion of the safety valve carriage assembly in the first direction is arrested by contact between the safety valve and the FDV, the change of state signaling an end to forward motion. Thus the compliance microswitch serves effectively as a touch sensor to indicate readiness for safety valve installation.
Transmission, 26

The transmission 26 is used to selectively direct a first end effector tool drive input to one of 4 drive outputs 456, each of the drive outputs being a rotating gear with an internally-splined hub 457, the internally splined hubs being compatible in size and relative position with the splined input shafts of the mechanisms A, B2, C and D.

Figure 21:
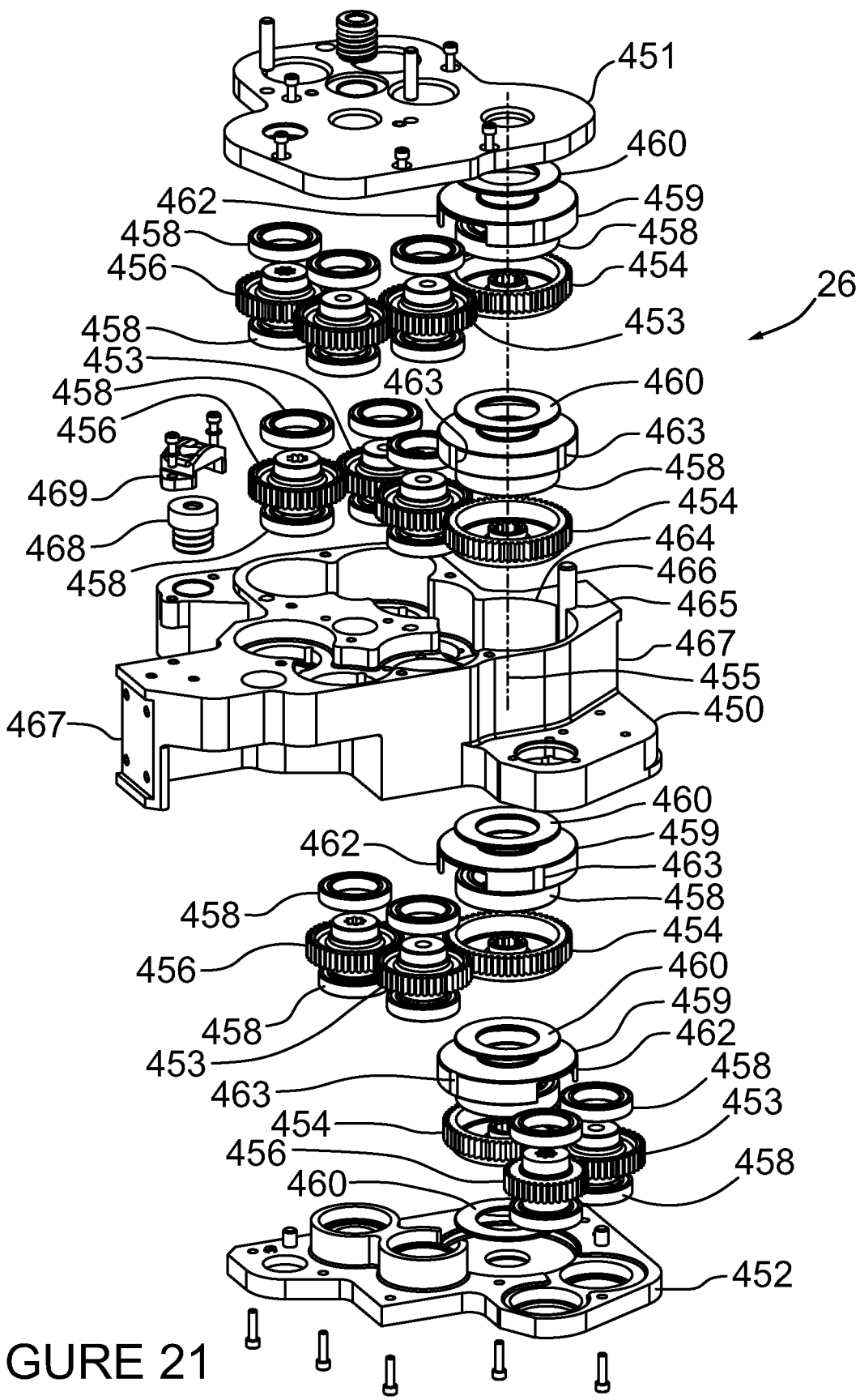
FIG. 21 is an exploded view of transmission 26.

Referring to FIG. 21, transmission housing 450, top cover 451 and bottom cover 452 enclose and support transmission gears 453 arranged in 4 distinct layers, each of the layers designed to transfer torque from an input gear 454 to an output gear 456, the input gear of each layer being arranged on a common axis 455. Each of the input gears features an internally splined hub 457 and is supported on a bearing 458 within a support housing 459. The input gears, each with the bearing and support housing, and thrust washers 460 are arranged in a stack within the transmission housing, and contained by the top and bottom covers, such that one of the thrust washers is between the bottom gear in the stack and the bottom cover and one of the thrust washers is between each successive gear and the support housing beneath it and one of the thrust washers is between the support housing of the top gear and the top cover. Remaining gears, including the output gears, are straddle mounted on two bearings 458, one bearing in the transmission housing and the other in one of the top and bottom covers.

The transmission is moveably mounted via mounting bracket interfaces 467. Lead nut 468 and nut clamp 469 mounted to the transmission housing form the interface by which the transmission is actuated.

Figure 22:
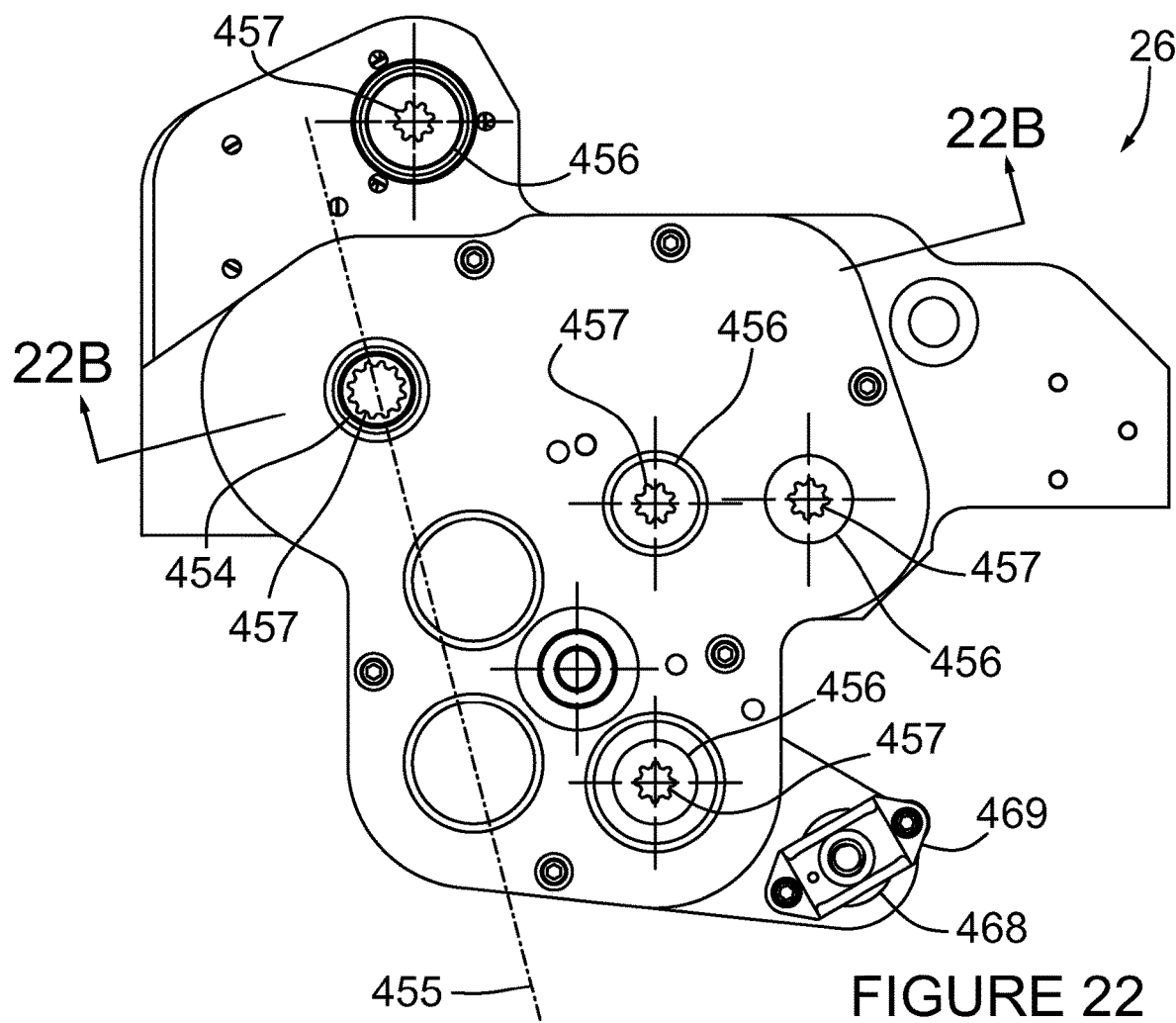
FIG. 22 is a top view of transmission 26, with FIG. 22B showing a section through the input gear stack.
Figure 22B:
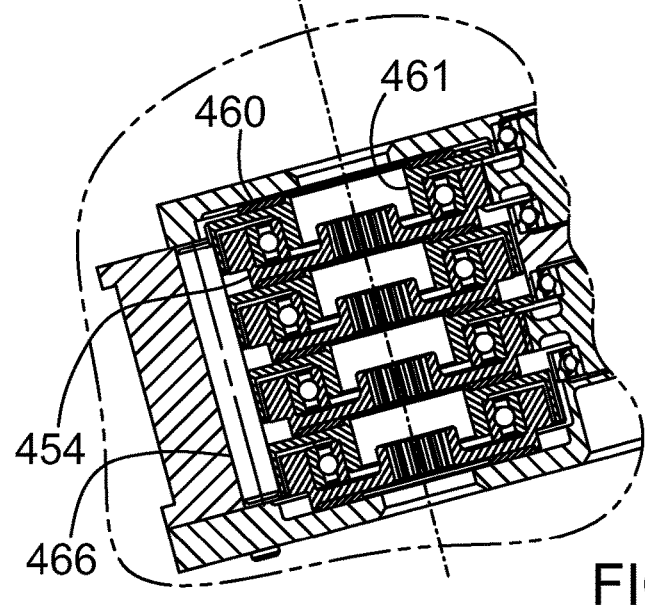
Figure 23A:
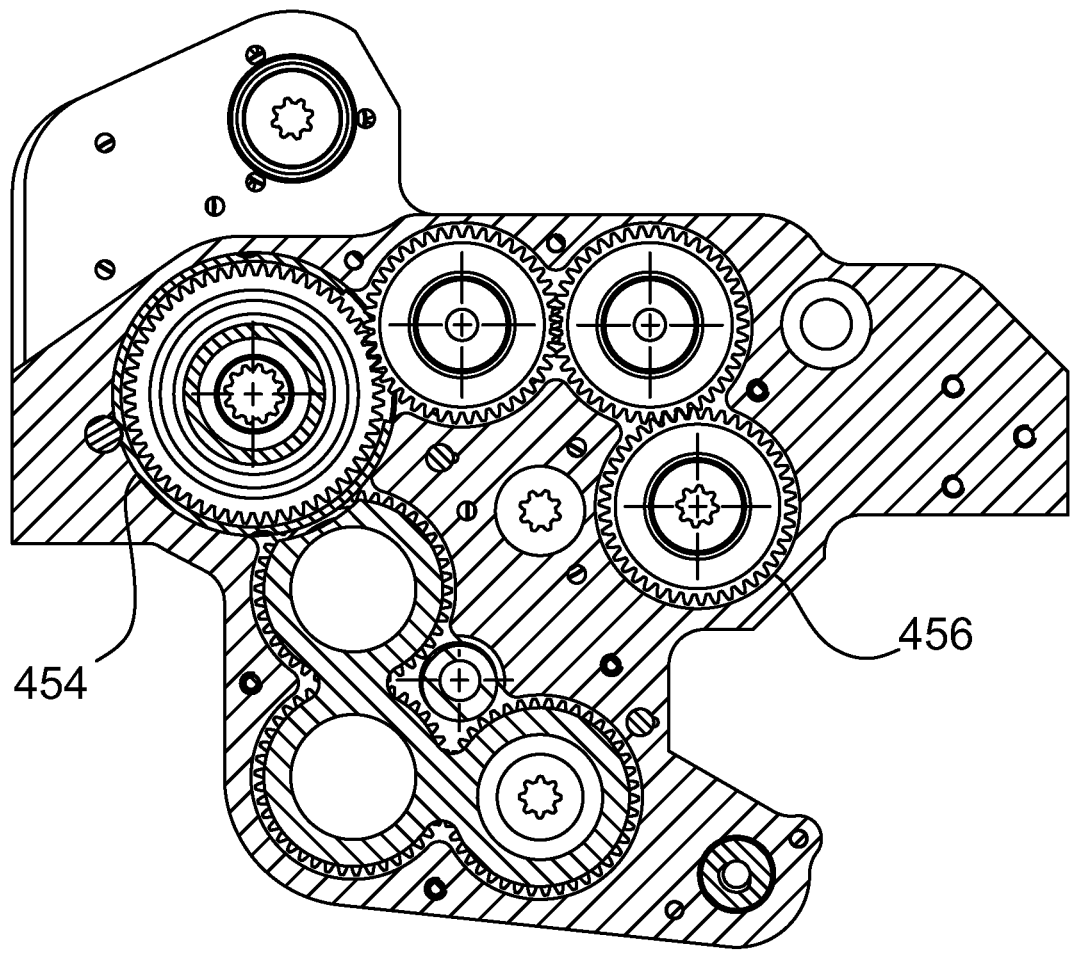
FIGS. 23A through 23D show each of the four (4) layers of gears within transmission 26.
Figure 23C:
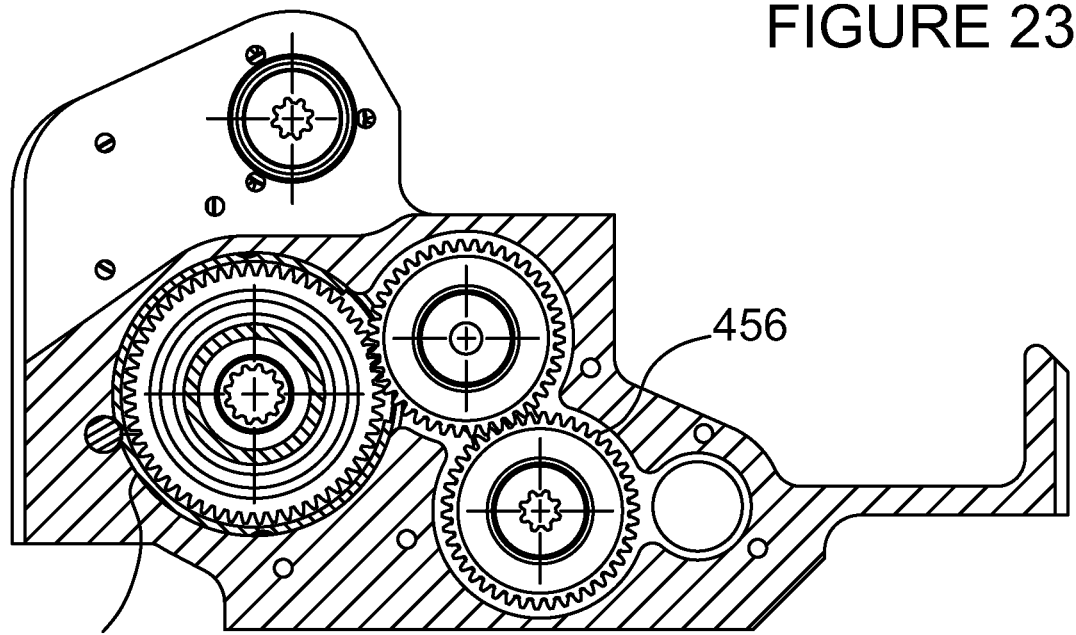
Figure 23B:
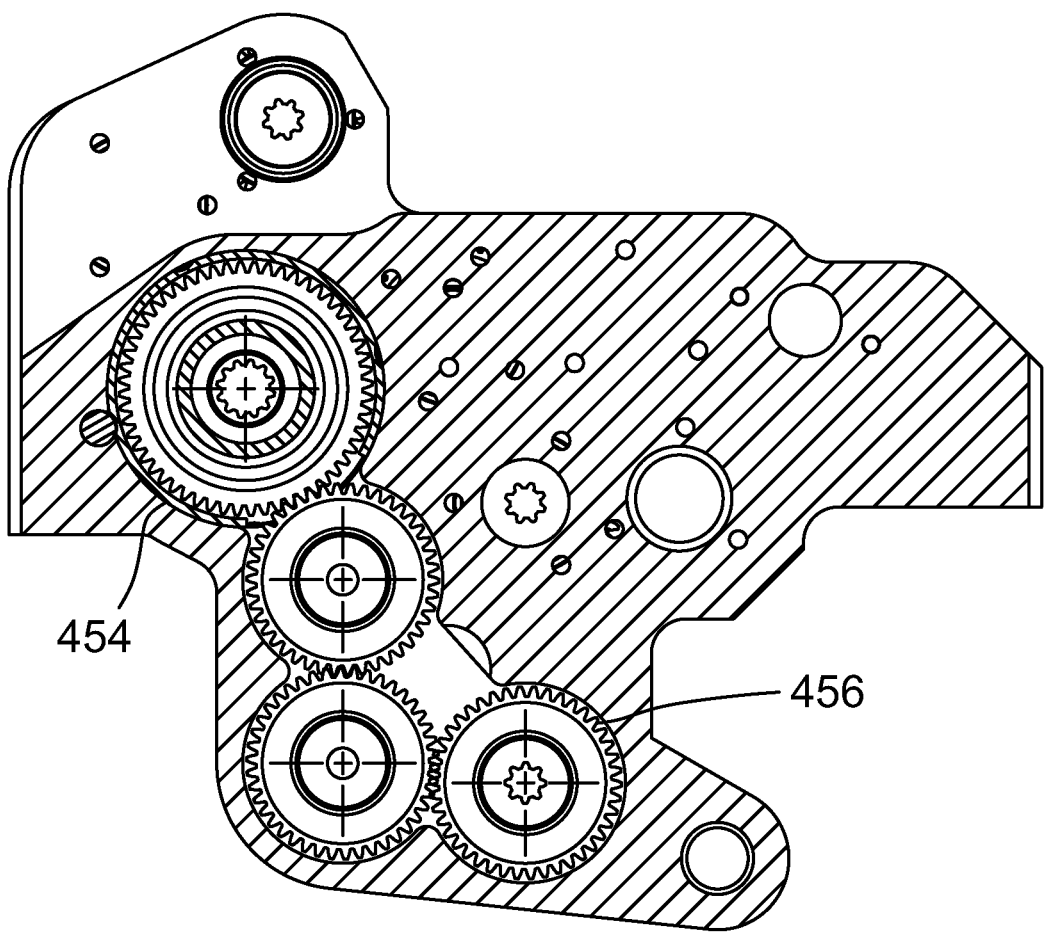
Figure 23D:
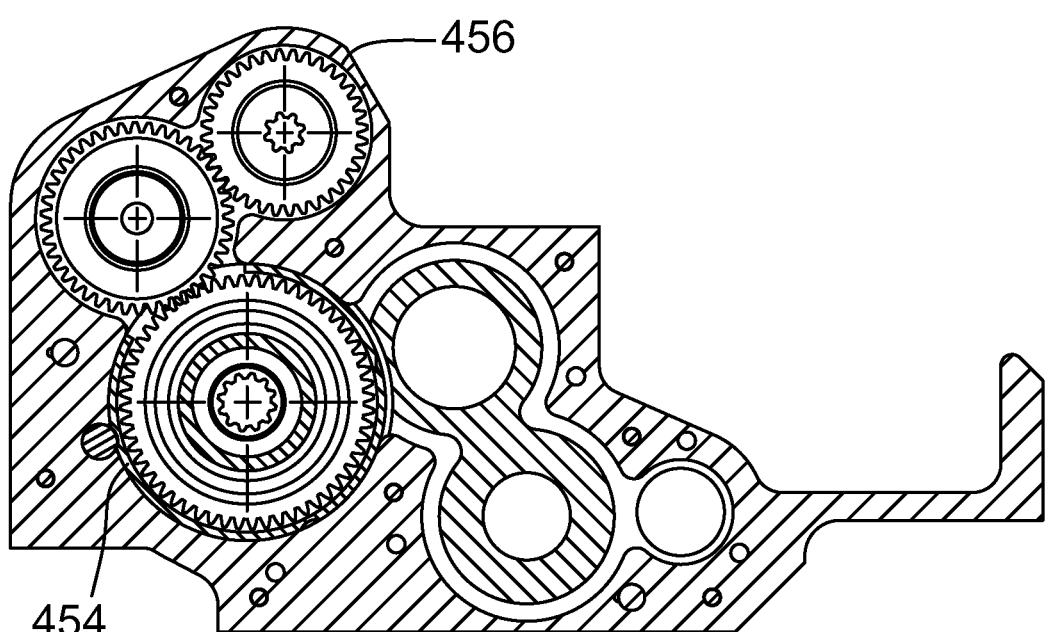

FIG. 22 includes a section view of the stack of the input gears, bearings and support housings, Each of the support housings has the form of a disk with a central hole, with a complete rim 461 on the inner diameter and a partial rim 462 of approximately 300 degrees of arc on the outer diameter, the complete inner rim forming a hollow shaft for the bearing, the partial outer rim forming a cover over the gear teeth of the input gear except for the missing segment, the missing segment of outer rim of the support housing allowing the input gear to mesh with another gear. Visible in FIG. 21 the outer diameter of the partial outer rim of the support housings are interrupted by three cylindrical grooves 463. The bore 464 within the transmission housing which precisely locates the support housings via the outer diameter is also interrupted by a hole 465 parallel to the axis of the transmission housing bore and breaking through the cylindrical wall of the bore, such that the axis of each of the grooves on the outer diameter of the support housings can be made to align with the axis of the hole in the transmission housing by rotating the support housing within the transmission housing bore. Locating pin 466 fitted within the hole in the transmission housing forms a locating feature along the full length of the bore, such that the support housings can only be installed in one of three rotational orientations, each of the three orientations being determined by one of three the cylindrical grooves, thus ensuring that the outer rim openings of support housings of the input gears maintain alignment with the next gear in each layer. In the current embodiment three grooves are sufficient for four layers of gearing only because two non-adjacent layers share similar output directions. Another embodiment may require one groove per layer of gearing. Additionally, the only reason to include all grooves on all support housings is one of interchangeability. Alternatively, each support housing could be made for a specific layer, with a single groove correspondingly placed.

Each of FIGS. 23A through 23D show a section view of the transmission through one of the four layers of gearing. Each layer includes one of the input gears, one or two idler gears and one of the output gears.

Figure 24:
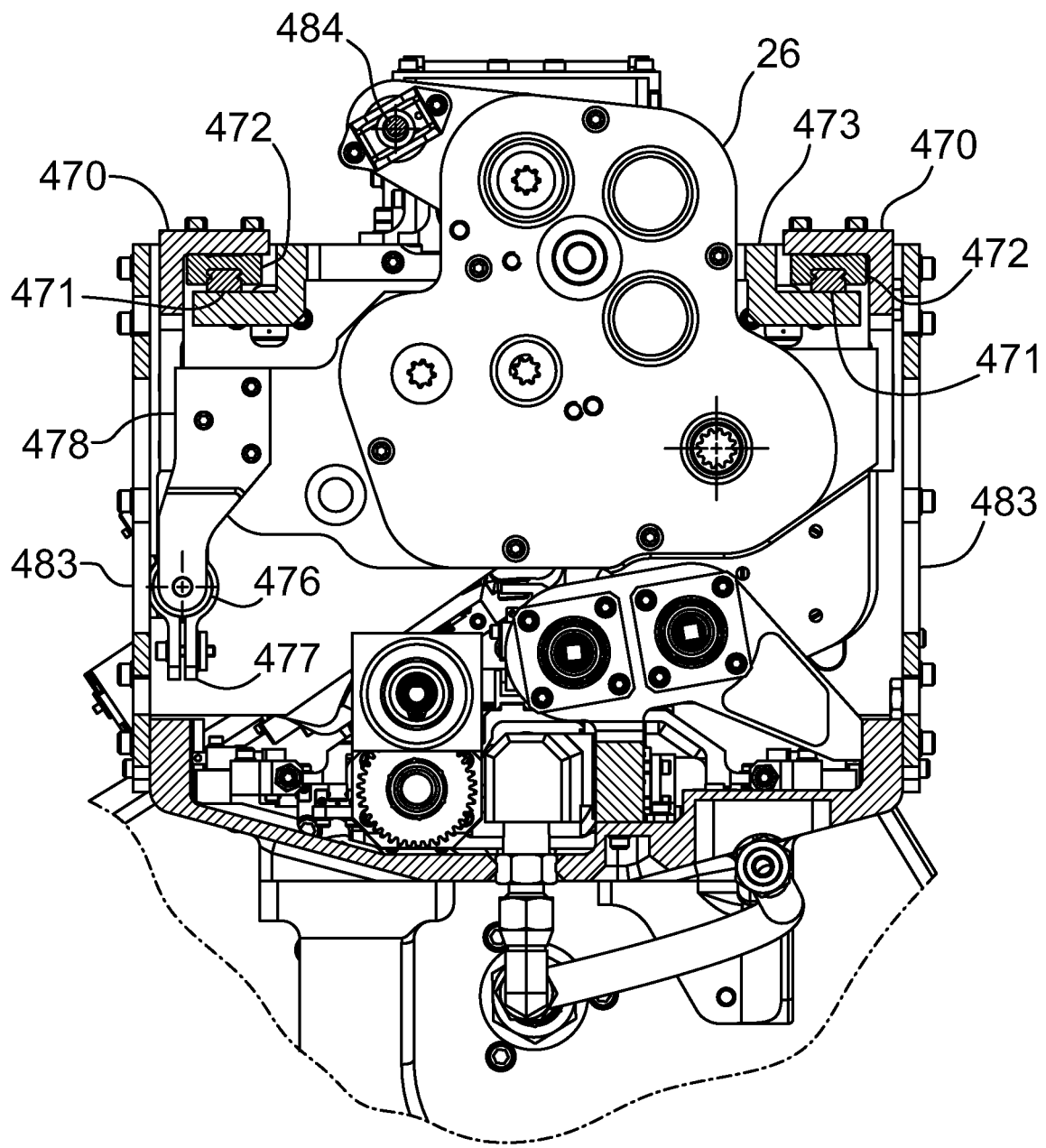
FIG. 24 is a section view of refueling tool 10 beneath top plate 479.

FIG. 24 is a section view immediately below refueling tool top plate 479 showing transmission 26 mounted on two linear guide rails 471 via linear guide blocks 472 and transmission brackets 470. The linear guide rails are mounted to transmission support plate 473, the support plate being located and supported between top plate 479 and mid plate 301 with bolted and pinned connections.

Also shown in FIG. 24 are linear potentiometer 476, potentiometer bracket 477 and potentiometer rod bracket 476. The body of the linear potentiometer, mounted to refueling tool mid plate 301 via the potentiometer bracket, remains stationary while the potentiometer rod bracket, mounted to transmission 26, moves with the transmission, thereby reporting the position of the transmission within its range of motion.

Figure 25:
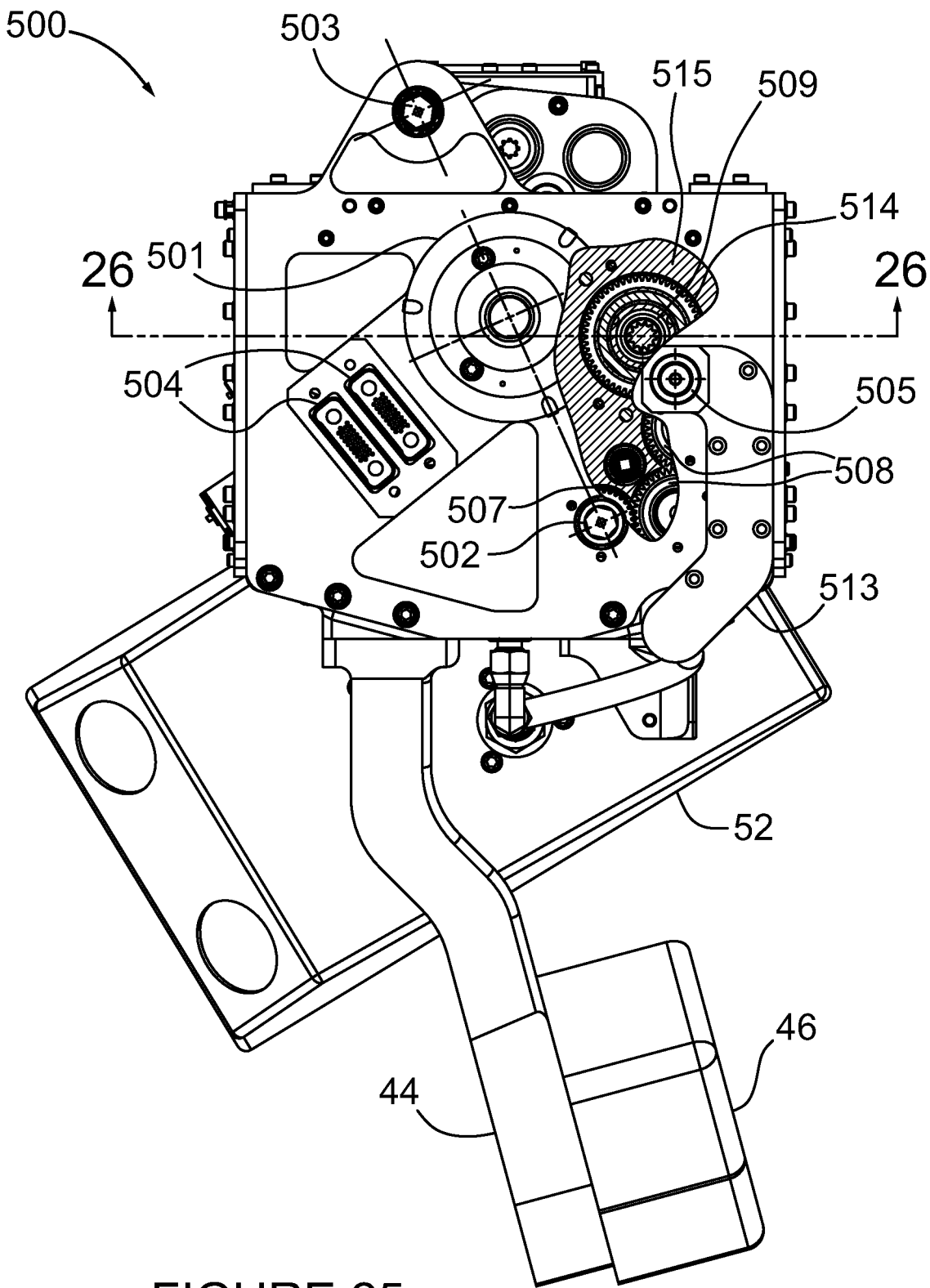
FIG. 25 is a top view of refueling tool 10, with a breakout section revealing transfer gears 508 for first rotary input shaft 502.

FIG. 25 is a top view of refueling tool 10, showing the elements of refueling tool end effector interface 500, namely; grasp fixture 501, first rotary drive input 502, second rotary drive input 503, electrical connectors 504 and quick connect nipple 505. The quick connect nipple is mounted to fuel channel 513, the fuel channel providing a sealed delivery passage to flexible hose 365 of mechanism D 22. A breakout section in FIG. 25 reveals first rotary drive input gear 507 transferring the first rotary drive input to quill shaft 509 via transfer gears 508 and quill shaft drive gear 514, the gears supported and enclosed within transfer housing 515.

Figure 26:
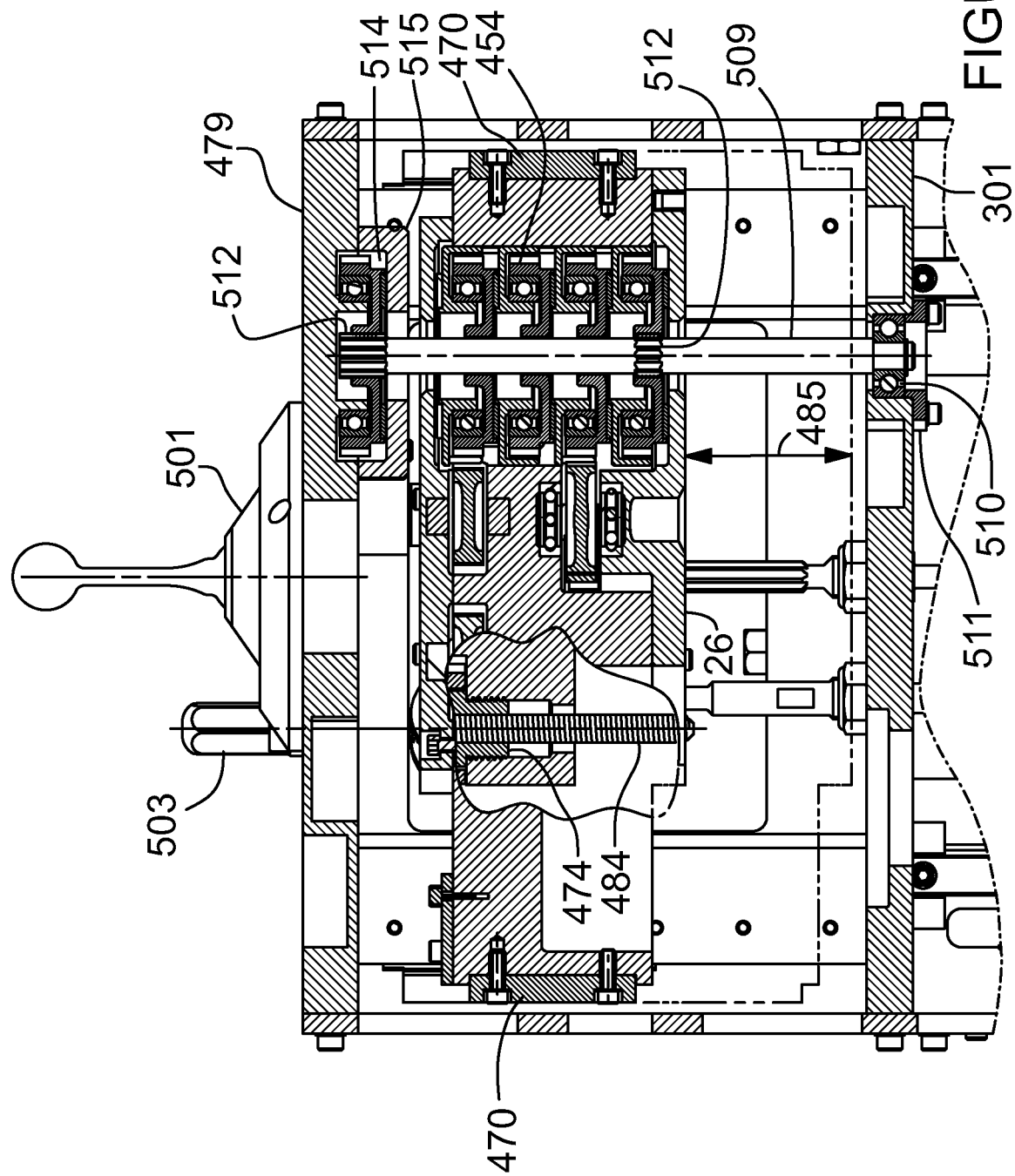
FIG. 26 is a section view of transmission 26 revealing the input gears 454 and quill shaft 509, with a further breakout section showing transmission lead screw 484.

FIG. 26 is a section view of quill shaft 509, quill shaft drive gear 514 and the stack of transmission input gears 454. The quill shaft is located and supported at the lower end by bearing 510 and bearing retainer 511 in mid plate 301. The upper end of the quill shaft is supported by quill shaft external splines 512 engaged in corresponding internal splines of quill shaft drive gear 514. A second set of external splines 512, approximately midway along the length of the quill shaft is sized and located to engage with the lowest transmission input gear 454 in the stack when the transmission is at the upper end of transmission range of motion 485, the range of motion being sufficient to allow the second external spline to engage with each of four the transmission input gears. A breakout section in FIG. 26 reveals transmission lead screw 484 of second rotary input 503 and lead nut 474 mounted to the transmission such that the second rotary input can be used to drive the transmission on the linear guides through the range of motion.

Figure 27:
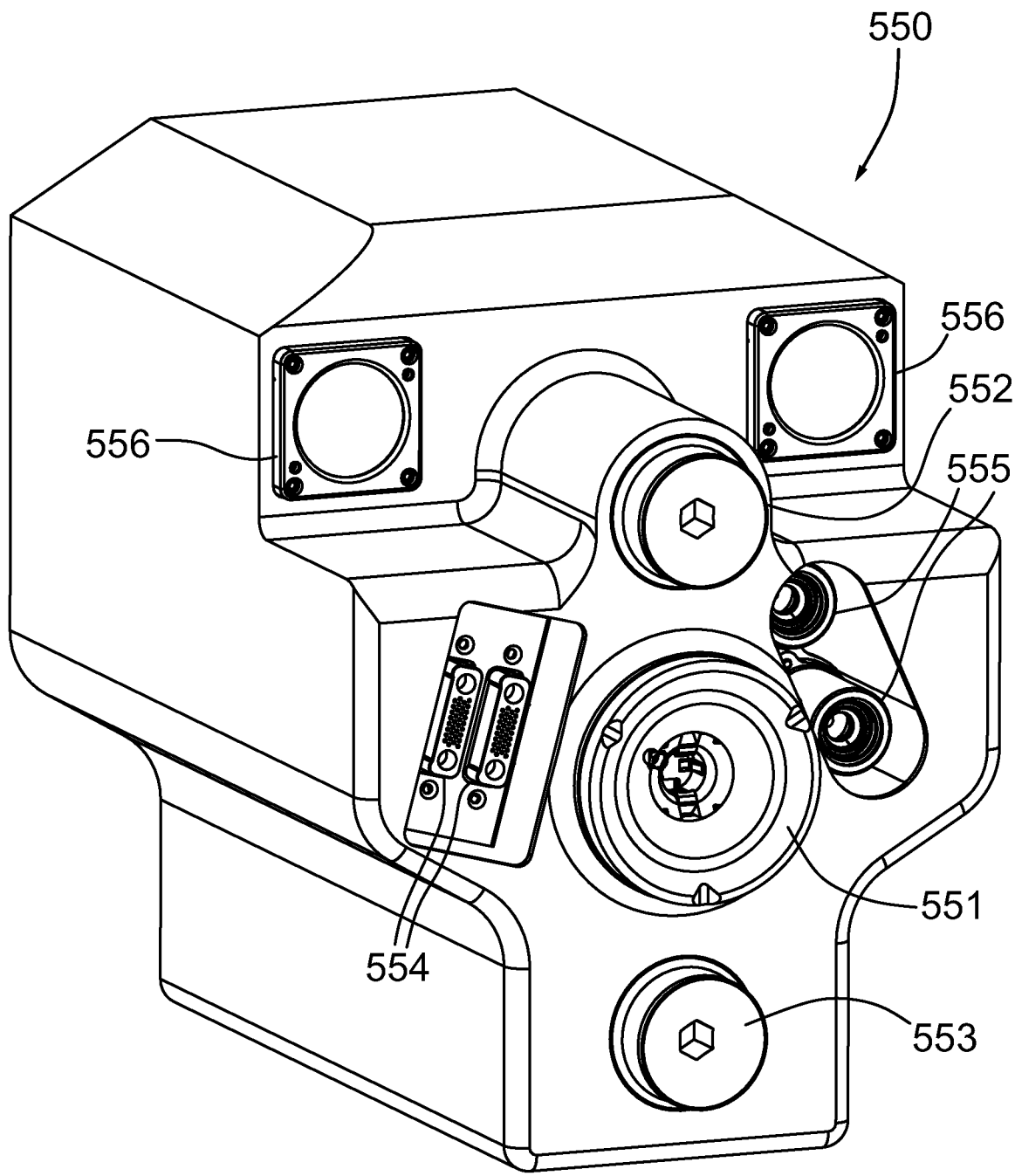
FIG. 27 shows a concept for robotic end effector suitably equipped for executing all of the servicing tasks described herein.
Figure 28:
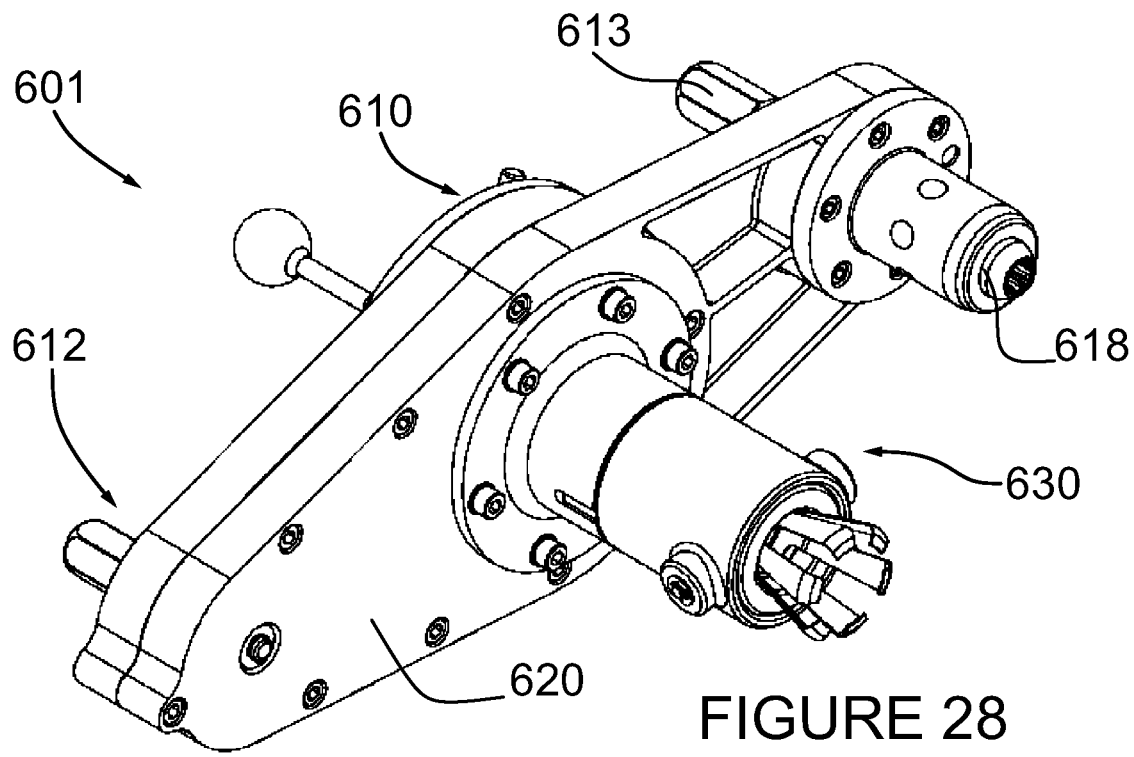
FIGS. 28 TO 36 show perspective and cross-sectional views of various independent support tools used by the servicer spacecraft to prepare the client satellite for refueling.
Figure 29:
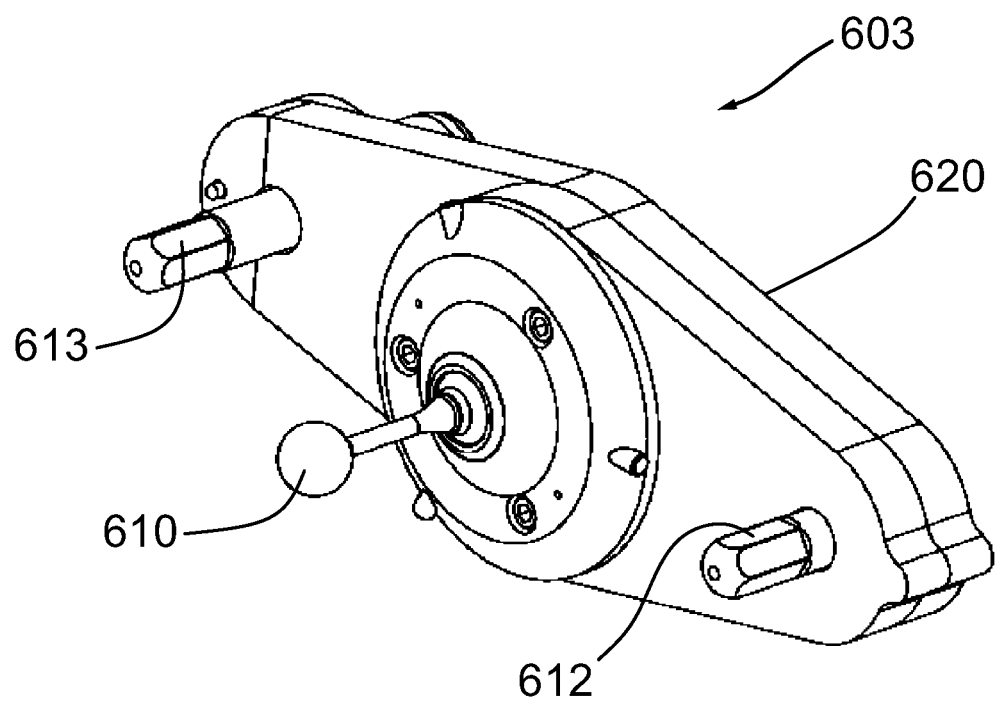
Figure 30:
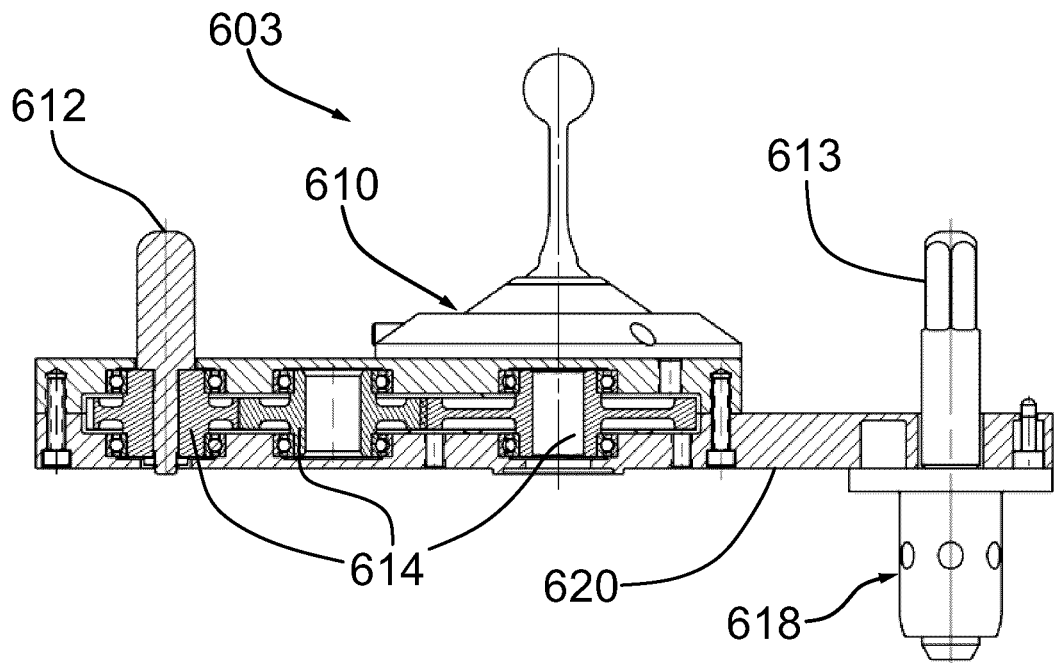
Figure 31:
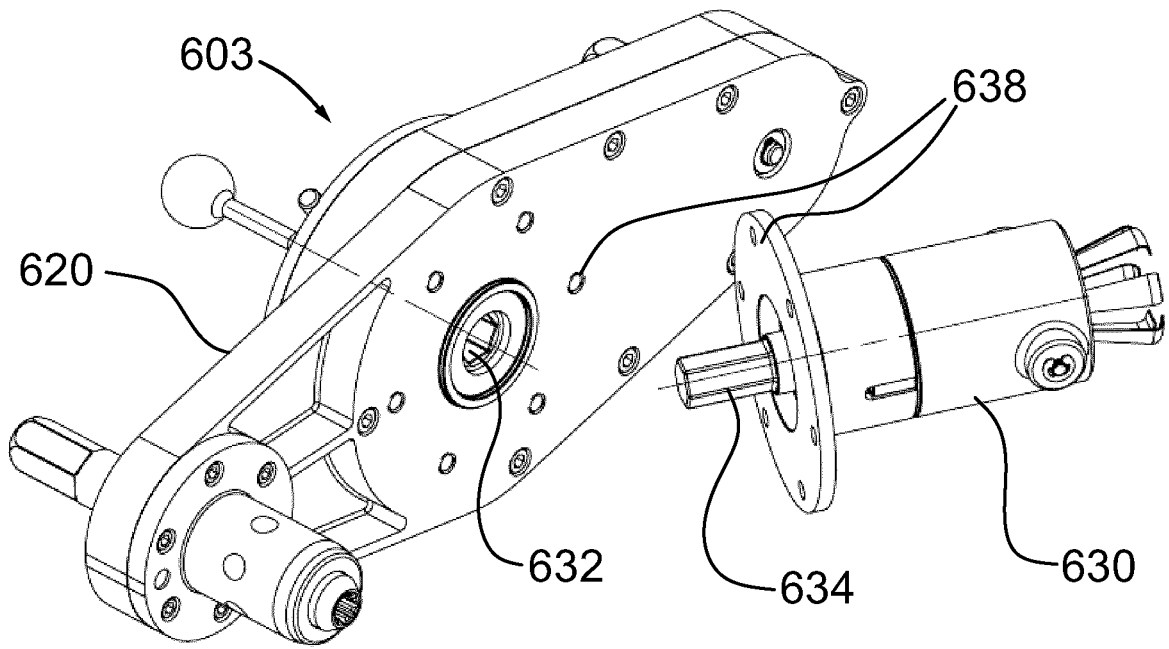
Figure 32:
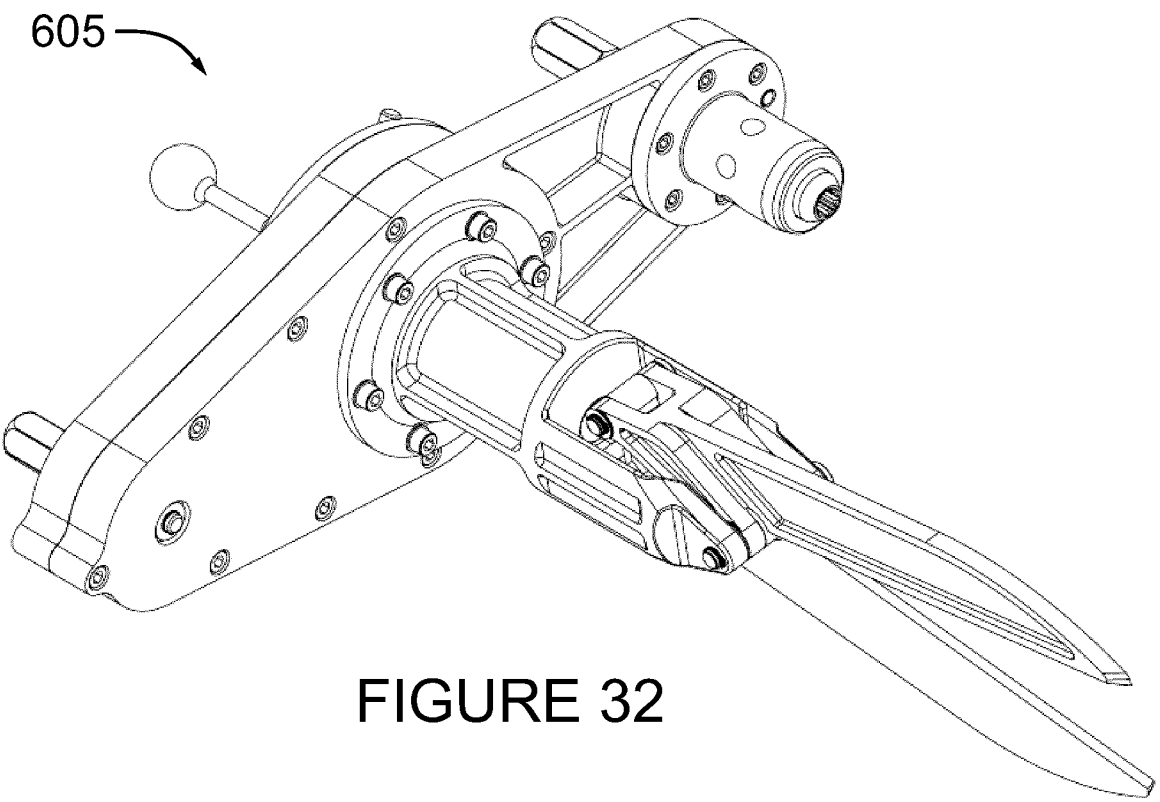
Figure 33:
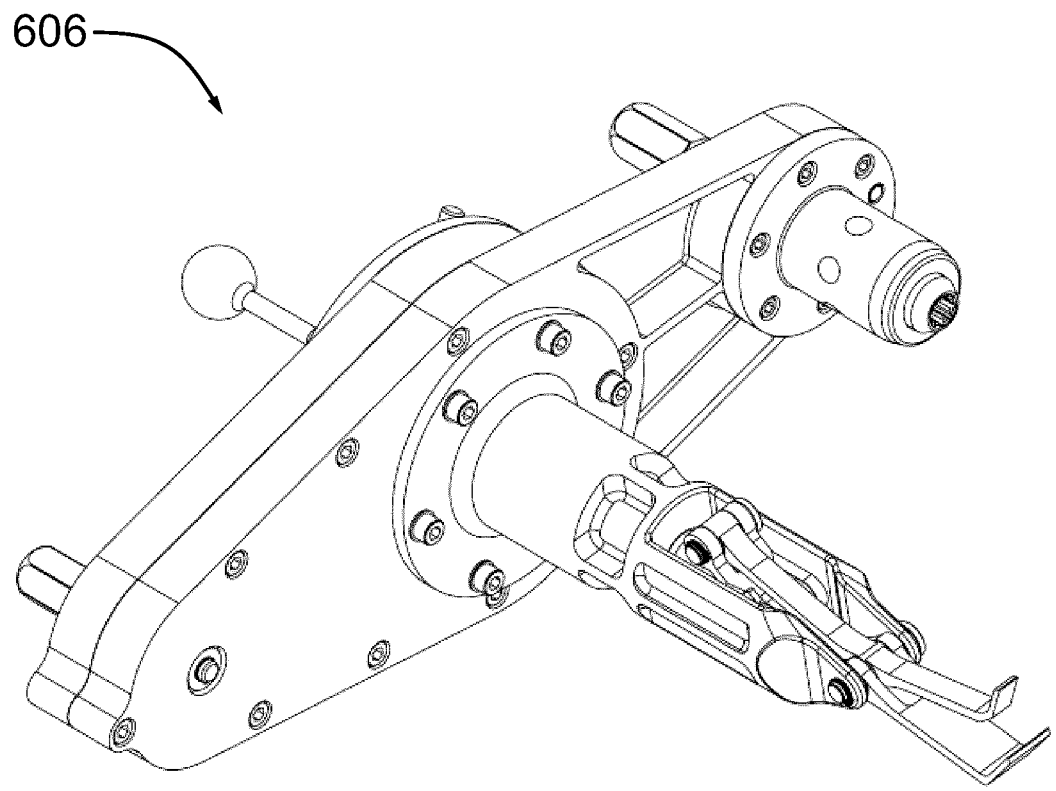
Figure 34:
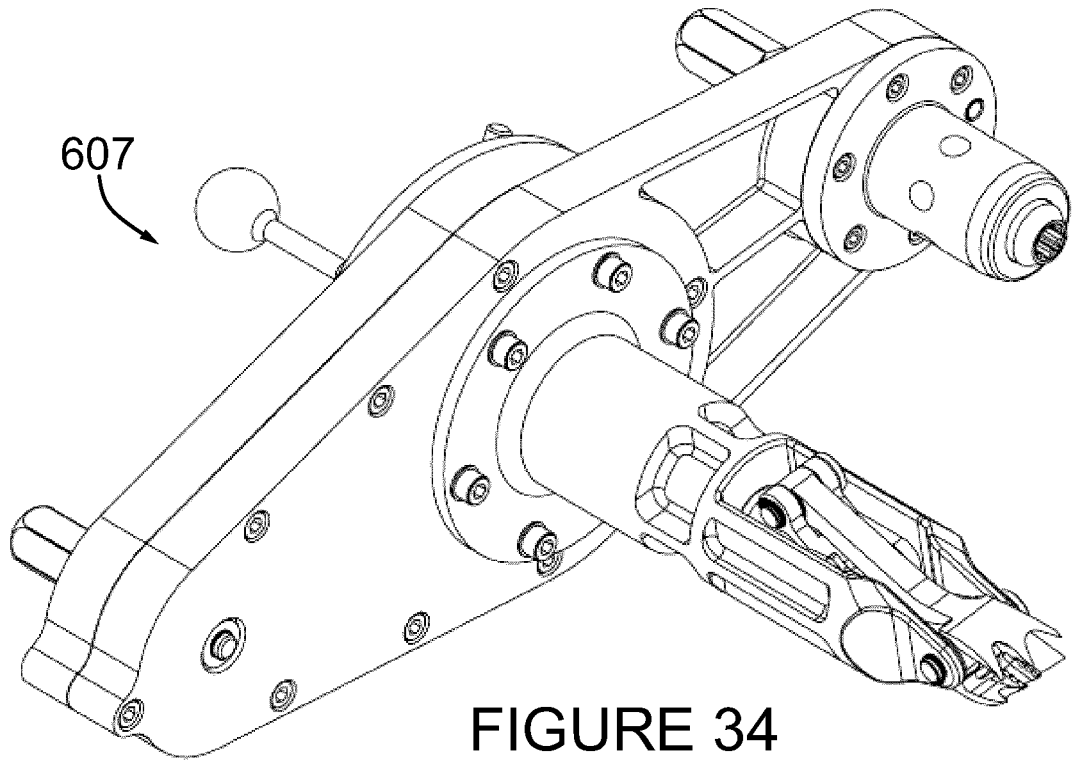
Figure 35:
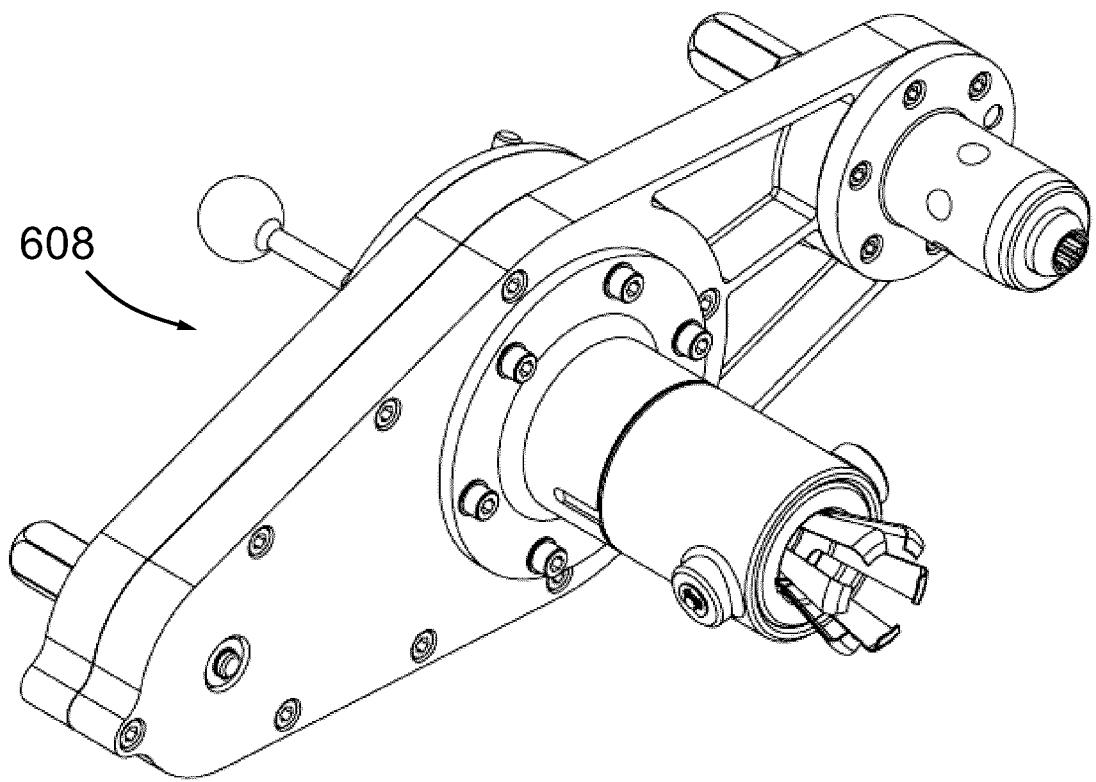
Figure 36:
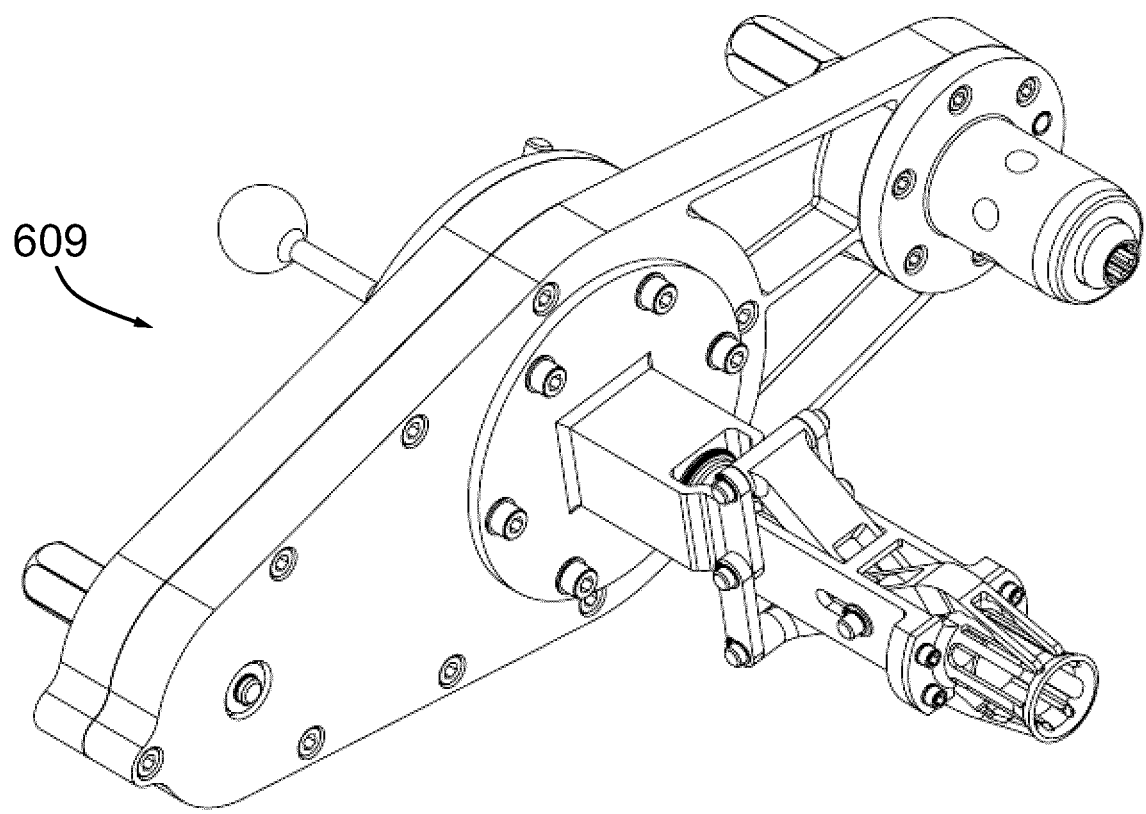

FIG. 27 shows conceptually a dexterous end effector 550 with the necessary components for a refueling operation, namely; grasp mechanism 551, first rotary drive socket 552, second rotary drive socket 553, robotically mate-able electrical power and data signal connector drive electrical connectors 554, movable quick connect propellant couplings 555 and cameras 556. The propellant couplings 555 are connected upstream via hoses to the propellant transfer system 960. Cameras 556 provide close-in views of the grasping fixture 501 on refueling tool 10 prior to grasping by end effector 550 and similarly, the grapple fixture 610 prior to grasping by end effector 550 of any of the refueling support tools (608, 609) or site preparation tools (605, 606, 607). In one embodiment of the refueling system, a fiducial mark or machine vision target (not shown) is placed adjacent to grasp fixture 501 on top plate 479. This enables the processor 830 in computer control system 800 to compute the position of the grasp fixture 610 based on video stream images of the target obtained from cameras 556. This position can be used to guide the motion of the robotic arm 84 by the automatic control system 830 to the ready-to-grasp position of the grapple or grasp fixture. Alternatively, a video display of that fiducial mark can be displayed to a human tele-operator, to help them guide the motion of robot arm 84 to the ready-to-grasp position. The refueling support tools (608, 609) and site preparation tools (605, 606, 607) can be similarly equipped with fiducial marks or targets on common tool base structure 620, adjacent to grapple fixture 610. These cameras 556 could also be used to monitor the action of the tool tips of the blanket cutter tool 605, blanket handling tool 606, wire Cutter Tool 607, B-Nut Removal Tool 608 and crush seal removal tool 609.

In operation, after the servicer spacecraft 80 has captured the client satellite 81 with berthing device 950 and after the FDV worksite 50 has been prepared using the robotic arm 84 and supporting tools in a succession of operations to expose the FDV 54, the robotic arm 84 then brings refueling tool 10 to the FDV worksite 50 and into alignment with the selected FDV 54 axis, thereafter approaching along the FDV axis to effectively lower the refueling tool 10 onto the FDV bracket 52. The refueling tool vision system 40 of the refueling tool 10 provides the primary means for sensing the correct alignment of the refueling tool 10 to the FDV 54 and monitoring the approach to the FDV bracket 52 until contact between contact spheres 490 of the touchdown sensing system and the FDV bracket 52 is sensed by force/moment sensing or other means within the robotic arm 84 or tool.

Actuation of mechanism A 12 then causes the mechanism A 12 to close symmetrically around the valve body 56 and torque reaction flats 58, bringing the refueling tool 10 and the FDV 54 into final alignment, thereby clamping onto the valve body 56 and the torque reaction flats 58. An operator, using primarily the view from the camera 42, now uses mechanism C 20 to lower the wrench jaws 154 into position near the mid height of the actuation nut 62, having first confirmed through the view from the camera 42 that mechanism B1 14, for wrench closing and opening, is sufficiently open. Mechanism B2 18, for wrench rotation, is then adjusted so that the wrench jaws 154 are parallel to a pair of flats on the actuation nut 62 nearest the middle of the wrench rotation range of motion. Mechanism B1 14 is then commanded in the closing direction. As the wrench jaws 154 close, an operator may pause to further adjust wrench rotation or wrench elevation into more precise alignment using mechanisms B2 18 and C 20 respectively.

When satisfied that the alignment between wrench jaws 154 and actuation nut 62 is good by checking the view from the camera 42, an operator commands the wrench jaws 154 to fully close, where the closing action stops automatically when the mechanism B1 14 has achieved a preset level of torque as determined by the preload microswitch 169 of mechanism B1 14. Once the actuation nut 62 is within the wrench jaws 154, an operator commands a clockwise rotation at a preset level of torque in order to ensure the actuation nut is closed. These activities ensure the actuation nut 62 is fully closed prior to any subsequent operations on the FDV 54 to prepare it for refueling. After the preset level of torque has been applied, regardless of whether or not the actuation nut 62 has rotated, the actuation nut will be released and the wrench jaws 154 will be reconfigured into a similar alignment with the B-nut 64 at the top of the FDV 54 using mechanisms B1 14, B2 18 and C 20 for wrench opening/ closing, wrench rotation and wrench elevation respectively. After aligning with and closing on the B-nut 54 using the same methodology as just described for the actuation nut 62, mechanism B2 18 is actuated in a counter clockwise direction. Unlike the actuation nut 62, the B-nut 64 must rotate for successful completion of this step. Rotation of about one quarter turn is required to ensure sufficient loosening of the B-nut 64 by the refueling tool 10, and this is achieved by iteratively closing, then CCW rotation, then opening, then CW rotation of the wrench jaws 154.

The refueling tool 10 is then stowed on the servicer spacecraft 80 in order to use the B-nut removal tool 608 and crush seal removal tool 609 to remove the B-nut 64 and crush seal 702 respectively from the FDV 54. After the B-nut 64 and crush seal 702 are removed and discarded safely on the servicer spacecraft 80 using the B-nut removal tool 608 and the crush seal removal tool 609, the robotic arm 84 once again acquires the refueling tool 10 from its stowed location on the servicer spacecraft 80 and uses it to acquire a safety valve 350, also from a stowed location on the servicer spacecraft 80. Using the same approach methodology at the safety valve stowed location, and similarly using mechanism A 12 to close around the base of the safety valve stowed location, the safety valve carriage assembly 367 of mechanism D 22 is commanded to advance until trigger plate 407 contacts the safety valve shoulder 357, tripping the ready-to-latch microswitch 408.

The mate/de-mate carriage assembly 380 is then advanced causing locking arms 372 to close around the safety valve assembly 350 and lock into an external locking groove 352 of the safety valve assembly 350, with confirmation of the closing action coming from the view from the camera 42. The mate/de-mate carriage assembly 380 is further advanced to fully mate the quick connect 355 on the safety valve assembly 350 to the quick connect coupling 385 on the refueling tool 10 and as confirmed by the dual microswitch assembly 387.

Thereafter mechanisms B1 14, B2 18 and C 20 are used to align the wrench jaws 154 to the flats of the coupling nut 353 of the safety valve assembly 350, to close onto the coupling nut 353 and to loosen and rotate the coupling nut 353 through a predetermined number of rotations in order to release the safety valve assembly 350 from the stowage location, where the loosening of the coupling nut 353 is accommodated by axial motion of the coupling nut 353 afforded by spring 354 of the safety valve assembly 350. The safety valve assembly 350 is then fully retracted into mechanism D 22 by retracting the safety valve carriage assembly 367 and as confirmed by the safety valve carriage assembly 367 retracted microswitch 418. After transferring the safety valve assembly 350 back to the FDV worksite 50 and re-registering and re-clamping to the FDV valve body 56 and torque reaction flats 58, the safety valve carriage assembly 367 with the safety valve assembly 350 is commanded towards the FDV 54 until the coupling nut 353 comes into contact with the FDV 54, the contact being evident in the camera view by compression of the safety valve spring 354 as well as being indicated by compliance microswitch 415 of mechanism D 22.

Mechanisms B1 14, B2 18 and C 20 are then used to manipulate the wrench jaws 154 into position at the coupling nut 353, to close on the coupling nut 353, and to iteratively rotate the coupling nut 353 in the CW direction while monitoring the view from the camera 42 for progress. The same spring-resisted motion that tripped the compliance microswitch 415 to indicate contact between safety valve coupling nut 353 and FDV nipple 70 ensures there is always a small force acting to push together the threads of the coupling nut 353 and the FDV nipple.

Once the safety valve assembly 350 has been installed on the FDV 54, thereafter mechanisms B1 14, B2 18 and C 20 are used to align the wrench jaws 154 to the actuation nut 62 and to loosen and rotate the actuation nut 62 through a predetermined number of rotations in order to fully open the actuation nut 62 for subsequent fluid transfer. Once fluid transfer is complete from the servicer spacecraft 80 through the refueling tool 10, through the check valve 356 of the safety valve assembly 350 into the FDV 54 and thus into the client spacecraft 81, thereafter an operator confirms alignment of the wrench jaws 154 to the actuation nut 62 and if required, thereafter uses mechanisms B1 14, B2 18 and C 20 to align the wrench jaws 154 to the actuation nut 62. The wrench jaws 154 are then commanded to rotate the actuation nut 62 through a predetermined number of rotations in order to fully close the actuation nut 62 after completion of fluid transfer. The mate/de-mate carriage assembly 380 is then retracted until the quick connect 355 on the safety valve assembly 350 is de-mated from the quick connect coupling 385 on the refueling tool 10 and as confirmed by the dual microswitch assembly 387.

The mate/de-mate carriage assembly 380 is then further retracted to fully open the locking arms 372 from the external locking groove 352 of safety valve assembly 350, with confirmation of the opening action coming from the view from the camera 42. The safety valve assembly 350 is left behind on the client spacecraft 81 after refueling is complete and the refueling tool 10 is subsequently mated to a safety valve fixture 83 on the servicer spacecraft 80 to purge propellant hose 980 and refueling tool 10 through the safety valve fixture 83 prior to stowing the refueling tool 10 on the servicer spacecraft 80.

Supporting Tools

Referring to FIGS. 28 to 36, support tools 601 for refueling are independent tools used for specific steps in the refueling flow. Each of these tools 601 has a common tool base structure 603 and a specific tool tip, designed for the specific task the tool is required for. The common tool base 603 allows for a single robotic interface to a manipulator system with a specific 'end-of-arm-assembly', while allowing for several tasks to be accomplished. The common base structure 603 is made up of a grapple fixture 610, the grasping interface for the tool designed for robotic grasping by the 'end-of-arm-assembly' located in the end effector 550 of robotic arm 84 mounted on the servicer spacecraft 80, see FIG. 54. Based structure 603 further includes tool mechanism drive interface(s) 612 and 613, used for enacting the functions of a given tool via a drive actuator mechanism that resides on the 'end-of-arm-assembly'. In the embodiment described herein there are two (2) tool mechanism drive inputs, one of which is used to drive the specific tool tip on each of the support tools, and the second to drive a 'tie-down' mechanism for retaining the tool when not grasped by the manipulator system. Base 603 includes a tool mechanism gear train 614 that transfers the rotation and torque from one of the tool mechanism drive input interfaces to the tool tip driveshaft 634 via the tool mechanism gear train interface 632, for actuation of that tip. Base 603 includes a tie-down mechanism 'active-half' 618, driven by the second tool mechanism drive 613 interface either directly, or in an alternate embodiment through another gear-train transmission to the location of the alternate tie-down mechanism. Base 603 includes a structure 620 that holds the constituent components of the common base 603 together.

The common tool base 603 has an interface to the tool tips 630, which are permanently attached to an instance of the common base tools 603 at the tool tip to tool base geartrain interface 632 and the tool tip bolted interface 638. This interface involves a feature that allows for the transfer of rotary mechanical power from the tool mechanism gear train interface 632 to the tool tip drive shaft 634. The main structure 636 of the tool tip is rigidly connected to the common tool base 603, in this embodiment through the use of a bolted interface 638.

There are several functions in the refueling operations that are allocated to the support tools. These include site preparation tools which include a blanket cutter to 605, a blanket handler tool 606, and a wire cutter tool 607. The tool tips 630 of the three site preparation tools are all similarly designed, whereby they all require a simple scissor-action linkage to perform their function. Refueling support tools include a B-nut removal tool 608 and a crush seal removal tool 609. These will each be described below.

Site Preparation Tools

Figure 37:
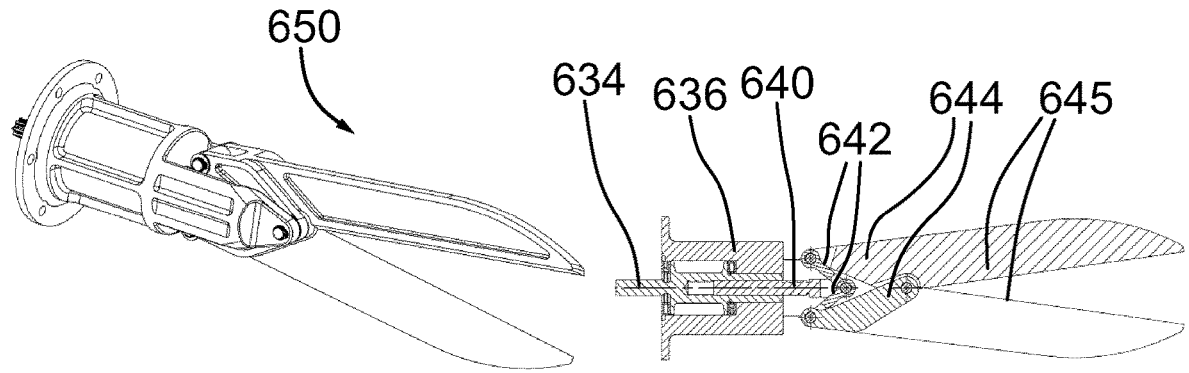
FIGS. 37 to 39 show in the left-hand panel of each FIGURE a perspective view, and in the right-hand panel of each FIGURE cross sectional view of three (3) site preparation tool tips including a blanket cutter tool 650 in FIG. 37, a blanket handler tool 652 in FIG. 38 and a wire cutter tool 654 in FIG. 39.
Figure 38:
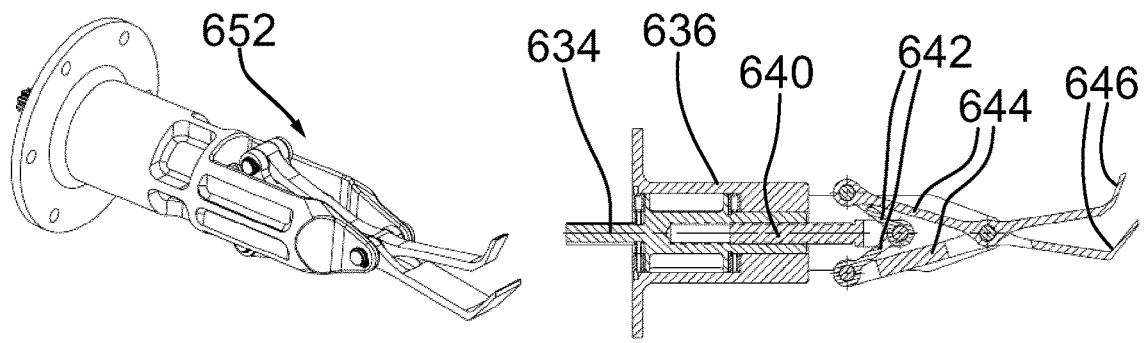
Figure 39:
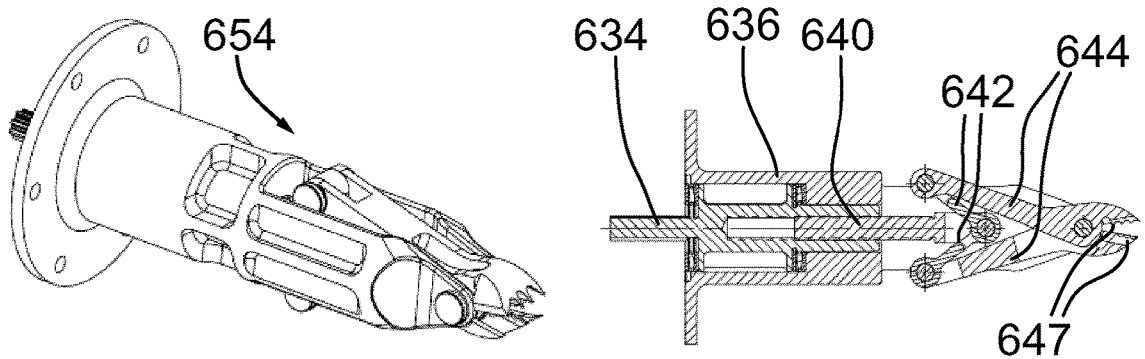
Figure 40:
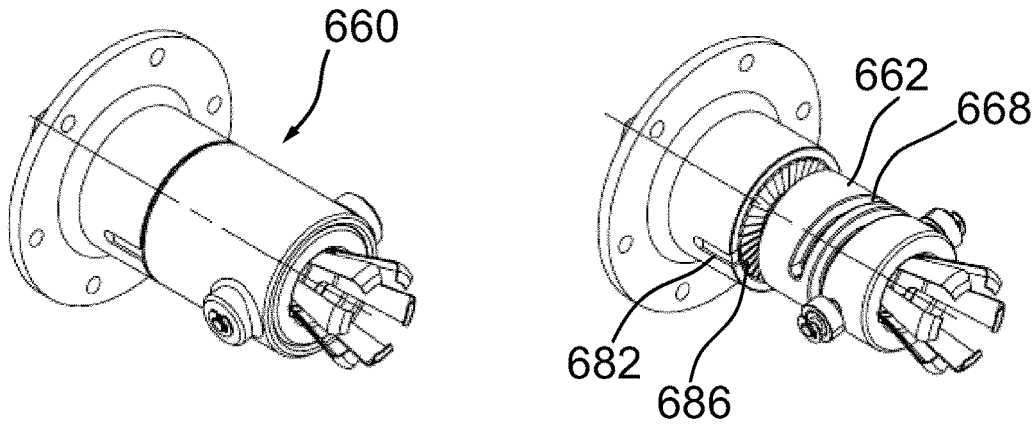
FIG. 40 shows perspective views of a B-Nut removal tool tip used for removing the FDV B-nut prior to refueling, with the left-hand panel showing the tool fully assembled and the right-hand panel showing the tool partially disassembled to show some of the internal components.
Figure 41:
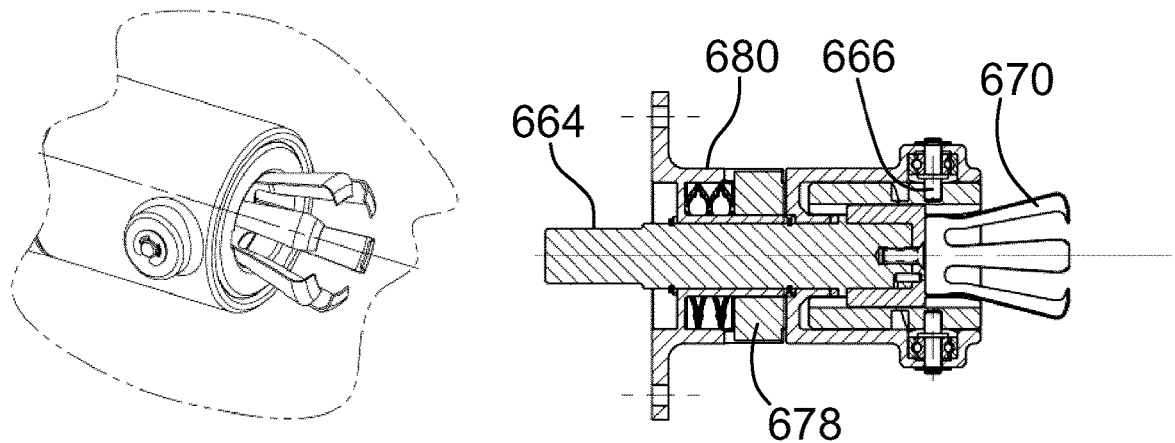
FIG. 41 shows a partial perspective view in the left-hand panel and a full cross-sectional view taken from the perspective view of the -Nut removal tool tip prior to engagement with the FDV.
Figure 42:
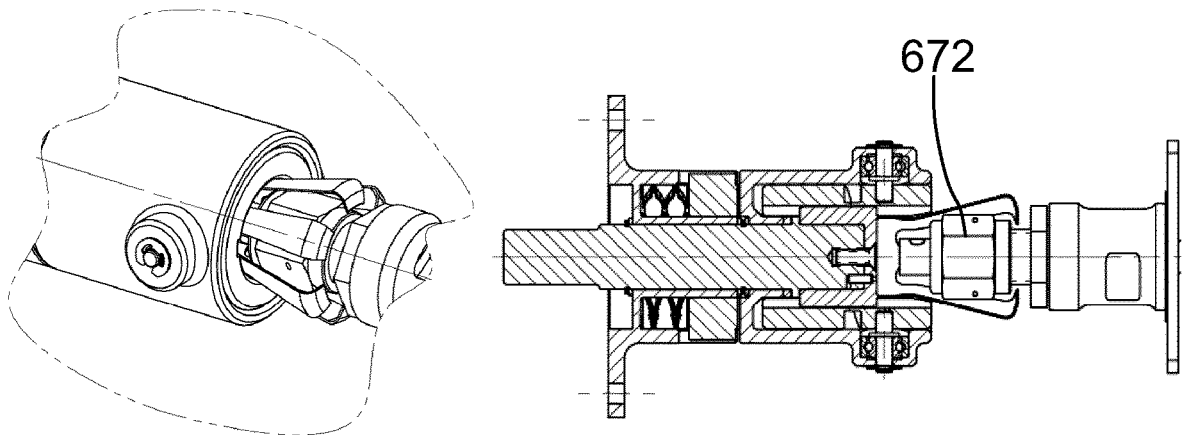
FIGS. 42 to 45 show a partial perspective view in the left-hand panel and a full cross-sectional view taken from the perspective view B-Nut removal tool 608 during stages of motion once it has engaged with the B-nut on the FDV.
Figure 43:
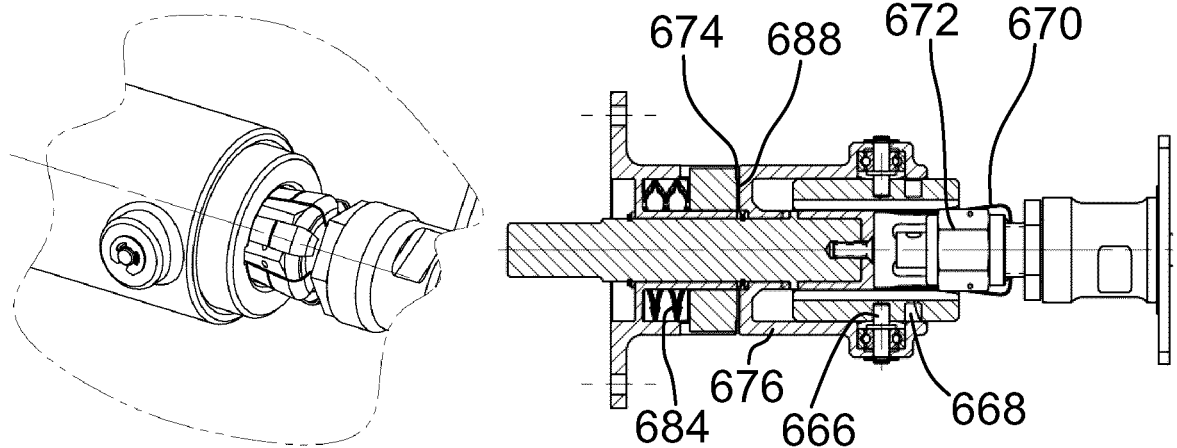
Figure 44:
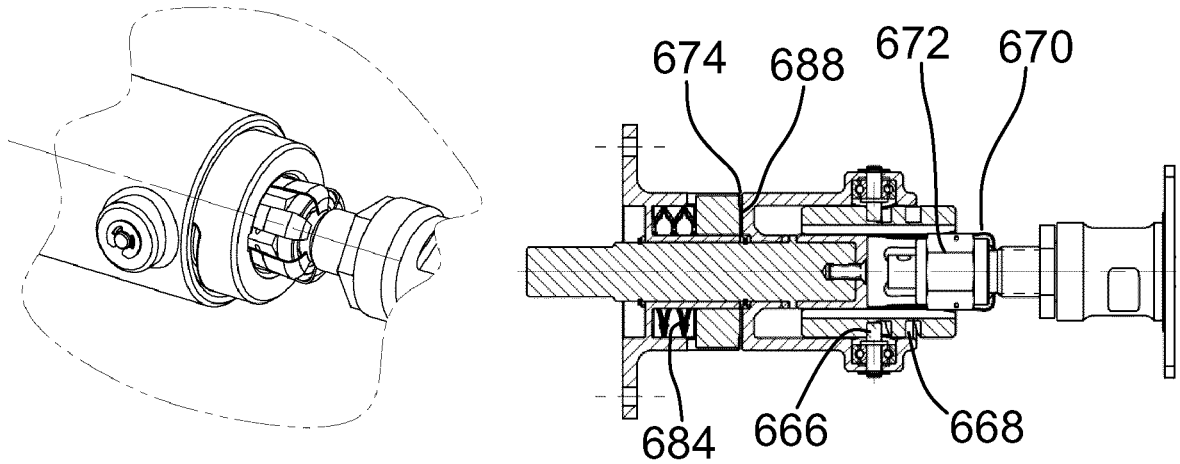
Figure 45:
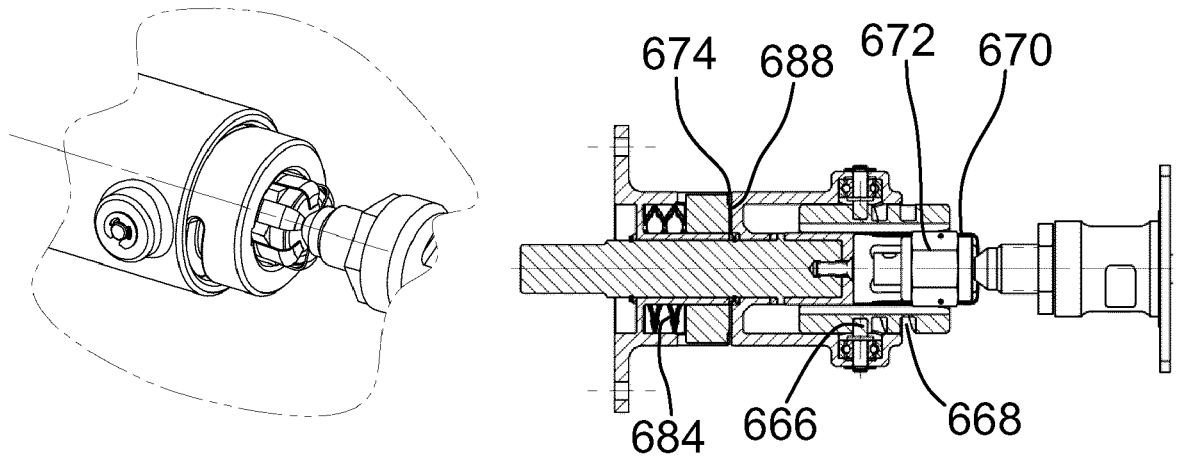
Figure 46:
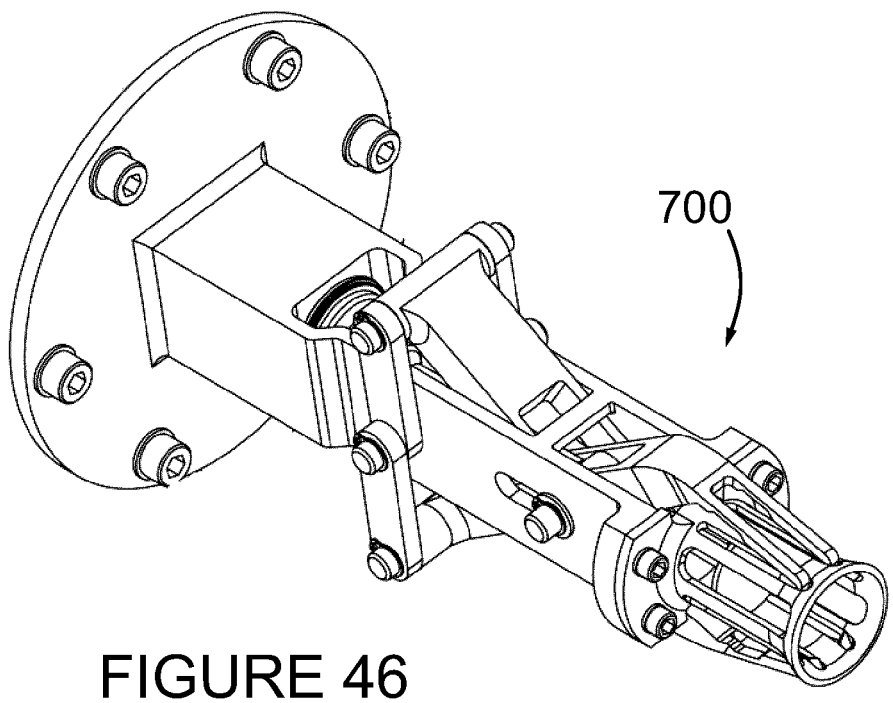
FIG. 46 is a perspective view of a crush seal removal tool tip 700 for removal of the crush seal.
Figure 47:
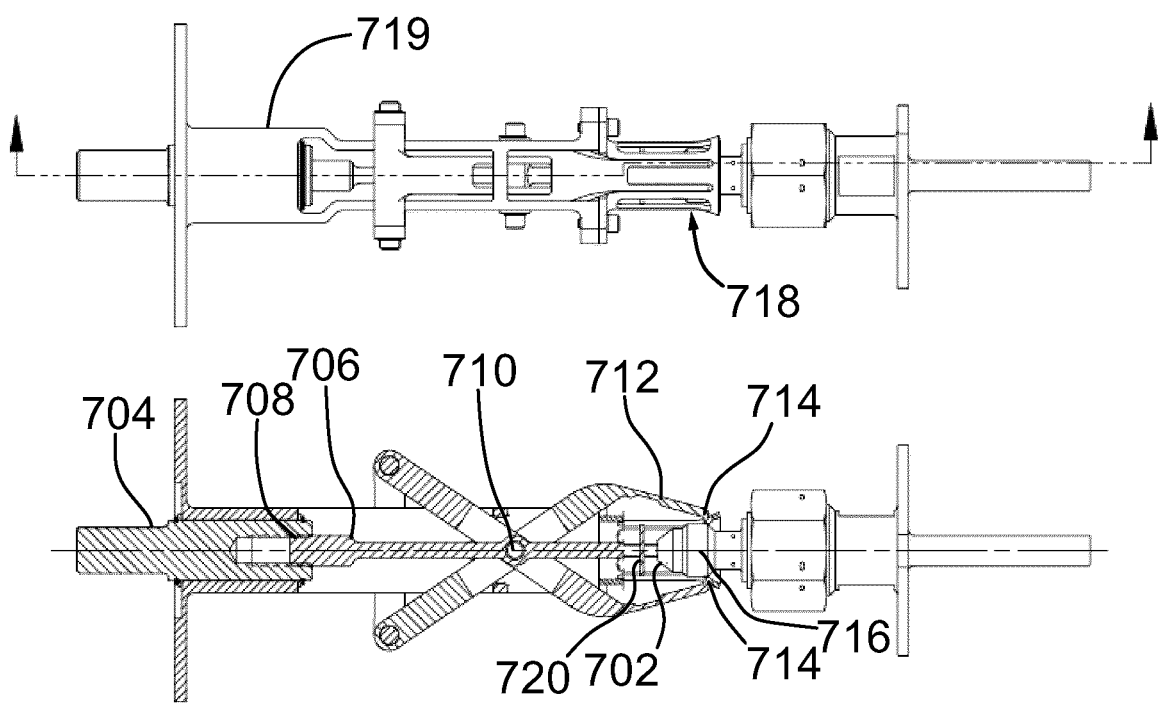
FIGS. 47 to 50 show various elevational views (top panels) of the crush seal removal tool tip 700 and associated cross sectional views (bottom panels) taken along the cross-section lines.
Figure 48:
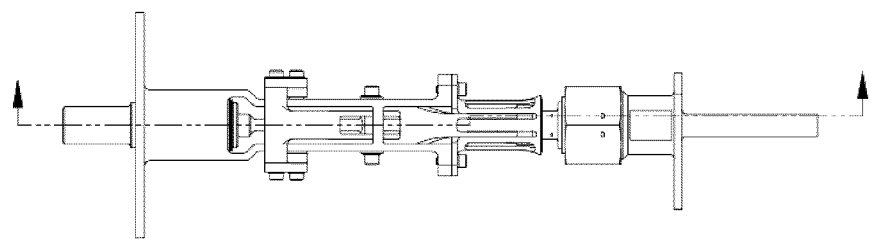
Figure 48:
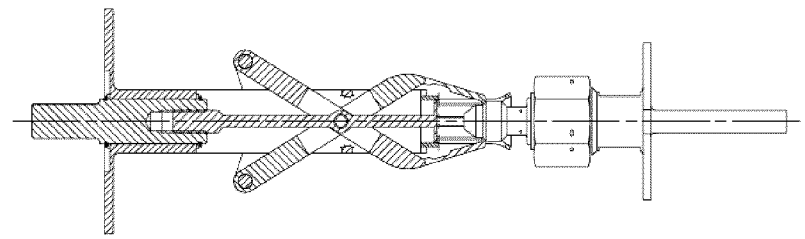
Figure 49:
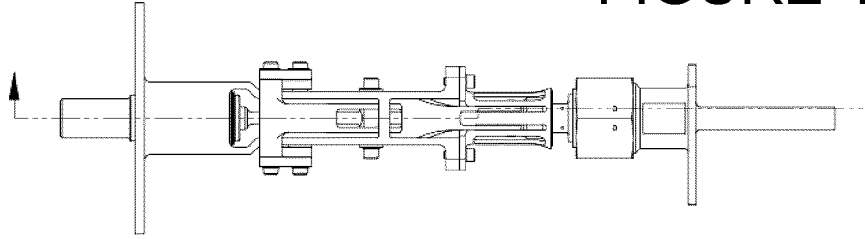
Figure 49:
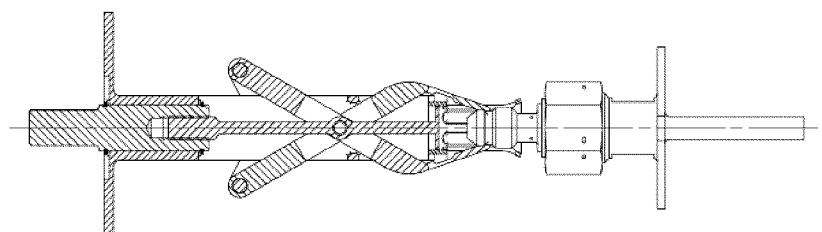
Figure 50:
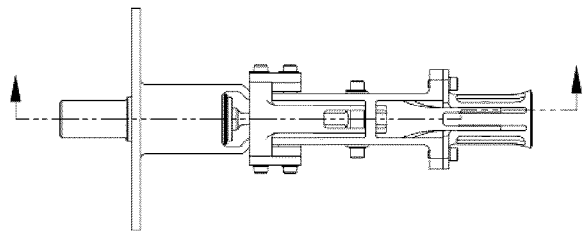
Figure 50:
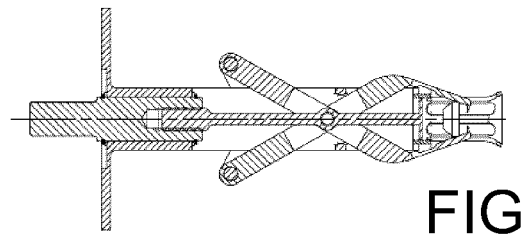

Referring to FIGS. 37 to 39, in each of the site preparation tool tips, the blanket cutter 650, the blanket handler 652 and the wire cutter 654, the tool tip drive shaft 634 is internally threaded and an advancing threaded rod 640 is installed in the drive shaft 634. The rotation of the drive shaft 634 causes the linear movement of the advancing threaded rod 640 which in turn moves a set of short input linkages 642 which in turn cause the output linkages 644 to pivot about a specific point in the given tool tip causing the device action features to open or close, depending on the direction of motion. These action features are cutting shears 645 in the blanket cutter 650, tweezer gripping paddles 646 in the blanket handler 652 and a shear cutter with gripper feature 647 in the wire cutter 654.

B-Nut Removal Tool Tip

Referring to FIGS. 40 to 45, B-Nut removal tool tip 660 stages motion into two parts. Initially the collet 662 is driven forward by the rotation of the drive shaft 664 due to the cam-pins 666 that run in slots 668 on the collet 662 until the spring wrench fingers 670 contacts the B-Nut hex 672 and/or the cam pins 666 reach the end of the collet slots 668. The drive shaft 664 then continues to rotate forcing the ratchet disk 674 interface to separate, causing the pin carrier housing 676 to rotate with the collet 662 and spring fingers 670, and in doing so the B-Nut 64, captured by the shape of the closed spring fingers 670 is threaded off of the FDV 54. To discard the B-Nut 64, the drive shaft 664 is rotated in the opposite direction than previously described. The ratchet disk 678 restricts motion of the pin carrier 676 in this direction, forcing the collet 662 to retract and allow the wrench spring fingers 670 to open, thus releasing the B-Nut 64.

The ratchet disc 678 controls the rotary motion of the pin carrier housing 676 by being keyed 682 against rotation with respect to the tool-tip base structure 680 while being preloaded against the pin carrier housing 676 with a preload spring 684. The ratchet disc surface 686 and the mating surface 688 of the pin carrier housing 676 have mating ramp features. In one direction, where the shallow angled surfaces of the ramps slide against each other motion is permitted, which is rotation of the tool to remove the B-Nut 64, only when the input torque is enough to slide the ramps over each other while under the preload spring 684 preload that pushes the ratchet disc 678 against the pin carrier housing 676. In the other direction the steep side of the ramps engage and relative motion is inhibited in that direction, allowing the collet 662 to move to release the B-Nut 64. The drag in the ratchet disc interface 674 allows for axial motion of the collet 662 to occur ahead of rotary motion.

Crush Seal Removal Tool

Referring to FIGS. 46 to 50, the crush seal 702 may be adhered to the FDV valve stem 716 and must be removed prior to installing the safety valve 350 with a new crush seal 702. To operate the crush seal removal tool tip 700 the drive shaft 704 rotated, which translates the plunger 706 backwards into the drive shaft 704. The drive shaft 704 has an internal thread while the plunger 706 an external thread where they interface 708. While the plunger 706 translates, the pivot point 710 of the flex jaw linkages 712 moves with the plunger 706 causing the flex jaw tips 714 to close and retract making contact with the FDV valve stem 716 and dragging along the FDV valve stem 716. The flex jaw tips 714 are preloaded against the FDV valve stem 716 and dragged along until they hook onto the crush seal 702 and pry it loose. As the flex jaw tips 714 come free from the FDV valve stem 716, the crush seal 702 is retained within the cage 718 which is connected to the tool tip base structure 719 which is in turn connected to the common base 603. Rotation of the drive shaft 704 in the reverse direction opens the flex jaw tips 714 and ejects the crush seal 702 from the tool tip 700 but pushing the plunger face 720 forward and pushing the crush seal 702 out of the cage 718.

Tool Tie-Down

Figure 51:
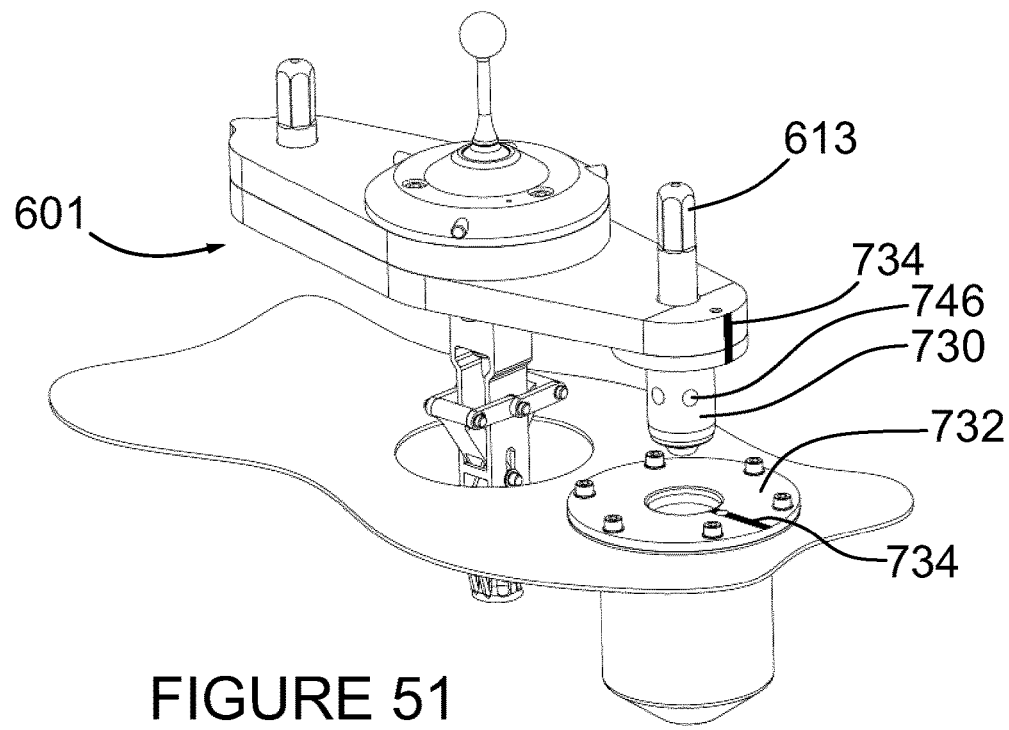
FIG. 51 is a perspective view of an embodiment of a tool tie-down mechanism located above its associated tool tie-down receptacle.
Figure 52:
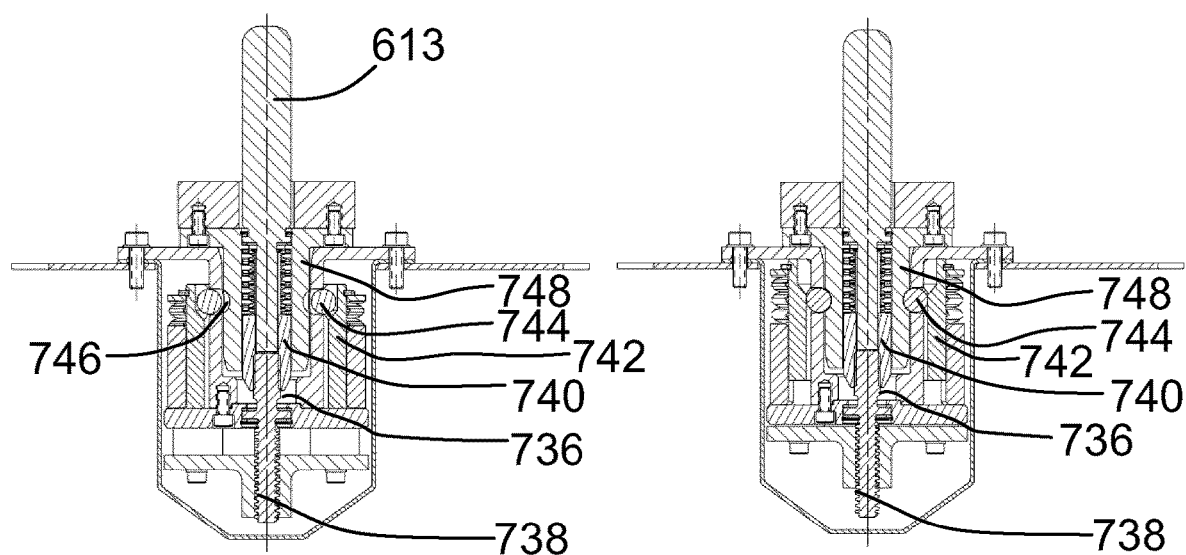
FIGS. 52 and 53 are cross sectional views from FIG. 51 of the tool tie-down mechanism.
Figure 53:
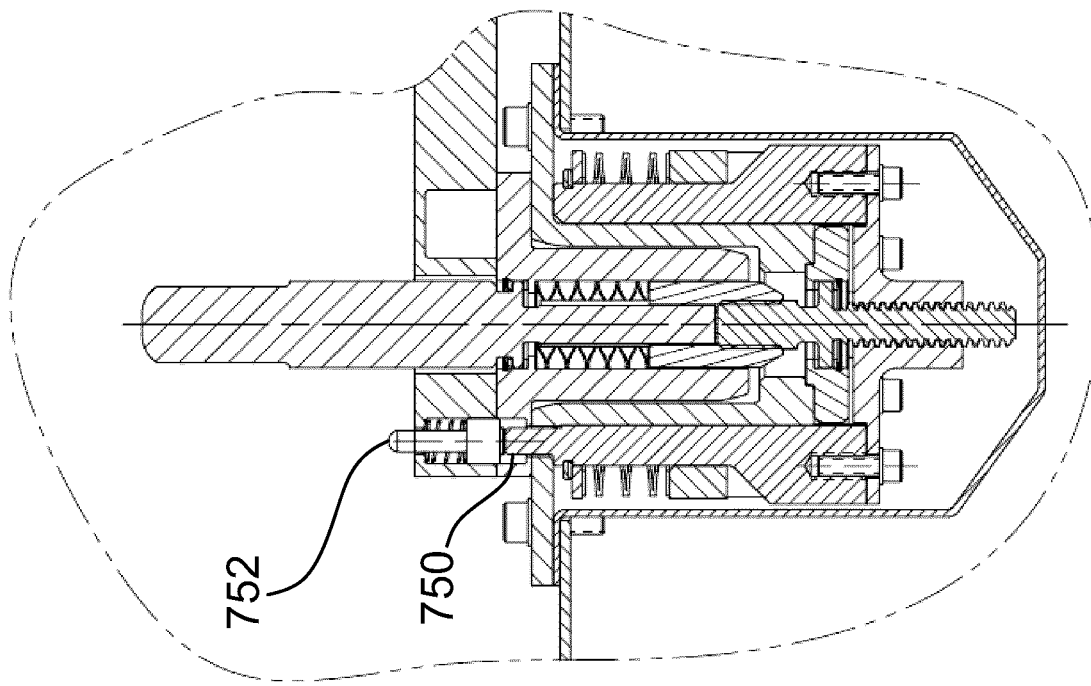
Figure 53:
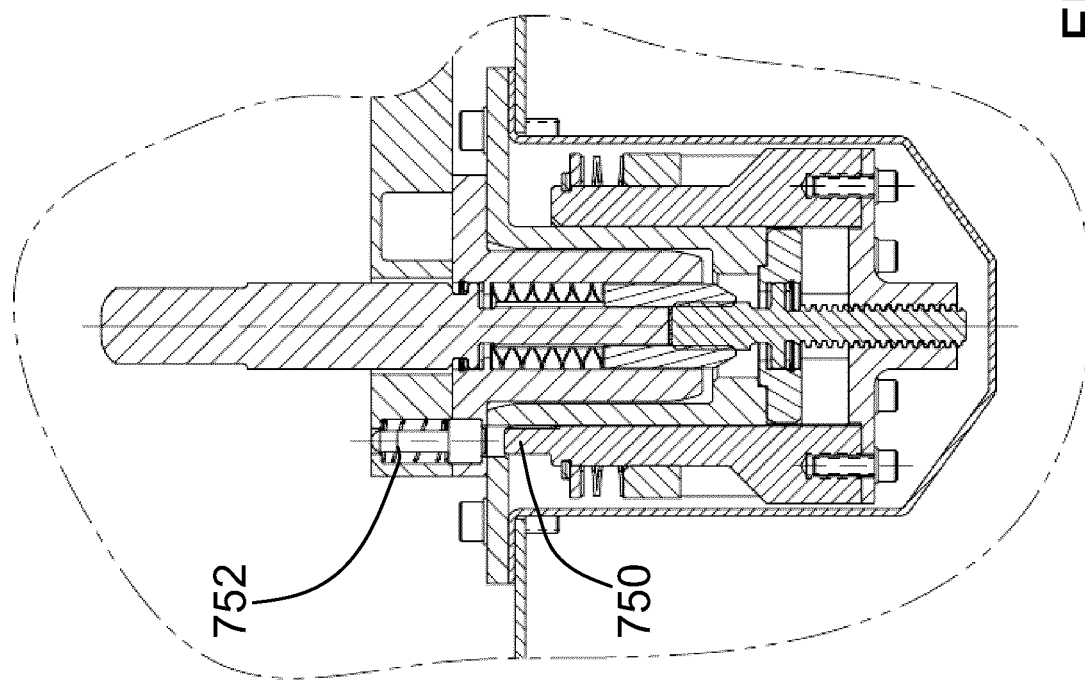

Referring to FIGS. 51 to 53, an embodiment of the tool tie-down method is to use a ball lock, quick-disconnect mechanism. This is a tie-down that uses the input mechanical motion from the end effector to enable tie-down and retention on the spacecraft, without the need to have active mechanisms for each tool-tie down. In the event that active tie-down mechanisms are not feasible for all tools on the servicer deck, this tool tie-down method, precludes the need for a second robot arm to provide actuation to tie a supporting tool down while the supporting tool is held by the first robotic arm 84. In this mechanism, once the robotic arm has positioned the tool such that the tie down body on the tool 730 is fully engaged within the locking interface on the spacecraft 732, guided by appropriate visual cues 734 on the tool and servicing spacecraft and by the arm control software, the secondary tool mechanism drive 613 is rotated on the tool. This rotation is transmitted to a spline 736 on the lead-threaded drive shaft 738 within the spacecraft side receptacle 732 by the actuator spline within the tie down body 740. Rotating the drive shaft 738 causes the ball lock sleeve 742 to advance forcing a plurality of balls 744 within the spacecraft side receptacle 732 to advance into indentations 746 in the tie down body 748, thus retaining the tie down body 748 and the attached tool tie-down half 730 within the spacecraft side receptacle 732. To provide visual confirmation of the tie-down of the tool a visual cue indicator 752 is provided. As the ball lock sleeve 742 is advanced a protrusion on the ball lock sleeve 750 simultaneously pushes a spring loaded indicator 752 within the tool thus exposing more and more of the spring loaded indicator 752 as the ball lock sleeve 742 advances. The spring loaded indicator 752 is clearly marked such that when the ball lock sleeve 742 has fully engaged the tie down body 748 a visual indication is clearly visible. Disengagement of the tie down is through opposite rotation of the second torque drive 613. Alternate embodiments of the tie-down are possible, including a breech-lock style.

Figure 54:
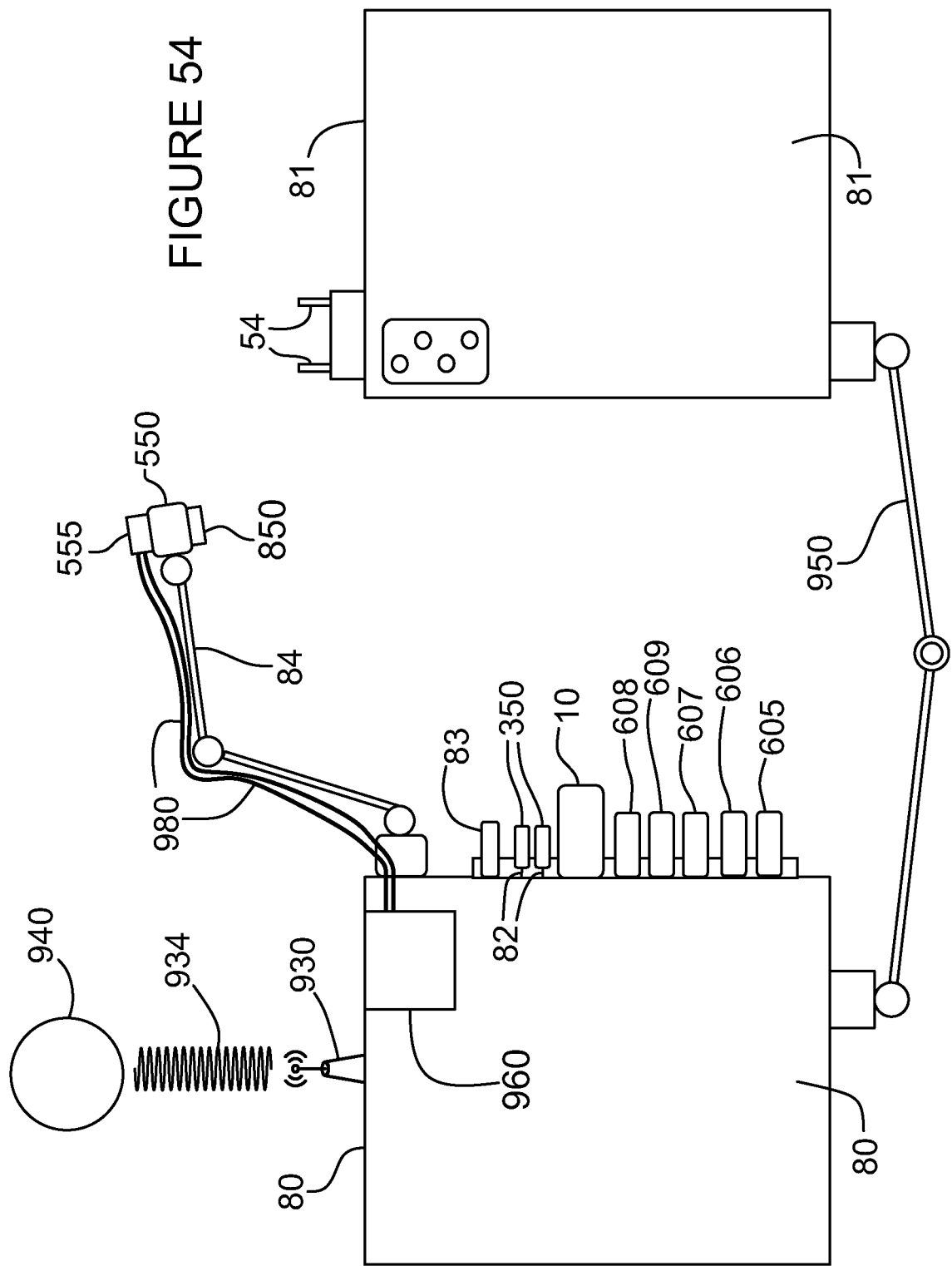
FIG. 54 is a system diagram showing a servicer satellite berthed to a client satellite to be refueled, showing the various supporting tools needed for accessing the FDV sequestered on the servicer satellite.
Figure 55:
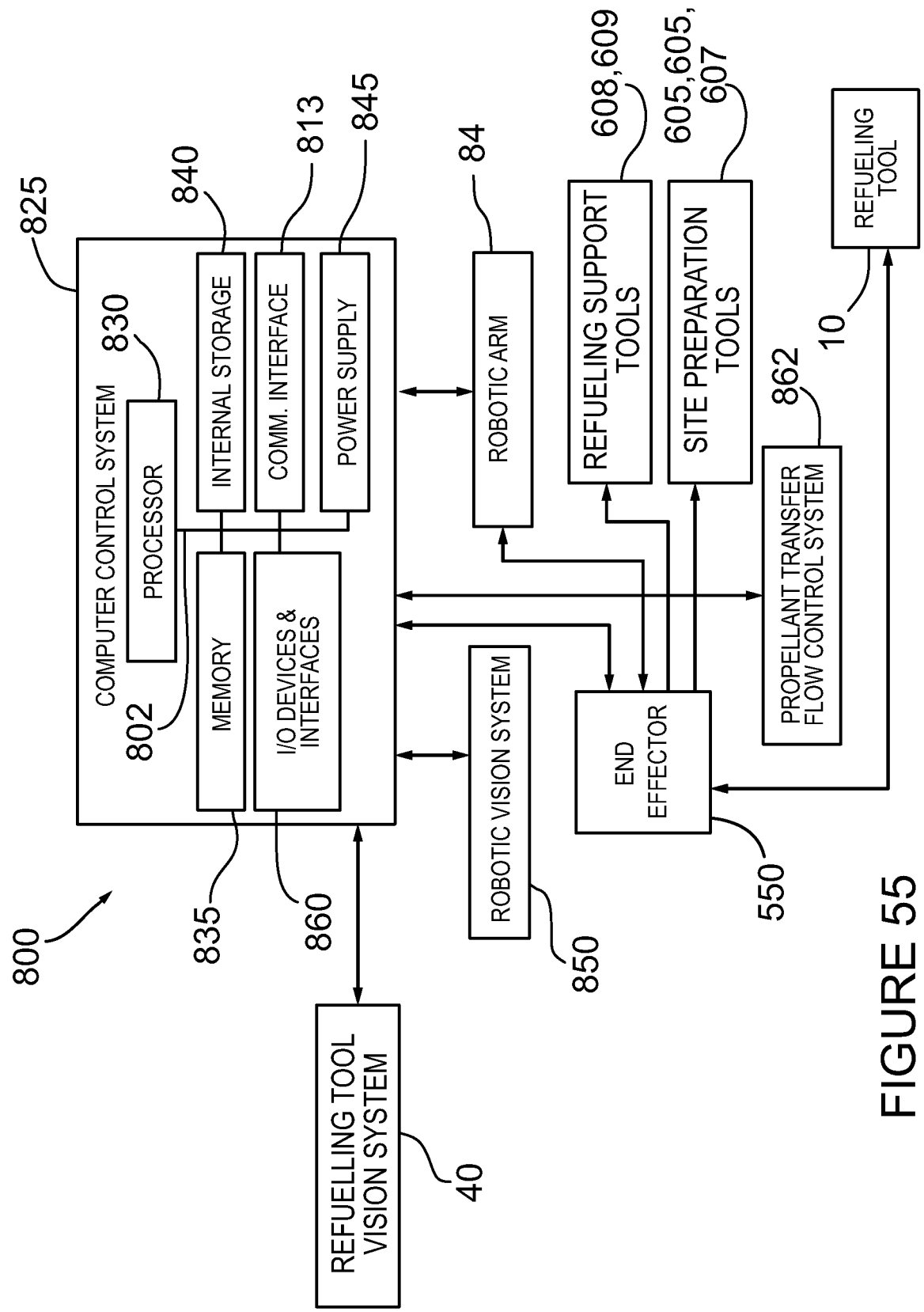
FIG. 55 shows a non-limiting exemplary example of a computer control system that may be used to control the actions of the robotic tool.

Detailed Operations with Refueling Tool (RT):

FIG. 54 shows a servicer spacecraft 80 and a client satellite 81 to be re-fueled by the servicer spacecraft 80. FIG. 55 shows a non-limiting exemplary example of a computer control system that may be used to control the actions of the refueling tool 10.

The tool 10 disclosed herein for accessing fill/drain valves 54 on the client satellite 81 may be mounted on the dedicated refuelling or servicer spacecraft 80 launched directly from earth.

The system also includes the propellant transfer system 960 for transferring bi- or mono-propellants from the servicing satellite 80 to the client satellite 81 as disclosed in U.S. Pat. No. 8,899,527 issued Dec. 2, 2014 (which is incorporated herein in its entirety by reference) the purpose of which is to provide a propellant transfer system 960 (FIG. 54) for transferring the propellant which is under a combination of remote teleoperator and computer control. Such a dedicated servicer spacecraft 80 may include a spacecraft docking mechanism such as that disclosed in U.S. Pat. No. 6,969,030 issued Nov. 29, 2005, which patent is incorporated herein in its entirety by reference.

FIG. 54 shows those items pertaining to the refueling of the client satellite 81 in addition to the refueling tool 10. These include, in addition to the servicer spacecraft 80, the client fill/drain valve(s) 54, a robotic arm 84, an end effector 550 coupled to the robotic arm 84, the refueling tool 10 releasibly grippable by the end effector 550, the propellant transfer system 960, a movable quick connect propellant coupling 555 mounted in the end-effector 550, the propellant outlet hose 980 running along arm 84, and a communication system 930 to provide the two-way radio link 934 to Earth 940 (or space station or mother ship-whichever is the location of the teleoperation control). Stowage points are shown for the refueling tool 10, the safety valve fixture 83, the stowage posts 82 for the safety valve assembly 350, supporting tools including the blanket cutter tool 605, the blanket handling tool 606, the wire cutter tool 607, the B-Nut removal tool 608, and the crush seal removal tool 609.

FIG. 54 shows a berthing device 950 with its proximal end rigidly attached to servicing spacecraft 80 and its distal end releasibly attached to the client spacecraft 81. In one embodiment, berthing device 950 consists of a manipulator arm of equivalent functionality and performance to the robot arm 84 and end-effector 550, with a grapple fixture 501 (not shown on FIG. 54) mounted on the exterior of the client spacecraft 81, compatible for grasping by berthing device 950. In a second embodiment, the berthing device consists of a spacecraft docking mechanism as disclosed in U.S. Pat. No. 6,969,030 with the docking interface described in the patent mounted on the exterior of the client spacecraft. The berthing device is required to establish a sufficiently rigid and load-bearing structural connection between servicing spacecraft 80 and client satellite 81 prior to beginning refueling operations described in FIG. 56A and FIG. 56B. It must be sufficiently rigid that interaction of the robot arm 84 and end effector 550 and a servicing tool with a surface or feature on the client spacecraft 81 does not produce loads which cause material change in the relative position and orientation of the client spacecraft 81 with respect to the servicer spacecraft 80.

In addition, the servicer spacecraft 80 includes an onboard computer control system 800 (FIG. 55) which may be interfaced with the tool 10, in addition to a propellant flow control system, shown at 862 so that it can drive all the components that are opened and closed during the propellant transfer operations in a selected sequence depending on which mode of propellant transfer has been selected based on the pressure in the client satellite 81 propellant tank. With the presence of the computer control system 800 interfaced with the propellant flow control system, the propellant transfer process may be autonomously controlled by a local Mission Manager or may include some levels of supervised autonomy so that in addition to being under pure teleoperation there may be mixed teleoperation/supervised autonomy.

An example computing system 800 forming part of the propellant resupply system is illustrated (FIG. 55). The system includes a computer control system 825 configured, and programmed to control movement of the robotic arm 84 including the handling and operation of the servicing tools (10, 605, 606, 607, 608 and 609) and safety valve assembly 350 through the servicing sequence of tasks shown in FIG. 56A and FIG. 56B.

The command and control system 800 is also configured to control movement of the robotic arm 84 and the end effector 550 attached thereto for controlling the action of the refueling tool 10 and supporting tools. This may be the same command and control system mentioned above that is interfaced with the flow control system, for example a computer mounted on the servicer spacecraft 80 which is programmed with instructions to carry out all operations needed to be performed by the servicer spacecraft 80 during approach, capture/docking with the client satellite 81 and refueling operations. It may also be a separate computer system.

The satellite refueling system includes a refueling tool vision system 40 for viewing the operation of the refueling tool operations on the fill-drain valve. It also includes a robotic vision system 850 for the purposes of general robotic situational awareness and monitoring the action of the tool tips of the blanket cutter tool 605, blanket handling tool 606, wire Cutter Tool 607, B-Nut Removal Tool 608 and crush seal removal tool 609. It also can be used for worksite registration. For this last function, the robotic vision system is used to determine the location of objects in the general workspace with respect to a command frame of reference on the end effector 550. This location is determined as a position and orientation of an object of interest with respect to a frame of reference at the end effector 550. Objects of interest include the locations of any of the following: refueling tool 10, refueling support tools (608, 609) and site preparation tools (605, 606, 607) at their stowage locations on the servicer spacecraft. Other objects of interest include the locations of the FDVs 54 on the client spacecraft 81.

Communication system 930 is interfaced with the robotic arm 84 and configured to allow remote operation (from the Earth 940 or from any other suitable location) of the robotic vision system 850, refueling tool vision system 40, the robotic arm 84 and hence the refueling and supporting tools. The vision system may include distinct markers mounted on the fluid transfer coupling used to couple the fluid transfer system storage tank and piping system to the fill/drain valve of the client satellite 81, as well as markings on all tools associated with the fluid transfer operation.

These cameras may be used within a telerobotic control mode where an operator controlling the servicing actions on earth views distinct views of the worksite on display screens at the command and control console. In an alternative mode, the position of elements like the fill drain valve may be determined by either a stereo camera and vision system which extracts 3D points and determines position and orientation of the fill-drain valve or other relevant features on the worksite from which the robotic arm holding tools (multi-function tool, refueling tool) can be driven to these locations according the sensed 6 degree-of-freedom coordinates.

The stereo camera could also be replaced with a scanning or flash lidar system from which desired 6 degree-of-freedom coordinates could be obtained by taking measured 3-D point clouds and estimating the pose of desired objects based on stored CAD models of the desired features or shapes on the refueling worksite. For those applications where the spacecraft was designed with the intention to be serviced, a simple target such as described in Ogilvie et al. (Ogilvie, A., Justin Allport, Michael Hannah, John Lymer, "Autonomous Satellite Servicing Using the Orbital Express Demonstration Manipulator System," Proc. of the 9th International Symposium on Artificial Intelligence, Robotics and Automation in Space (i-SAIRAS '08), Los Angeles, California, Feb. 25-29, 2008) could be used in combination with a monocular camera on the servicing robotics to locations items of interest such as the fill-drain valve 54. Finally, the robotic arm or device 84 used to position the device may include a sensor or sensors capable of measuring reaction forces between the tools and the work-site (e.g. fill-drain valves 54). These can be displayed to the operator to aid the operator in tele-operation control or can be used in an automatic force-moment accommodation control mode, which either aids a tele-operator or can be used in a supervised autonomous control mode.

As mentioned above, computer control system 825 is interfaced with robotic vision system 850, refueling tool vision system 40, the flow control system 862 of the propellant transfer system, and robotic arm 84. Previously mentioned communication system 930 is provided which is interfaced with the robotic arm 84 and configured to allow remote operation (from the Earth 408 or from any other suitable location) of the robotic vision system 850 (which can also include the cameras 556 in the end effector 550), the refueling tool vision system 40, the robotic arm 84, robotic end effector 550, blanket cutter tool 605, blanket handling tool 606, wire cutter tool 607, b-nut removal tool 608, crush seal removal tool 609, refueling tool 10 and the flow control system 862 (FIG. 55). A system of this type is very advantageous particularly for space-based systems needing remote control.

The end effector 550 possesses its own embedded processor (as does the robotic arm 84) and receiving commands from the servicing spacecraft computer. The end effector 550 also passes power and data from the central computer through to the refuelling tool 10. The refuelling tool 10 does not possess embedded computers/microcontrollers so it receives actuator commands from the computer control system 825 upstream via the end-effector 550. The end effector 550 embedded processor also receives video signals from refueling tool camera 40 as well as telemetry from tool sensors including but not limited to the linear potentiometer 476 and microswitches (127, 169, 266, 307, 311, 364, 387, 408, 415, 417 and 418). These sensed values can be used in closed loop control system functions within the end-effector. They are also passed to the command and control system 800 for overall on-orbit control and can also be displayed to a human tele-operator on earth or in another spacecraft.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine-readable media, such as discrete hardware components as large-scale integrated circuits (LSI's), application-specific integrated circuits (ASIC's), or firmware such as electrically erasable programmable read-only memory (EEPROM's).

As noted above, FIG. 55 provides an exemplary, non-limiting implementation of computer control system 825, forming part of the command and control system, which includes one or more processors 830 (for example, a CPU/microprocessor), bus 802, memory 835, which may include random access memory (RAM) and/or read only memory (ROM), one or more internal storage devices 840 (e.g. a hard disk drive, compact disk drive or internal flash memory), a power supply 845, one more of the communications interfaces 813, and various input/output devices and/or interfaces 860.

Although only one of each component is illustrated in FIG. 55, any number of each component can be included computer control system 825. For example, a computer typically contains a number of different data storage media. Furthermore, although bus 802 is depicted as a single connection between all of the components, it will be appreciated that the bus 802 may represent one or more circuits, devices or communication channels which link two or more of the components. For example, in personal computers, bus 802 often includes or is a motherboard.

In one embodiment, computer control system 800 may be, or include, a general purpose computer or any other hardware equivalents configured for operation in space. Computer control system 800 may also be implemented as one or more physical devices that are coupled to processor 530 through one of more communications channels or interfaces. For example, computer control system 800 can be implemented using application specific integrated circuits (ASIC). Alternatively, computer control system 800 can be implemented as a combination of hardware and software, where the software is loaded into the processor from the memory or over a network connection.

Computer control system 800 may be programmed with a set of instructions which when executed in the processor causes the system to perform one or more methods described in the present disclosure. Computer control system 800 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine-readable medium includes any mechanism that provides (i.e., stores and/or transmits) information in a form accessible by a machine (e.g., a computer, network device, personal digital assistant, manufacturing tool, any device with a set of one or more processors, etc.). Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is also configured for full autonomous operation. A fully autonomous system is a system that measures and responds to its external environment; full autonomy is often pursued under conditions that require very responsive changes in system state to external conditions or for conditions that require rapid decision making for controlling hazardous situations. The implementation of full autonomy is often costly and is often unable to handle unforeseen or highly uncertain environments. Supervised autonomy, with human operators able to initiate autonomous states in a system, provides the benefits of a responsive autonomous local controller, with the flexibility provided by human teleoperators.

The block flow chart shown in FIG. 56 describes in detail the steps taken by the servicer spacecraft 80 when it is engaged with the client satellite 81 during refueling operations.

4.3 Tighten/Close Actuation Nut
  a. Touch down the contact spheres 490 to FDV bracket 52 and confirm using view from camera 42 both that the refueling tool 10 is down and that the jaws 121 of mechanism A, center and clamp 12 are fully open.
  b. Select mechanism A, center and clamp 12 with transmission 26 and confirm it has been selected using linear potentiometer 477 readout.
  c. Clamp FDV torque reaction flats 58 with mechanism A, center and clamp 12 and confirm using clamped microswitch 127 that a clamping load has been applied to the fill/drain valve, FDV 54.
  d. Select mechanism C, wrench elevation 20 with transmission 26 and confirm it has been selected using linear potentiometer 477 readout.
  e. Adjust mechanism C, wrench elevation 20 so wrench jaws 154 are in line with actuation nut 62 using view from camera 42. Monitor end of travel microswitches 307 during motion.
  f. Close wrench jaws 154 on actuation nut 62 using mechanism B1, wrench closing/opening 14 and confirm state using preload microswitch 169 while monitoring view from camera 42.
  g. Select mechanism B2, wrench rotation 18 with transmission 26 and confirm it has been selected using linear potentiometer 477 readout.
  h. Rotate actuation nut 62 using mechanism B2, wrench rotation 18. Monitor view from camera 42 during rotation, as well as CW/CCW microswitches 266 at ends of mechanism travel and read-out from torque cell 201.
  i. Open wrench jaws 154 off actuation nut 62 using mechanism B1, wrench closing/opening 14 and confirm state using preload microswitch 169 while monitoring view from camera 42.

4.4 Loosen FDV B-Nut Seal
  a. Select mechanism C, wrench elevation 20 with transmission 26 and confirm it has been selected using linear potentiometer 477 readout.
  b. Adjust mechanism C, wrench elevation 20 so wrench jaws 154 are in line with B-nut 64 using view from camera 42. Monitor end of travel microswitches 307 during motion.
  c. Close wrench jaws 154 on B-nut 64 using mechanism B1, wrench closing/opening 14 and confirm state using preload microswitch 169 while monitoring view from camera 42.
  d. Select mechanism B2, wrench rotation 18 with transmission 26 and confirm it has been selected using linear potentiometer 477 readout.
  e. Rotate B-nut 64 using mechanism B2, wrench rotation 18. Monitor view from camera 42 during rotation, as well as CW/CCW microswitches 266 at ends of mechanism travel and read-out from torque cell 201.
  f. Open wrench jaws 154 off actuation nut 62 using mechanism B1, wrench closing/opening 14 and confirm state using preload microswitch 169 while monitoring view from camera 42.
  g. Select mechanism A, centre and clamp 12 with transmission 26 and confirm it has been selected using linear potentiometer 477 readout.
  h. Un-clamp Mechanism A, centre and clamp 12 from FDV torque reaction flats 58 and confirm using clamped microswitch 127 that a clamping load has been removed from the fill/drain valve, FDV 54.

7.2 Acquire Safety Valve (SV) on Spacecraft (S/C)—Mate Quick Connects (QCs), Unfasten Fitting Nut
  a. Touch down the contact spheres 490 to Servicer spacecraft 80 and confirm using view from camera 42 that the refueling tool 10 is down and that the jaws 121 of mechanism A, center and clamp 12 are fully open.

b. Select mechanism A, center and clamp 12 with transmission 26 and confirm it has been selected using linear potentiometer 477 readout.
c. Clamp stowage post 82 with mechanism A, center and clamp 12 and confirm using clamped microswitch 127 that a clamping load has been applied to the stowage post 82.
d. Select mechanism D, FDV connection 22 with transmission 26 and confirm it has been selected using linear potentiometer 477 readout.
e. Advance safety valve carriage assembly 367 until trigger plate 407 contacts shoulder 357 of safety valve body 351 as confirmed by ready-to-latch microswitch 408.
f. Start driving mate/de-mate carriage assembly 380 to close locking arms 372 until fully closed on external locking groove 352 and confirm using view from camera 42 that the locking arms 372 have secured the safety valve assembly 350.
g. Continue driving mate/de-mate carriage assembly 380 until quick connect nipple 355 on safety valve assembly 350 is fully mated to quick connect coupling 385 and as confirmed by the dual microswitch assembly 387.
h. Select mechanism C, wrench elevation 20 with transmission 26 and confirm it has been selected using linear potentiometer 477 readout.
i. Adjust mechanism C, wrench elevation 20 so wrench jaws 154 are in line with coupling nut 353 using view from camera 42. Monitor end of travel microswitches 307 during motion.
j. Close wrench jaws 154 on coupling nut 353 using mechanism B1, wrench closing/opening 14 and confirm state using preload microswitch 169 while monitoring view from camera 42.
k. Select mechanism B2, wrench rotation 18 with transmission 26 and confirm it has been selected using linear potentiometer 477 readout.
l. Rotate coupling nut 353 with mechanism B2, wrench rotation 18. Monitor view from camera 42 during rotation, as well as CW/CCW microswitches 266 at ends of mechanism travel and read-out from torque cell 201.
m. Open wrench jaws 154 off coupling nut 353, using mechanism B1, wrench closing/opening 14 and confirm state using preload microswitch 169 while monitoring view from camera 42.
n. Select mechanism B2, wrench rotation 18 with transmission 26 and confirm it has been selected using linear potentiometer 477 readout.
o. Rotate mechanism B2, wrench rotation 18 for new position on coupling nut 353 using view from camera 42.
p. Repeat steps j. through o. until safety valve assembly 350 is unfastened from the stowage post 82.
q. Open wrench jaws 154 off coupling nut 353 using mechanism B1, wrench closing/opening 14 and confirm state using preload microswitch 169 while monitoring view from camera 42.
r. Select mechanism D, FDV connection 22 with transmission 26 and confirm it has been selected using linear potentiometer 477 readout.
s. Retract safety valve carriage assembly 367 such that the safety valve assembly 350 is stored internal to the refueling tool 10 for transfer to client satellite 81 and confirm using the safety valve carriage assembly 367 retracted microswitch 418.
t. Select mechanism A, center and clamp 12 with transmission 26 and confirm it has been selected using linear potentiometer 477 readout.
u. Un-clamp mechanism A from stowage post 82 and confirm using clamped microswitch 127 that a clamping load has been removed from the stowage post 82.

7.4 Install SV on Client S/C—Fasten SV Fitting Nut to Client FDV a. Touch down the contact spheres 490 to FDV bracket 52 and confirm using view from camera 42 both that the refueling tool 10 is down and that the jaws 121 of mechanism A, center and clamp 12 are fully open.
b. Select mechanism A, center and clamp 12 with transmission 26 and confirm it has been selected using linear potentiometer 477 readout.
c. Clamp FDV reaction flats 58 with mechanism A, center and clamp 12 and confirm using clamped microswitch 127 that a clamping load has been applied to the fill/drain valve, FDV 54.
d. Select mechanism D, FDV connection 22 with transmission 26 and confirm it has been selected using linear potentiometer 477 readout.
e. Advance safety valve carriage assembly 367 until coupling nut 353 contacts fill/drain valve, FDV 54 as confirmed by the compliance microswitch 415.
f. Select mechanism C, wrench elevation 20 with transmission 26 and confirm it has been selected using linear potentiometer 477 readout.
g. Adjust mechanism C, wrench elevation 20 so wrench jaws 154 are in line with coupling nut 353 using view from camera 42. Monitor end of travel microswitches 307 during motion.
h. Close wrench jaws 154 on coupling nut 353 using mechanism B1, wrench closing/opening 14 and confirm state using preload microswitch 169 while monitoring view from camera 42.
i. Select mechanism B2, wrench rotation 18 with transmission 26 and confirm it has been selected using linear potentiometer 477 readout.
j. Rotate coupling nut 353 with mechanism B2, wrench rotation 18. Monitor view from camera 42 during rotation, as well as CW/CCW microswitches 266 at ends of mechanism travel and read-out from torque cell 201.
k. Open wrench jaws 154 off coupling nut 353, using mechanism B1, wrench closing/opening 14 and confirm state using preload microswitch 169 while monitoring view from camera 42.
l. Select mechanism B2, wrench rotation 18 with transmission 26 and confirm it has been selected using linear potentiometer 477 readout.
m. Rotate mechanism B2, wrench rotation 18 for new position on coupling nut 353 using view from camera 42.
n. Repeat steps h. through m. until safety valve assembly 350 is fastened to the fill/drain valve, FDV 54.

7.7 Open Actuation Nut for Fuel Transfer a. Select mechanism C, wrench elevation 20 with transmission 26 and confirm it has been selected using linear potentiometer 477 readout.
b. Adjust mechanism C, wrench elevation 20 so wrench jaws 154 are in line with actuation nut 62 using view from camera 42. Monitor end of travel microswitches 307 during motion.
c. Close wrench jaws 154 on actuation nut 62 using mechanism B1, wrench closing/opening 14 and confirm state using preload microswitch 169 while monitoring view from camera 42.
  d. Select mechanism B2, wrench rotation 18 with transmission 26 and confirm it has been selected using linear potentiometer 477 readout.
  e. Rotate actuation nut 62 using mechanism B2, wrench rotation 18 to open it for fuel transfer. Monitor view from camera 42 during rotation, as well as CW/CCW microswitches 266 at ends of mechanism travel and read-out from torque cell 201.
7.9 Close Actuation Nut after Fuel Transfer
  a. Confirm that the wrench jaws 154 are still in line with the actuation nut 62 using view from camera 42.
  b. Rotate actuation nut 62 using mechanism B2, wrench rotation 18. Monitor view from camera 42 during rotation, as well as CW/CCW microswitches 266 at ends of mechanism travel and read-out from torque cell 201.
  c. Open wrench jaws 154 off actuation nut 62 using mechanism B1, wrench closing/opening 14 and confirm state using preload microswitch 169 while monitoring view from camera 42.
8.3 De-Mate Refueling Tool (RT) Quick Connect from SV Quick Connect to Remove RT from Client Valve
  a. Start driving mate/de-mate carriage assembly 380 until quick connect nipple 355 on safety valve assembly 350 is fully de-mated from quick connect coupling 385 and as confirmed by the dual microswitch assembly 387.
  b. Continue driving mate/de-mate carriage assembly 380 to open locking arms 372 from the external locking groove 352 and confirm locking arms 372 are fully open using view from camera 42.
  c. Select mechanism D, FDV connection 22 with transmission 26 and confirm it has been selected using linear potentiometer 477 readout.
  d. Retract safety valve carriage assembly 367 until fully retracted and confirm using safety valve carriage assembly 367 retract microswitch 418.
  e. Select mechanism A, center and clamp 12 with transmission 26 and confirm it has been selected using linear potentiometer 477 readout.
  f. Un-clamp mechanism A, center and clamp 12 from FDV torque reaction flats 58 and confirm using clamped microswitch 127 that a clamping load has been removed from the fill/drain valve, FDV 54.
9.1 Mate RT Quick Connect to Quick Connect on "Safety Valve Fixture" on Servicer S/C
  a. Touch down the contact spheres 490 to servicer spacecraft 80 and confirm using view from camera 42 that the refueling tool 10 is down and that the jaws 121 of mechanism A, center and clamp 12 are fully open.
  b. Select mechanism A, center and clamp 12 with transmission 26 and confirm it has been selected using linear potentiometer 477 readout
  c. Clamp Safety Valve Fixture 83 with mechanism A, center and clamp 12 and confirm using clamped microswitch 127 that a clamping load has been applied to the Safety Valve Fixture 83.
  d. Select mechanism D, FDV connection 22 with transmission 26 and confirm it has been selected using linear potentiometer 477 readout.
  e. Advance safety valve carriage assembly 367 until trigger plate 407 contacts shoulder of Safety Valve Fixture 83 as confirmed by ready-to-latch microswitch 408.
  f. Start driving mate/de-mate carriage assembly 380 to close locking arms 372 until fully closed on Safety Valve Fixture 83 and confirm using view from camera 42 that the locking arms 372 have secured the Safety Valve Fixture 83.
  g. Continue driving mate/de-mate carriage assembly 380 until quick connect nipple on Safety Valve Fixture 83 is fully mated to quick connect coupling 385 and as confirmed by the dual microswitch assembly 387.
9.3 De-Mate RT Quick Connect from Quick Connect on "Safety Valve Fixture" on Servicer S/C
  a. Start driving mate/de-mate carriage assembly 380 until quick connect nipple on Safety Valve Fixture 83 is fully de-mated from the quick connect coupling 385 and as confirmed by the dual microswitch assembly 387.
  b. Continue driving mechanism D2 to open locking arms 372 from the Safety Valve Fixture 83 and confirm locking arms 372 are fully open using view from camera 42.
  c. Select mechanism D, FDV connection 22 with transmission 26 and confirm it has been selected using linear potentiometer 477 readout.
  d. Retract safety valve carriage assembly 367 until fully retracted and confirm using fully retracted microswitch 418.
  e. Select mechanism A, center and clamp 12 with transmission 26 and confirm it has been selected using linear potentiometer 477 readout.
  f. Un-clamp mechanism A, center and clamp 12 from Safety Valve Fixture 83 reaction flats and confirm using clamped microswitch 127 that a clamping load has been removed from the Safety Valve Fixture 83.
Detailed Operations with Dexterous End Effector (DEE) and Servicing Tools:
This Method can be Applied in Steps 1.1, 2.1, 3.1, 5.1, 6.1, 10.1 of the Overall Operational FFBD for Retrieving Servicing Tools
  a. Command robotic arm 84 to high hover over grapple fixture 610 of tool (e.g. B-nut removal tool 608, crush seal removal tool 609, Blanket Cutter Tool 605, Blanket Handling Tool 606, or wire cutter tool 607) at stowage location.
  b. Command robot arm 84 arm to within capture envelope of tool grapple fixture 610.
  c. Move arm forward until the distal end of grapple fixture 610 is within the capture envelope of capture mechanism 551 of dexterous end effector 550.
  d. Grapple the grapple fixture 610 with the capture mechanism 551 of dexterous end effector, DEE 550.
  e. Undo the tool's tie down mechanism active half 618 with the dexterous end effector, DEE 550.
  f. Command the arm to back away from the stowage location.
1.3 Cut Blankets on Client S/C
  a. Transfer to Client satellite 81.
  b. Position the Blanket Cutter Tool 605 on the thermal blankets.
  c. Pierce blanket with Blanket Cutter Tool 605.
  d. Cut blanket with Blanket Cutter Tool 605.
  e. Repeat c and d until blanket is fully cut.
  f. Command the arm to back away from the Client 81 satellite.
3.2-3.5 Cut B-Nut and Actuation Nut Lockwire on Client S/C
  a. Transfer to Client 81 satellite
  b. Position the Wire Cutter Tool 607 on the lockwire.
  c. Cut lockwire with Wire Cutter Tool 607.
  d. Repeat b and c until wire is fully cut.

e. Command the arm to back away from the Client 81 satellite.

5.2-5.5 Remove B-Nut from Client S/C and Discard at Servicer
 a. Transfer to Client 81 satellite.
 b. Position the B-nut Removal Tool Wire 608 over the fill/drain valve, FDV 54.
 c. Seat the B-nut Removal Tool Wire 608 over the B-nut 64.
 d. Capture B-nut 64.
 e. Back arm away from fill/drain valve, FDV 54.
 f. Transfer to Servicer 80 spacecraft.
 g. Position the tool at the disposal location.
 h. Command the B-nut Removal Tool Wire 608 to eject the B-nut 64.
 i. Back arm away from disposal location.

6.2-6.5 Remove Crush Seal from Client S/C and Discard at Servicer
 a. Transfer to Client 81 satellite.
 b. Position the Crush Seal Removal Tool 609 over the fill/drain valve, FDV 54.
 c. Seat the Crush Seal Removal Tool 609 over the Crush seal 702.
 d. Capture Crush seal 702.
 e. Back arm away from fill/drain valve, FDV 54.
 f. Transfer to Servicer 80 spacecraft.
 g. Position the Crush Seal Removal Tool 609 at the disposal location.
 h. Command tool to eject the Crush seal 702.
 i. Back arm away from disposal location.

This Method can be Applied in Steps 1.5, 2.7, 3.6, 5.6, 6.6, 10.5 of the Overall Operational FFBD for Stowing Servicing Tools
 a. Transfer to Servicer 80 spacecraft.
 b. Command arm to high hover over tool (e.g. B-nut removal tool 608, crush seal removal tool 609, blanket cutter tool 605, blanket handling tool 606, or wire cutter tool 607) at stowage location.
 c. Command arm into docking location.
 d. Fasten the tool's tie down mechanism active half 618 with the dexterous end effector, DEE 550.
 e. Derigidize and release the tool's grapple fixture 610 from the dexterous end effector, DEE 550.
 f. Command the arm to back away from the stowage location.

4.1, 7.1—Retrieving Refueling Tool
 a. Command arm to high hover over Refueling Tool 10 at stowage location.
 b. Command arm to within capture envelope of Refueling Tool 10 grapple fixture 610.
 c. Move arm forward until grapple probe is within the jaws of the grapple canister.
 d. Grapple the grapple fixture 610 with the dexterous end effector, DEE 550.
 e. Enable electrical transfer between dexterous end effector, DEE 550 and Refueling Tool 10.
 f. Enable fluid transfer between dexterous end effector, DEE 550 and Refueling Tool 10.
 g. Undo the tool's tie down restraint with the dexterous end effector, DEE 550.
 h. Command the arm to back away from the stowage location.

4.7, 9.4—Stow Refueling Tool
 a. Transfer to Servicer 80 spacecraft.
 b. Command arm to high hover over Refueling Tool 10 at stowage location.
 c. Command arm into docking location.
 d. Fasten the tool's tie down restraint with the dexterous end effector, DEE 550.
 e. Disable electrical transfer between dexterous end effector, DEE 550 and tool.
 f. Disable fluid transfer between dexterous end effector, DEE 550 and tool.
 g. Derigidize and release the tool's grapple fixture 610 from the dexterous end effector, DEE 550.
 h. Command the arm to back away from the stowage location.

The present disclosure has advantages over previously disclosed systems as outlined below.

First, vision system-based open architecture allows for validation of each successive access, clamping and rotation state of the FDV effected by refueling tool 10 in the refueling operation, commanded either by a human tele-operator or automatic control. Validation of a successfully completing each successive manipulation step on the FDV as part of the refueling refueling operation is essential to meeting mission requirements.

Second, vision system-based architecture supports fine adjustment of individual mechanism operations in real time within the mission plan. Each mechanism is adaptable to the FDV worksite such that risk associated with unknown aspects of the as-built configuration, such as the orientation of torque reaction flats or variation in mounting tolerances are mitigated, and a variety of different worksites can be serviced with a single tool.

Third, the means for registering to and clamping onto an FDV allows for one refueling tool to adapt to a range of FDV sizes and all possible installation orientations. Detailed consideration of the FDV worksite has revealed that this adaptability is essential to ensuring mission success.

Fourth, the wrench mechanism, comprising those mechanisms for opening and closing, rotating and elevation adjustment of the wrench, can be adjusted to a range of FDV sizes and all possible installation configurations and can perform wrenching operations all while not obstructing the vision system, critical to being able to validate that the manipulation step has been successfully achieved.

Fifth, the use of a safety valve with a quick connect nipple provides two independent means of sealing the FDV after a refueling operation. The combination of a quick connect nipple and a second separate, check valve in series within the safety valve restores the two levels of sealing that were present prior to servicing.

Sixth, the use of a safety valve with a quick connect nipple facilitates successive, greatly simplified refueling operations. More specifically, in the most simple form, on a second refueling operation of the client satellite, the refueling operation would begin at step 7.0 in FIG. 56B.

Seventh, the use of a safety valve with quick connect nipple provides a means for refueling without requiring any rotary actuation above a threaded connection. This is a direct improvement over previous disclosures by eliminating the possibility of, for example, rotation of the whole safety valve body rather than just the actuation nut, such as could occur if the safety valve included a rotary actuation nut above its threaded connection to the FDV.

Eighth, the installation of the safety valve via threaded coupling nut occurs only after the refueling tool has been successfully registered and clamped onto the target FDV, unlike previously disclosed systems wherein the robotic arm with refueling tool and safety valve approach the FDV without registration. Additionally, the installation of the safety valve onto the FDV includes both visual and microswitch-based sensing, in conjunction with a compliant coupling nut, to ensure successful thread engagement.

Ninth, in relation to an overall refueling system and method, the comprehensive suite of tools provides a means and a method for which every step is robust and verifiable through visual and other sensor means. It is robust because the tools action can all be adjusted in real-time on-orbit to adapt to variation in worksite arrangement of feature tolerances. At each step of the refueling operation as the blankets, lock wire and FDV are manipulated, sensor information enables confirmation of a successful action or information necessary to take recovery actions.

Tenth, the supporting servicing tools have a means of being picked up, powered and also stowed, all through the actions of a single robot arm and end effector. Prior art showed a means of stowing servicing tools but not tied down sufficiently for launch or transit.

Therefore what is claimed is:

1. A method of transferring propellant from a servicer spacecraft to a client spacecraft, the servicer spacecraft including a robotic arm and a refueling tool being attachable to said robotic arm, said refueling tool having a refueling tool vision system which includes at least one camera, a rotatable wrench portion, an open architecture structure such that when the refueling tool is engaged with a fill/drain valve, a field of view of the camera encompasses the fill/drain valve being engaged and the rotatable wrench of said refueling tool and a coupling nut of a safety valve installed on the fill/drain valve, including strategically placed sensors on selected movable components of the refueling tool in order to sense a position of said selected movable components during a refueling operation, said client spacecraft including a tank and a fill drain valve coupled to said tank, said fill drain valve including a valve actuation nut for opening and closing said fill drain valve, said propellant being selected from the group consisting of fuel and oxidizer, the method comprising instructing the robotic arm to position the refueling tool to perform the steps of:
   a. removing an access valve cap on said fill drain valve;
   b. providing a sensed confirmation that said removal action has successfully occurred;
   c. establishing a fluid connection between a safety valve and a source of propellant on the servicer spacecraft through a fluid line connected at one end thereof to said source of propellant;
   d. providing a sensed confirmation that said connection has been established;
   e. attaching said safety valve to said fill drain valve to provide a safe fluid coupling permitting one-way fluid flow into said fill drain valve;
   f. providing a sensed confirmation that said safety valve has been installed;
   g. opening said fill drain valve by actuating said valve actuation nut;
   h. providing sensed confirmation that said actuation nut has been actuated; and
   i. transferring the propellant into said tank through said safety valve; and
      wherein providing sensed confirmation is accomplished using a combination of feedback provided by real-time visual images from said refueling tool vision system and concurrently real-time feedback from sensors placed on components of the refueling tool to sense a position of movable components on both the servicer spacecraft and client spacecraft engaged by the refueling tool at every step of a refueling operation.

2. The method according to claim 1, wherein said moveable components include the access valve cap, the safety valve, the fluid line, the fill drain valve and valve actuation nut.

3. A method of refueling a client satellite by accessing one or more fill drain valves which are in flow communication with one or more propellant storage tanks located in the client satellite, the method of refueling being conduced using a servicer spacecraft having stowed thereon
   a) one or more safety valves;
   b) a refueling tool having refueling tool vision system which includes at least one camera, a rotatable wrench portion, an open architecture structure such that when the refueling tool is engaged with a fill/drain valve, a field of view of the camera encompasses the fill/drain valve being engaged and the rotatable wrench of said refueling tool and a coupling nut of a safety valve installed on the fill/drain valve, including strategically placed sensors on selected movable components of the refueling tool in order to sense a position of said selected movable components during a refueling operation,
   c) a suite of supporting tools for preparing the client satellite to receive said refueling tool and assisting in the refueling operation,
   the servicer spacecraft having mounted thereon
   a) a robotic arm mounted to said servicer spacecraft at its proximal end,
   b) a berthing device for rigidly connecting said client satellite to said servicer spaceship,
   c) a propellant transfer system for transferring propellant from the servicer spacecraft to the client satellite,
   d) a propellant coupling mounted in said end effector coupled to said propellant transfer system for transferring propellant to said client satellite through said propellant coupling,
   the method of refueling comprising the steps of:
   i) maneuvering the servicer satellite into close proximity with the client satellite and rigidly berthing the client satellite to the servicer satellite using berthing device,
   ii) exposing the fill/drain valve by instructing the robotic arm to acquire in a sequential manner the refueling tool and the supporting tools to loosen and remove any objects covering the fill/drain valve, and once a given object is removed stowing the refueling tool,
   iii) after the fill drain valve is exposed, instructing the robotic arm to acquire the refuelling tool which is configured such that a fluid connection between said safety valve and the one or more propellant storage tanks located on the servicer spacecraft is established, and once acquired, instructing the robotic arm to acquire a safety valve thereby connecting the propellant transfer system to the safety valve,
   iv) instructing the robotic arm to install the safety valve on a refueling nipple of the fill drain valve based on real-time visual images obtained by the refueling tool vision system and feedback from one or more of sensors placed on components of the refueling tool to sense a position of movable components on both the servicer spacecraft and client spacecraft engaged by the refueling tool during refueling operations,
   v) transfer propellant to the client satellite with the propellant passing through the refueling tool and safety valve, vi) once propellant has been transferred, instructing the robotic arm to disconnect the propellant transfer system by disconnecting the refueling tool from the fill/drain valve, and vii) disengage the berthing device from the client satellite; and providing a sensed confirmation that each action has successfully occurred, wherein providing sensed confirmation is accomplished using a combination of feedback provided by real-time visual images from said refueling tool vision system and concurrently real-time feedback from sensors placed on components of the refueling tool to sense a position of movable components on both the servicer spacecraft and client spacecraft engaged by the refueling tool at every step of a refueling operation.

4. The method according to claim 3, including logging an output of said one or more sensors.

5. The method according to claim 3, wherein said sensors are any one or combination of one or more microswitches, and one or more potentiometers.

6. The method according to claim 5, wherein feedback from one or more of microswitches and/or potentiometers is the status of the microswitch at a particular time during the refueling operation.

7. The method of claim 6, wherein said microswitches placed within a mechanism tasked with installing the safety valve on the fill/drain valve to sense said safety valve during acquisition and to sense a safety valve coupling nut of said safety valve contacting the refueling nipple of said fill/drain valve during refueling operations.

8. A system mounted on a servicing spacecraft for transferring fluid to a client satellite, the client satellite including a tank and a fill drain valve, the tank being coupled to the fill drain valve, the fill drain valve having an actuation nut for opening and closing the fill drain valve and an access valve cap on the fill drain valve, comprising:

a. fluid transfer means for transferring a fluid from a fluid tank on the servicing spacecraft to the tank on the client satellite, wherein the fluid is selected from the group consisting of fuel and oxidizer;

b. tool means for removing and replacing the access valve cap, for coupling a fluid line to the fill drain valve and decoupling therefrom, and for actuating the valve actuation nut to open and close the fluid valve;

c. a first sensing means for determining a relative displacement between said tool means and the fill drain valve, said first sensing means positioned to have a field of view to observe the relative displacement between said tool means and the fill drain valve throughout refueling operations;

d. a second sensing means including one or more sensors embedded in the tool means that senses and logs a position of selected movable components during fluid transfer operations for determining the state of the fill drain valve during the successive steps of accessing and manipulating the fill drain valve and subsequently coupling the fluid line and decoupling therefrom;

e. a safety valve attachable to the fill/drain valve for providing a safe fluid coupling with said safety valve having one or more independent seals against leakage during and after refueling operations;

f. positioning means connectable to said tools means, for positioning said tool means with respect to the fill drain valve;

g. control means in communication with said first and second sensing means, said positioning means, and said tool means, for controlling operation of said positioning means and said tool means based on feedback from said first and second sensing means; and h. said tool means having an open architecture structure such that during refueling operations, the field of view the first sensing means remains clear such that feedback from both the first and second sensing means enables sensing of a position of movable components on both the servicer spacecraft and client spacecraft engaged by the refueling tool at every step of a refueling operation.

9. The system according to claim 8, wherein said tool means includes a first tool for loosening the access valve cap, actuating the valve actuation nut to open and close and coupling the fluid line to the fill drain valve and decoupling therefrom, and a second tool for removing the access valve cap.

10. The system according to claim 8, wherein said tool means includes a third tool for removing a crush seal from the fill drain valve.

11. The system according to claim 8, wherein said first sensing means is a vision system.

12. The system according to claim 8, wherein said second sensing means is a combination of a vision system positioned to have a field of view that encompasses a work space that includes the first and second tools engaging said fill drain valve, and said sensing means embedded in the tool means.

13. The system according to claim 12, wherein said sensing means is one or more microswitches, and one or more potentiometers, or any combination thereof.

14. The system according to claim 13, wherein feedback from one or more of microswitches and/or said one or more potentiometers is the status of the microswitch and/or the status of the potentiometer at a particular time during the refueling operation.

* * * * *